(12) United States Patent
Percec et al.

(10) Patent No.: US 6,911,515 B2
(45) Date of Patent: Jun. 28, 2005

(54) AQUEOUS ROOM TEMPERATURE LIVING RADICAL POLYMERIZATION OF VINYL HALIDES

(75) Inventors: Virgil Percec, Philadelphia, PA (US); Anatoliy V. Popov, Philadelphia, PA (US)

(73) Assignee: University of Pennsylvania, Philadelphia, PA (US)

( * ) Notice: Subject to any disclaimer, the term of this patent is extended or adjusted under 35 U.S.C. 154(b) by 50 days.

(21) Appl. No.: 10/179,584

(22) Filed: Jun. 24, 2002

(65) Prior Publication Data

US 2003/0078353 A1 Apr. 24, 2003

Related U.S. Application Data

(63) Continuation-in-part of application No. 09/893,201, filed on Jun. 27, 2001.
(60) Provisional application No. 60/278,114, filed on Mar. 23, 2001.

(51) Int. Cl.[7] .................................. C08F 14/06
(52) U.S. Cl. ........................................ 526/344
(58) Field of Search ......................... 526/344

(56) References Cited

U.S. PATENT DOCUMENTS

| | | |
|---|---|---|
| 2,831,844 A | 4/1958 | Simpson et al. |
| 4,091,197 A | 5/1978 | Fischer et al. |
| 4,511,700 A | 4/1985 | Melby et al. |
| 5,455,319 A | 10/1995 | Bak et al. |
| 5,807,937 A | 9/1998 | Matyjaszewski et al. |

FOREIGN PATENT DOCUMENTS

| | | | |
|---|---|---|---|
| EP | 0 617 057 | | 9/1994 |
| GB | 674 060 | | 6/1952 |
| GB | 932 852 | | 7/1963 |
| GB | 099 391 | | 1/1968 |
| GB | 1 099 391 | * | 1/1968 |
| JP | 10 130306 | | 5/1998 |
| NL | 6 906 754 | | 11/1969 |
| NL | 7 201 105 | | 8/1972 |
| WO | WO 96 30421 A | | 10/1996 |
| WO | WO 97 13792 | | 4/1997 |
| WO | WO 97 18247 A | | 5/1997 |

* cited by examiner

*Primary Examiner*—Robert D. Harlan
(74) *Attorney, Agent, or Firm*—Michele M. Tyrpak; Hudak, Shunk & Farine Co, LPA

(57) ABSTRACT

A living polymerization process for preparation of poly (vinyl chloride) (PVC) with controlled molecular weight and molecular weight distribution is described. The polymerization reaction can be initiated by various polyhalocarbon initiators in conjunction with non-metallic reducing single electron transfer reagents as catalysts and accelerated by electron shuttles. The process occurs at room temperature in water or water-organic solvent medium. The polymerization provides PVC with a controlled molecular weight and narrow molecular weight distribution. The halogen containing polymer compositions are useful as, among others, viscosity modifiers, impact modifiers and compatibilizers.

41 Claims, 11 Drawing Sheets

US 6,911,515 B2

AQUEOUS ROOM TEMPERATURE LIVING RADICAL POLYMERIZATION OF VINYL HALIDES

CROSS REFERENCE TO RELATED APPLICATION

This application is a continuation in part of related application Ser. No. 09/893,201 filed Jun. 27, 2001, pending which claims the benefit of U.S. Provisional Application 60/278,114 filed Mar. 23, 2001.

BACKGROUND OF THE INVENTION

1. Field of the Invention

The present invention relates to the non-metal catalyzed radical and living radical polymerization of halogen containing monomers such as vinyl halides and vinylidene halides. In particular, this invention relates to a process for the synthesis, in the presence of a non-metallic catalyst, of poly(vinyl chloride) (PVC) with controlled molecular weight and narrow molecular weight distribution. The polymerization can be initiated from various electron accepting radical precursors such as polyhalocarbons in the presence of non-metal reducing single electron transfer reagents as catalysts which can include low valent sulfur salts containing $SO_2$ group. The process can be accelerated by electron shuttles such as alkyl viologens.

2. Description of the Prior Art

Heretofore, it was known to polymerize vinyl chloride (VC) and other vinyl halide monomers using conventional free radical processes. However, even in the presence of certain molecular weight additives, there is limited control over the molecular weight and polydispersity of the resulting polymer. In addition, VC polymers are thermally unstable and require thermal stabilizers for their practical use. Heretofore, there have been no methods reported to prepare poly(vinyl chloride) by a non-metal-catalyzed living process initiated from an active halide compound in which the molecular weight and the molecular weight distribution of PVC could be controlled.

Conventional free radical polymerization of vinyl chloride (VC) is accompanied by the formation of thermally labile tertiary and allylic chlorine defects which are responsible for the low thermal stability of poly(vinyl chloride). This provides its most relevant technological limitations. These structural defects are generated during the conventional radical polymerization of VC and are responsible for the initiation of a zipper mechanism of thermal degradation of PVC.

In U.S. patent Ser. No. 09/893,201, which is herein fully incorporated by reference, there is described a process for the living radical polymerization of vinyl halides utilizing a metal (preferably Cu) catalyst. The polymerization processes taught therein include both non-aqueous high temperature and aqueous room temperatures processes. The former gives polymers with low yields (maximum 30%) and high molecular weight distribution up to about 1.7. The latter achieves high conversions and lower molecular weight distribution (up to 1.50). Both processes show linear molecular weight dependence on the monomer conversion. A single electron transfer mechanism mediated by metals is proposed for the initiation and dormant species activation steps.

The PVC obtained by aqueous room temperature copper-catalyzed living radical polymerization of vinyl chloride as described in U.S. patent Ser. No. 09/893,201, contains a vanishingly small amount of carbon-carbon double bonds in comparison with conventional PVC. This allows us to consider such a polymer as one free of at least allylic chlorine defects that could lead to new properties. Alternatively, the use of heavy metal in polymerization processes requires an additional utilization of the spent catalyst and purification of the polymer, thereby increasing the cost.

Previously, attempts on living radical polymerization of vinyl halides, which did not involve metal catalysis, were based on degenerative chain transfer processes using iodine containing chain transfer agents and peroxy-esters as initiators. As is taught in U.S. Pat. No. 5,455,319, such a process was carried out at temperatures conventionally used for vinyl halide polymerizations. In addition, the polydispersity never decreased to values below 1.7.

SUMMARY OF THE INVENTION

There has now been found a process for the polymerization of vinyl chloride to form PVC polymers, and not telomers, utilizing a metal-catalyzed radical and living radical polymerization. Various activated mono, di, tri and multifunctional organic halide initiators, including the allylic chlorines normally found in chlorine containing polymers such as PVC, in conjunction with certain metal catalysts, can successfully initiate the radical polymerization of vinyl chloride. Optionally, a solvent or water or mixtures thereof and a ligand for the metal catalyst can be utilized in the polymerization of the vinyl chlorine monomer of the present invention.

In a further embodiment, a method of polymerizing vinyl chloride to form PVC polymers, and not telomers, has now been found utilizing non-metal-catalyzed radical and living radical polymerization. Various activated electron accepting radical precursor initiators, such as polyhalocarbons, in conjunction with certain non-metallic single electron donors as catalysts can successfully initiate the radical polymerization of vinyl halide. The process occurs in water or aqueous-organic solvent solutions. Optionally, an electron shuttle such as an alkyl viologen, a surfactant, and a buffer can be utilized in the polymerization of the vinyl halide monomer of the present invention.

Top, the kinetic plot, conversion (open symbols) and concentration logarithm (closed symbols) on time. Bottom, the dependence of the number average molecular weight (closed symbols) and molecular weight distribution (open symbols) on theoretical number average molecular weight.

Figure 6:
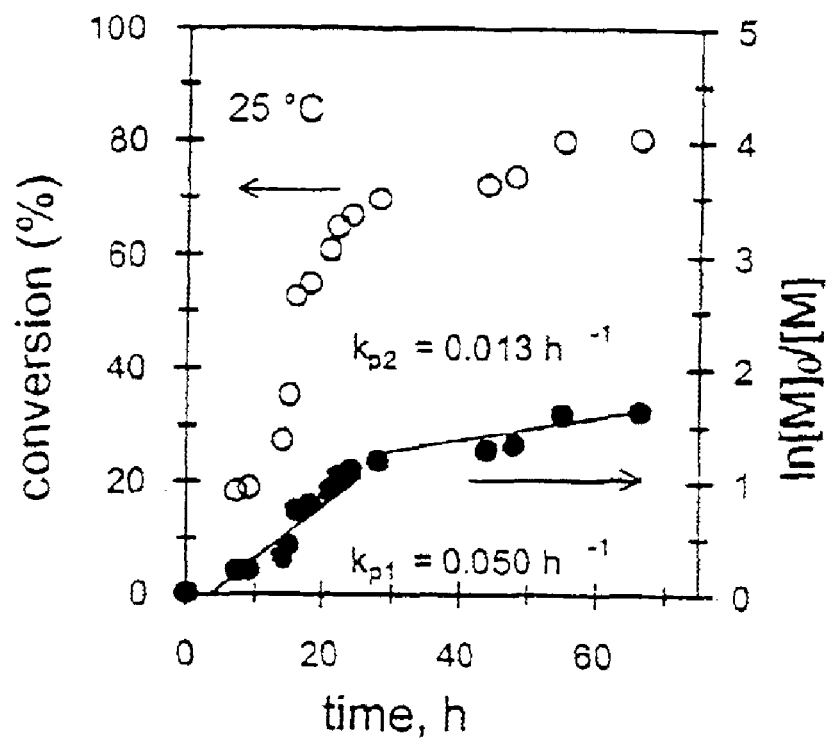
Figure 6:
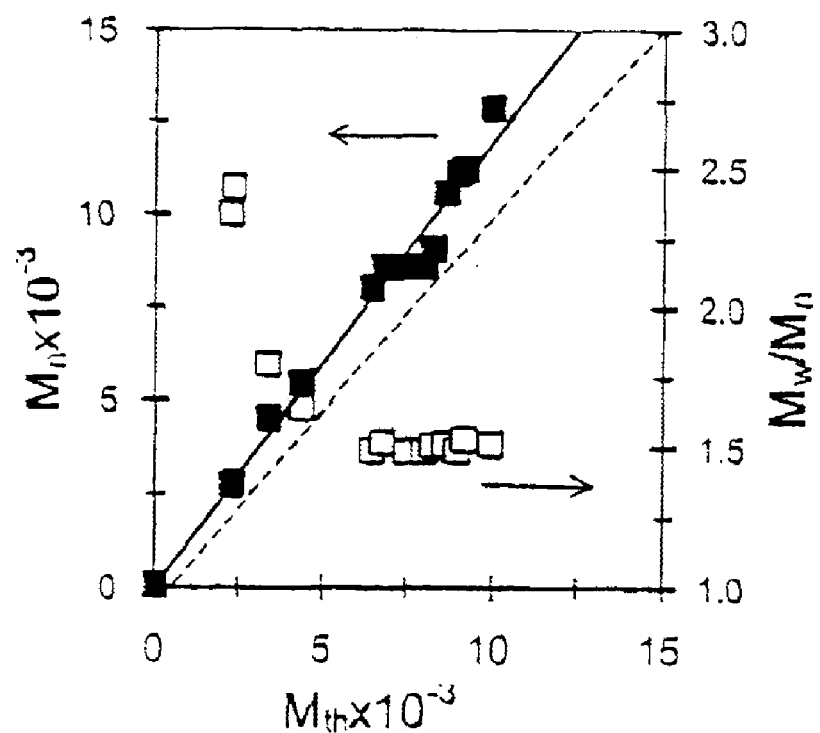

FIG. 6 illustrates Room Temperature Na$_2$S$_2$O$_4$-mediated LRP of VC Initiated with iodoform in H$_2$O/THF in the presence of surfactant Brij® 98. [VC]/[CHI$_3$]/[Na$_2$S$_2$O$_4$]/[NaHCO$_3$]/[Brij® 98]=200/1/2/2.2/2080 (mol/mol/mol/mol/mol/ppm w/w to VC).

Top, the kinetic plot, conversion (open symbols) and concentration logarithm (closed symbols) on time. Bottom, the dependence of the number average molecular weight (closed symbols) and molecular weight distribution (open symbols) on theoretical number average molecular weight.

Figure 7:
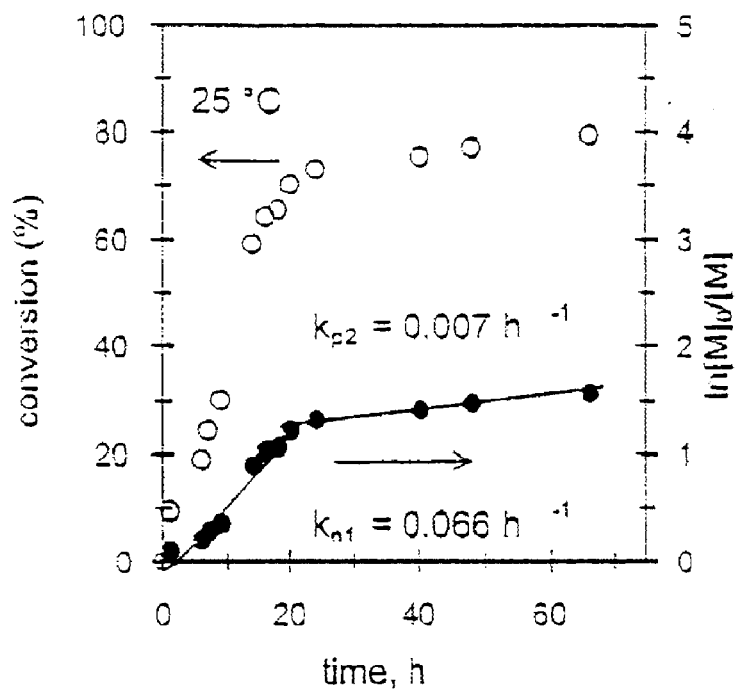
Figure 7:
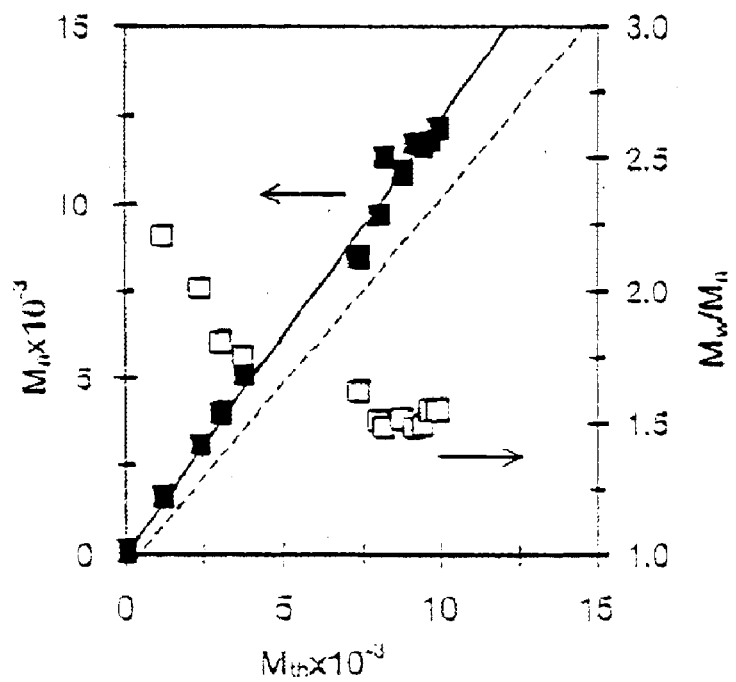

FIG. 7 illustrates Room Temperature Na$_2$S$_2$O$_4$-mediated LRP of VC Initiated with iodoform in H$_2$O/THF in the presence of electron shuttle OV$^{2+}$ and surfactant Brij® 98. [VC]/[CHI$_3$]/[Na$_2$S$_2$O$_4$]/[NaHCO$_3$]/[OV$^{2+}$]/[Brij® 98]= 200/1/2/2.2/0.00175/2080 (mol/mol/mol/mol/mol/ppm w/w to VC).

Top, the kinetic plot, conversion (open symbols) and concentration logarithm (closed symbols) on time. Bottom, the dependence of the number average molecular weight (closed symbols) and molecular weight distribution (open symbols) on theoretical number average molecular weight.

Figure 8:
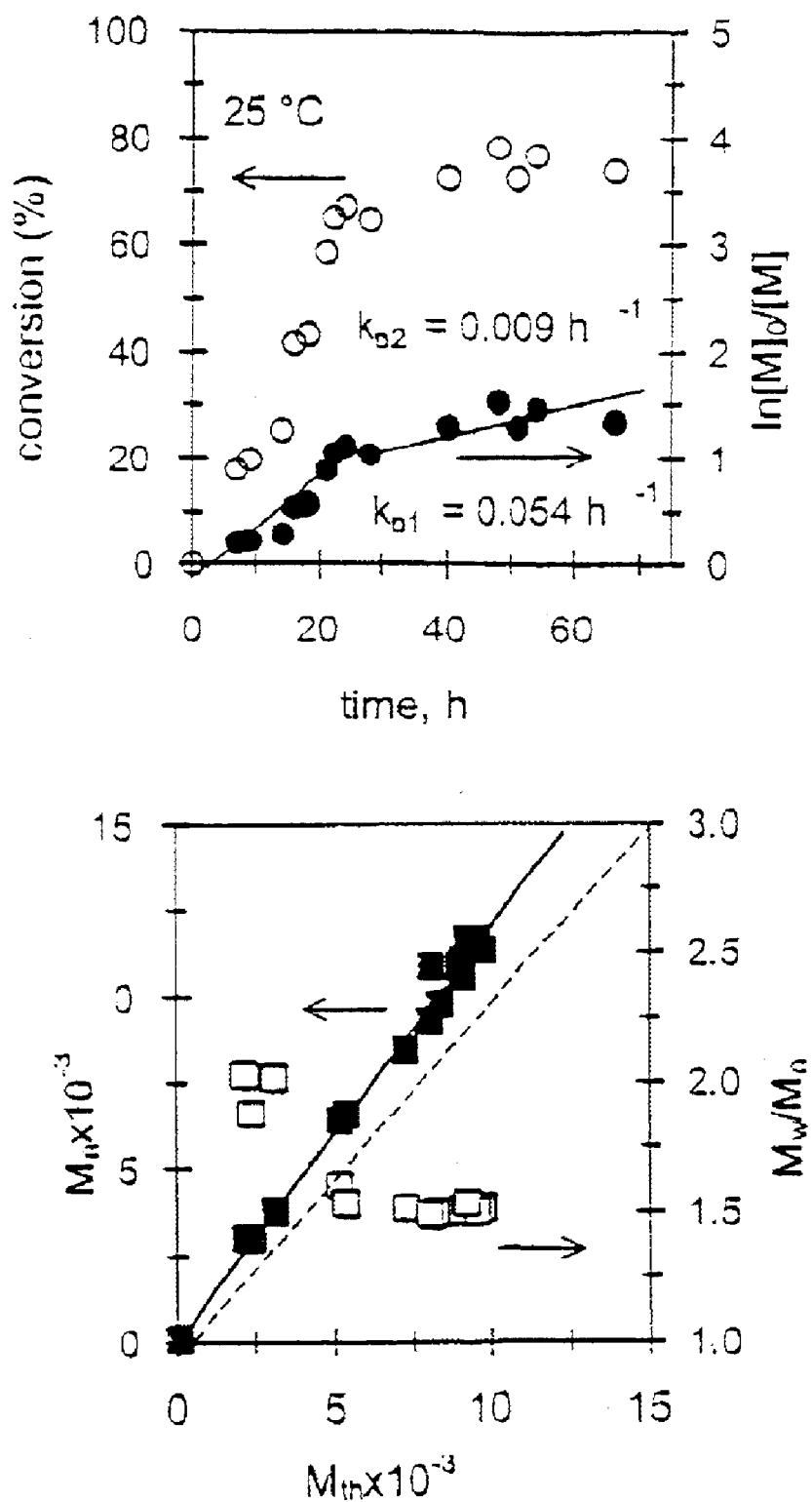

FIG. 8 illustrates Room Temperature Na$_2$S$_2$O$_4$-mediated LRP of VC Initiated with iodoform in H$_2$O/THF in the presence of electron shuttle MV$^{2+}$ and surfactant Brij® 98. [VC]/[CHI$_3$]/[Na$_2$S$_2$O$_4$]/[NaHCO$_3$]/[MV$^{2+}$]/[Brij® 98]= 200/1/2/2.2/0.00175/2080 (mol/mol/mol/mol/mol/ppm w/w to VC).

Top, the kinetic plot, conversion (open symbols) and concentration logarithm (closed symbols) on time. Bottom, the dependence of the number average molecular weight (closed symbols) and molecular weight distribution (open symbols) on theoretical number average molecular weight.

Figure 9:
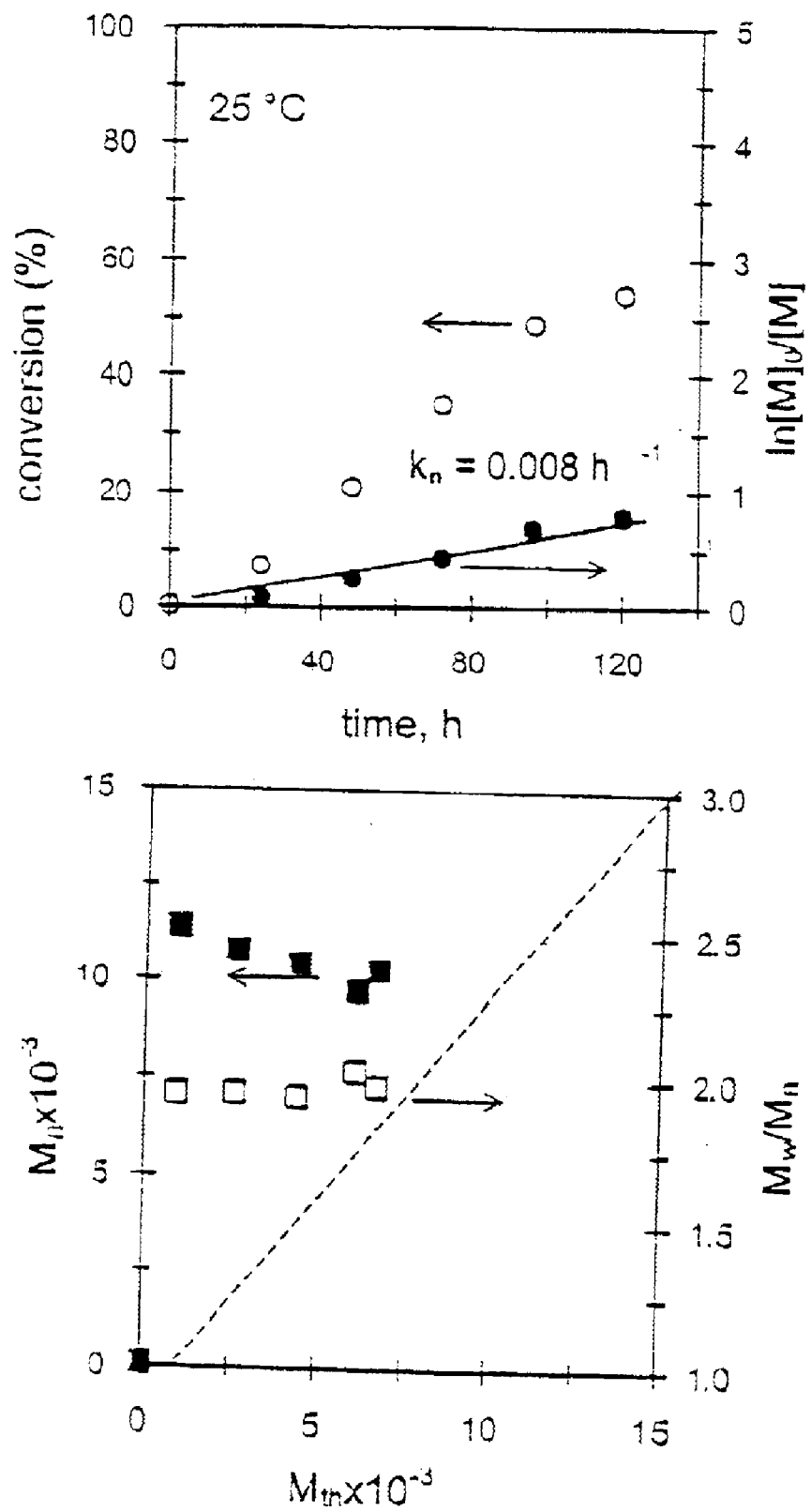

FIG. 9 illustrates Room Temperature Na$_2$S$_2$O$_8$—HCOONa-mediated radical polymerization of VC initiated with bromoform in H$_2$O/THF. [VC]/[CHBr$_3$]/[Na$_2$S$_2$O$_8$]/[HCOONa]/[NaHCO$_3$]=200/1/2/2/2.2 (mol/mol/mol/mol/mol).

Top, the kinetic plot, conversion (open symbols) and concentration logarithm (closed symbols) on time. Bottom, the dependence of the number average molecular weight (closed symbols) and molecular weight distribution (open symbols) on theoretical number average molecular weight.

Figure 10:
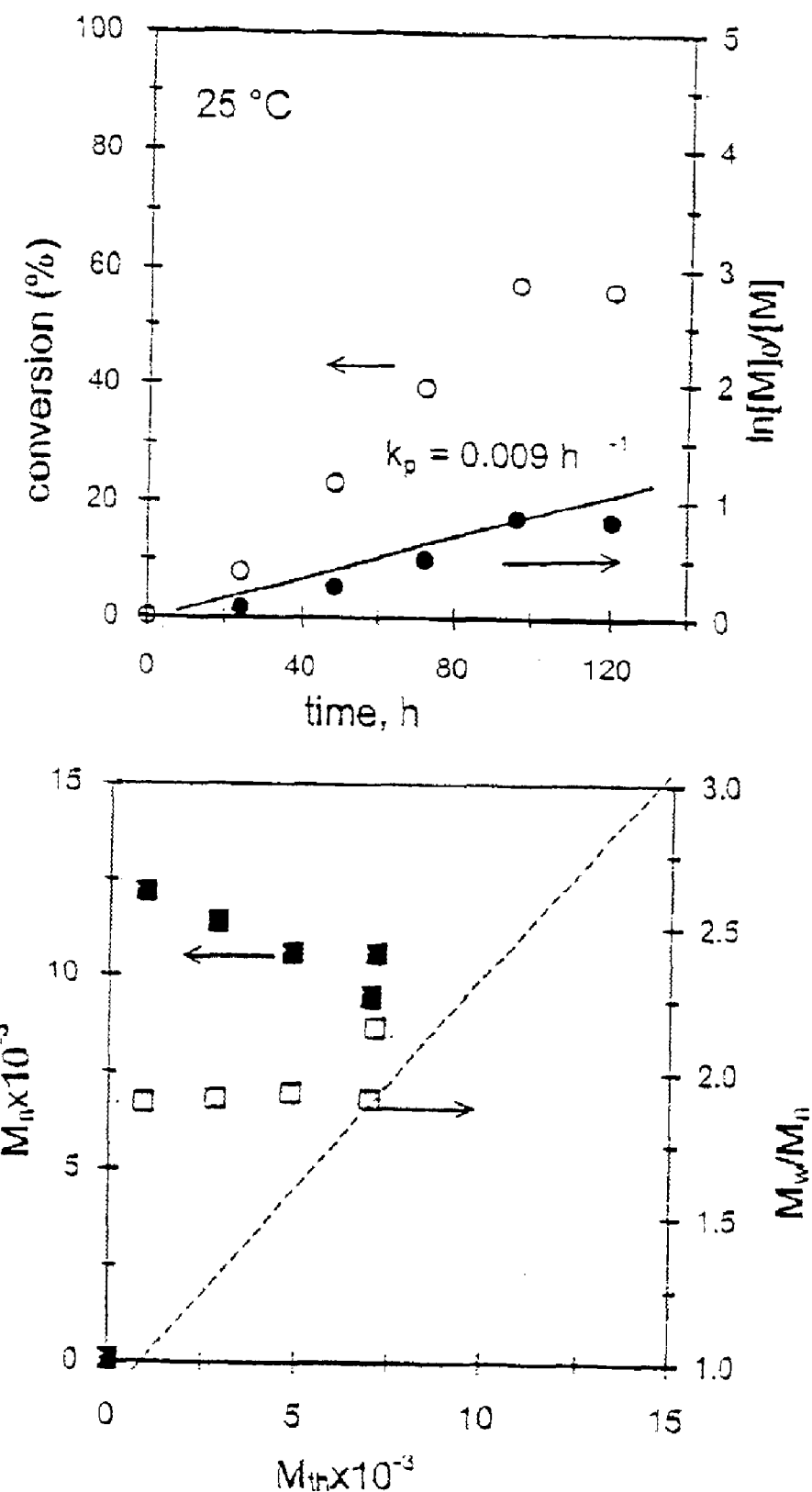

FIG. 10 illustrates Room Temperature Na$_2$S$_2$O$_8$—HCOONa-mediated radical polymerization of VC initiated with chloroform in H$_2$O/THF [VC]/[CHBr$_3$]/[Na$_2$S$_2$O$_8$]/[HCOONa]/[NaHCO$_3$]=200/1/2/2/2.2 (mol/mol/mol/mol/mol).

Top, the kinetic plot, conversion (open symbols) and concentration logarithm (closed symbols) on time. Bottom, the dependence of the number average molecular weight (closed symbols) and molecular weight distribution (open symbols) on theoretical number average molecular weight.

Figure 11:
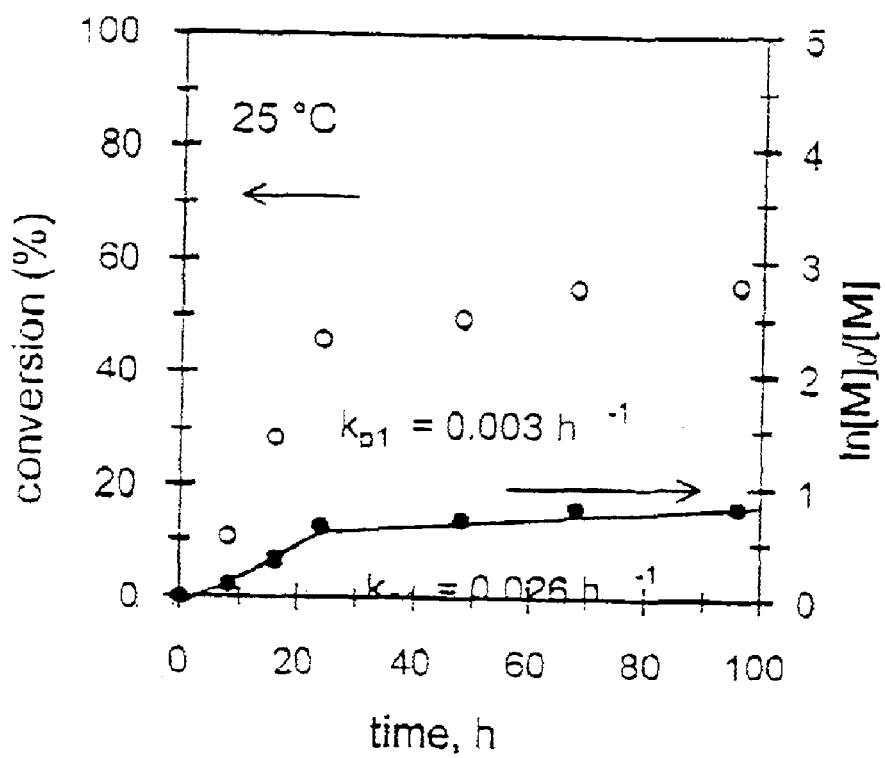
Figure 11:
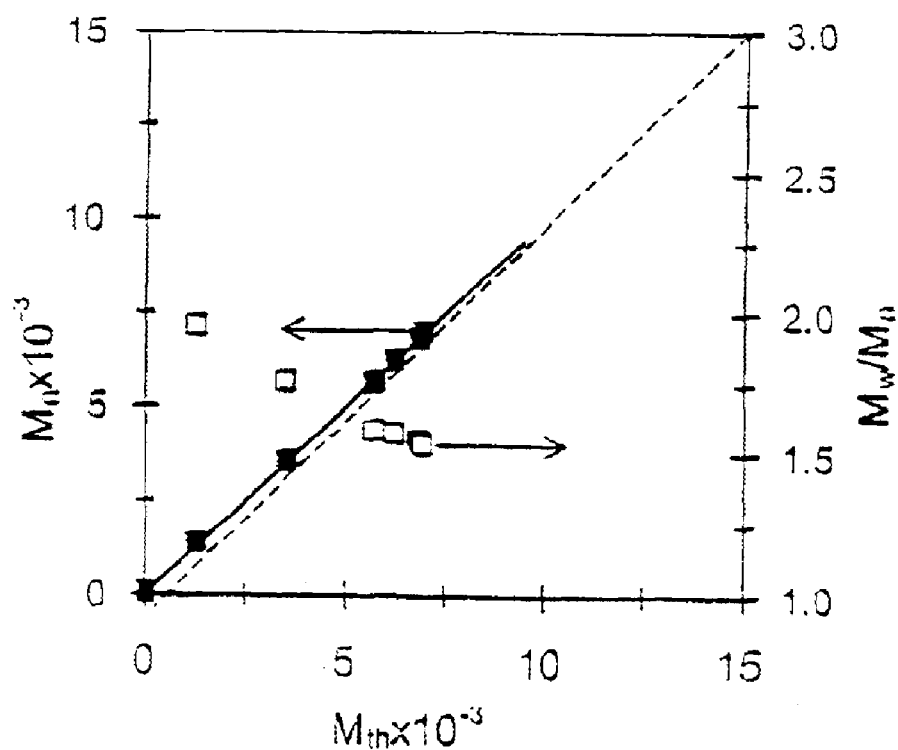

FIG. 11 illustrates Room Temperature H$_2$NC(=NH)SO$_2$H-mediated LRP of VC initiated with iodooform in H$_2$O/THF in the pesence of electron shuttle OV$^{2+}$. [VC]/[CHI$_3$]/[H$_2$NC(=NH)SO$_2$H]/[NaHCO$_3$]/[OV$^{2+}$]200/1/2/4.4/0.0035 (mol/mol/mol/mol/mol).

Top, the kinetic plot, conversion (open symbols) and concentration logarithm (closed symbols) on time. Bottom, the dependence of the number average molecular weight (closed symbols) and molecular weight distribution (open symbols) on theoretical number average molecular weight.

DETAILED DESCRIPTION OF THE INVENTION

In the metal-catalyzed polymerization of chlorine containing monomers, appropriate initiators include halides and pseudohalides of the formula R—X, where R having from 1 to 100,000 carbon atoms, contains an activating electron withdrawing group such as cyano, ester, perfloroalkyl or any other unit capable of stabilizing a radical such as benzyl or allyl, and X=halide. The halide initiators include, but are not limited to various activated mono, di, tri and polyfunctional α,α-dihaloalkanes, α,α,α-trihaloalkanes, perhaloalkanes, perfloroalkyl halides, benzyl halides, allyl halides, sulfonyl halides, α-haloesters, α-halonitriles, α-haloketones, imidyl halides, or combinations thereof. Additionally, any compound having labile carbon-halide, nitrogen-halide, sulfur-halide, phosporus-halide, silicon-halide bonds which can dissociate homolytically by themselves or in the presence of a metal catalyst are suitable for use as initiators in the present invention. Suitable structures for initiators utilized in the present invention are set forth in Scheme 3.

Generally, preferred initiators include chlorine, bromine and thiocyanate containing compounds, with iodide initiators being desirable. Mono, di and trifunctional α-haloesters act as active initiators for the polymerization of vinyl chloride in the presence of Fe(O), TiCp$_2$Cl$_2$ and Cu(O) and its salts such as Cu$_2$Te, Cu$_2$Se, Cu$_2$S, Cu$_2$O, CuCl, CuBr, CuI and copper thiophenoxide (CuSPh), copper butanethiolate (CuSBu), copper phenylacetylide (CuC≡CPh). Various chlorine containing initiators such as CH$_3$CH(CN)Cl, Cl—CH$_2$—Ph—CH$_2$—Cl or R—CH=CH—CH$_2$—Cl and R—SO$_2$—Cl also promote the polymerization of chlorine containing monomers in the presence of catalysts such as Cu(O) and its salts, Fe(O) and TiCp$_2$Cl$_2$. The preferred initiators that lead to polymers of narrowest molecular weight distribution in the presence of Cu(O) and its salts or complexes are the active iodine containing substrates of the type R$_1$R$_2$R$_3$C—I where at least one of the R substituents is an electron withdrawing group (EWG) or radical stabilizing group such as benzylic, allylic, -halo, -cyano, -ester, -trifluoromethyl and so on. The other R substituents can be H, alkyl chains including polymer chains, electron withdrawing groups and combinations thereof. The preferred iodine containing initiators include: I—CH$_2$-Ph-CH$_2$-I, CH$_3$—CH(Cl)-I, CH$_2$I$_2$, CHI$_3$, CI$_4$, CH$_2$—CH—CH$_2$-I, CF$_3$—(CF$_2$)$_n$—I, I—CH$_2$—CONH$_2$ and I—CH$_2$—COO—(CH$_2$)$_n$—H (n=1–20).

Scheme 3
Selected examples of initiators for the metal catalyzed radical polymerization of vinyl chloride

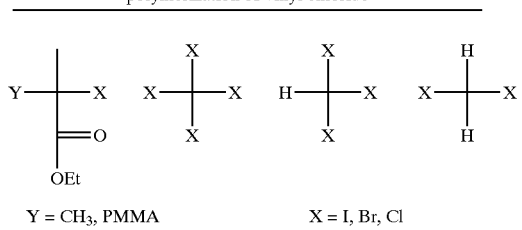

Y = CH₃, PMMA      X = I, Br, Cl

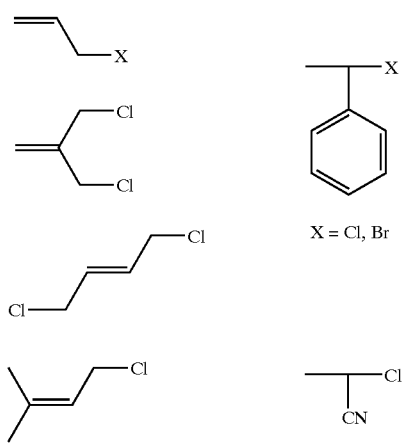

X = Cl, Br

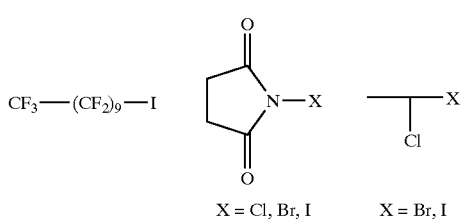

X = Cl, Br, I      X = Br, I

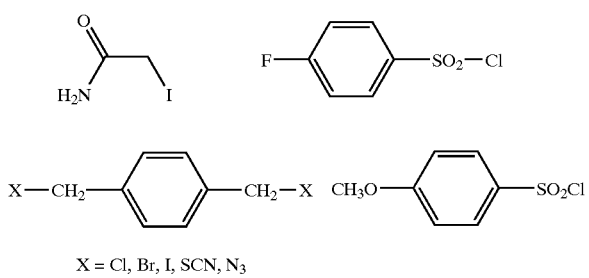

X = Cl, Br, I, SCN, N₃

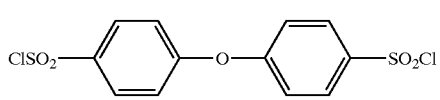

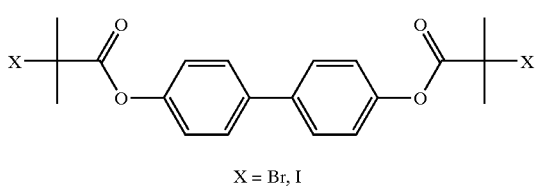

X = Br, I

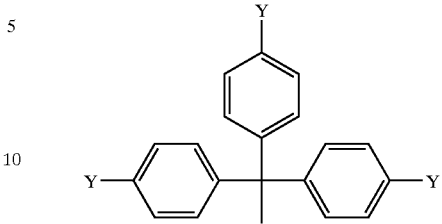

X = Cl, Br, I,
Y = SO₂Cl,

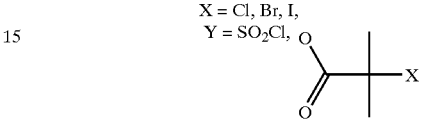

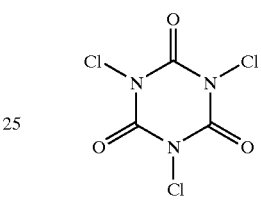

The amounts of such halide initiators utilized depend on the desired molecular weight of the halide containing polymer and are generally from about 5,000 to about 10, desirably from about 1000 to about 25, and preferably from about 500 to about 50 moles of halide containing monomer per one mole of initiating group. Generally the number average molecular weight of the halide containing polymer will be from about 500 to about 100,000, desirably from about 1000 to about 60,000, and preferably from about 3,000 to about 40,000.

The chlorine-containing monomers which are polymerized or copolymerized according to this invention are vinyl chloride and its structurally related derivatives and monomers known to copolymerize via a radical mechanism with vinyl chloride, including vinylidene chloride and 2-chloropropene. The preferred carbon atom range of each group of monomers is from 2 to 20. The copolymer can have a comonomer content from 1% up to 99%, depending on the reactivity ratios of the comonomers used.

A metal species is utilized to catalyze the initiation reaction and continue the growth of the polymer chain. Typical radical forming catalysts include metal-based catalysts, as metals and/or salts thereof. Examples of such catalysts include metals in their zero oxidation state such as copper, iron, aluminum, cadmium, zinc, samarium, chromium, molybdenum, manganese, tungsten, cobalt, nickel, rhodium, ruthenium, palladium, titanium and certain higher valence salts thereof. The preferred catalyst will be dependent upon the initiator utilized and on the reaction media (such as solvent or water) and temperature. While the initiation step (addition of the radical fragment derived from the initiator to vinyl chloride) may be achieved with all catalysts, it is preferred that the metals be in their zero oxidation state for the metal catalyzed propagation and therefore, living radical polymerization to occur. Additionally, the catalyst may be a mixture of two or more metals in their zero oxidation state, a metal salt or complex, a mixture of two or more metal salts or complexes, or a mixture of two or more metals in their zero oxidation state with metal salts or complexes. Preferred catalysts include Cu(O), copper sulfide ($Cu_2S$), copper selenide ($Cu_2Se$), copper telluride ($Cu_2Te$) copper thiophenoxide (CuSPh), copper butanethiolate (CuSBu), copper phenylacetylide CuC≡CPh, Fe(O), and titanium cyclopentadienyl dichloride ($TiCp_2Cl_2$).

It has been found that Cu(O) is able to generate polymers regardless of the nature of the halide in the initiator. When Fe(O) is used as catalyst for the polymerization of vinyl chloride, it has been found that chlorine and bromine based initiators are suitable. The preferred initiators for Fe(O) are for example, the active $(CH_3)_2(COOEt)$—Br, $CH_3$—CH (Ph)—Br, F-Ph-$SO_2$—Cl, as well as the —$CH_2$—$(CH_3)$C (COOMe)—Cl chain end of PMMA synthesized by metal catalyzed living radical polymerization. For titanium-based catalysts such as $TiCp_2Cl_2$, chlorine containing initiators such as Cl—$CH_2$—Ph—$CH_2$—Cl and $CH_3CH(CN)$—Cl or $CH_2$=CH—$CH_2$—Cl are particularly suitable.

The amount of catalyst is dependent upon the desired reaction rate. Generally, the amount of catalyst will be from about 0.01 to about 10 desirably from about 0.75 to about 4, and preferably from about 1 to about 3 moles per mole of halide in the initiator.

A ligand can optionally be included in the polymerization reaction in order to aid in the solubilization of the catalyst. The ligand used will depend specifically and uniquely on the type of catalyst, the temperature of the reaction and on the reaction media such as solvent or water. The ligand can be any organic species capable of complexing the metal in its zero oxidation state and in its higher oxidation states. For Cu-based catalysts, the ligands can include basic aromatic and aliphatic nitrogen and phosphorus containing compounds such as 2,2'-bipyridyl (bpy) and its 4,4'-alkyl substituted compounds such as 4,4'-dinonyl-2,2'-bipyridyl (bpy-9), pentamethylene diethyl triamine, (PMDETA), tris(2-aminoethyl)amine (TREN), tris[2-(dimethylamino)ethyl]amine ($Me_8$-TREN), triphenylphosphine, triphenylphosphine oxide, and combinations thereof. The foregoing ligands and 1,10-phenantroline are also appropriate for Fe-based catalysts. In addition, other ligands such as CO, acetylacetonate, or terpyridine may be used. The use of a ligand is not necessary for $TiCp_2Cl_2$ but is preferred for Cu and Fe based catalysts.

When the optional ligand is present, the mixture will usually contain from about 0.1 to about 10 moles of ligand per mole of catalyst, desirably from about 0.75 to about 3 moles of ligand per mole of catalyst, and preferably from about 1 to about 2 moles of ligand per mole of catalyst.

Additionally, various additives may optionally be utilized in the polymerization. Depending on their structure, these additives may affect the molecular weight and molecular weight distribution of the resulting polymer. Such additives can include sodium iodide, urea, $Al^iBu_3$, $Ti(OBu)_4$ and 2,6-di-tertbutyl-4-methylpyridine, with 2,6-di-tertbutyl-4-methylpyridine being preferred and may be added in a similar molar amount as the initiator.

Polymerization of the chlorine containing monomer is usually carried out in the presence of the catalyst and initiator in a closed vessel in an inert atmosphere such as nitrogen, or argon; under autogenous or artificially-induced pressure. The temperature of the polymerization can vary widely depending upon the type of initiator and/or catalyst, but is generally from about 0° C. to about 180° C., desirably from about 10° C. to about 150° C. and preferably from about 20° C. to about 130° C. It has been found that lower temperatures, i.e., 20° C.–90° C., depending on the initiator and catalyst system, lead to lower reaction rates, and higher molecular weight polymers. For solution polymerizations, the Cu(O)/bpy catalyst in conjunction with the X—$CH_2$—Ph—$CH_2$—X (X—Cl, Br, I, SCN) or $CHl_3$ and $Cl_4$ initiators are effective only at about 120° C. and above, while other chlorine, bromine and iodine based initiators generate polymers at temperatures as low as 60° C. This temperature is enough to allow the metal catalyzed reinitiation from chain such as —CH(Cl)—X (X=I, Br, Cl). Higher temperatures promote an increase in the rate of all reactions including chain transfer to monomer. Therefore, a preferred catalyst 115 will be one reactive enough to promote reinitiation from the active halide chain ends at lower temperatures or to successfully compete with chain transfer to monomer at high temperatures.

Optionally, appropriate solvents such as organic fluids or mixtures of organic fluids may be utilized. Naturally, solvents which do not interfere with the reaction are used and suitable solvents include organic solvents such as chlorobenzene, dichlorobenzene, trichlorobenzene, xylene, diphenylether, 1,2-dichloro ethane, dimethylformamide (DMF), tetrahydrofuran (THF), dioxane, dimethylsulfoxide, (DMSO) ketones or esters or any of the other solvents and plasticisers for PVC and their copolymers known in the literature and to those skilled in the art. The amount of solvent used depends on the desired solubility of the system, on the temperature and the desired pressure in the reaction vessel and can be easily determined by one skilled in the art. The amount of solvent generally ranges from about 25 to about 1000, desirably from about 50 to about 500, and preferably from about 75 to about 400 parts per 100 parts of halide containing monomer, such as vinyl chloride.

Alternatively, it has been found that the living free radical polymerization of vinyl chloride can be carried out in the absence of solvent. In such situations, the polymerization is generally carried out in bulk and the other reaction conditions set forth hereinabove are generally suitable.

Alternatively, it has also been found that the living radical polymerization of vinyl chloride can be carried out in water and in water/organic solvent mixtures using the aforementioned solvents as well as other solvents. The presence of an emulsifier such as sodium dodecylsulfate (NaDDS) is optional. The aforementioned conditions still apply. In addition, it was also found that the Cu(O)/TREN, $Cu_2Y$/TREN (Y=O, S, Se, Te), and CuX/TREN (X=Cl, Br, I, SPh, SBu, C≡CPh) catalyst and ligand systems or mixtures thereof can successfully catalyze VC polymerization initiated from iodo, bromo or chloro containing initiators to complete conversion at room temperature. The amount of the optional emulsifier depends of the desired particle size, nature of the emulsifier, and the water to monomer ratio and can be easily selected by one skilled in the art.

Depending on the desired properties of the homopolymer or copolymer, the polymerizations can be either batch, semi-batch or continuous. Mechanical agitation is desirable, but not necessary. Normal polymerization time depends on the temperature and the monomer to initiator to catalyst to ligand ratios and is from 0.5 to about 24 hours.

Subsequent to the formation of the polymer composition, solvent and excess monomer are removed, for example by evaporation, precipitation of the polymer, and the like.

In a second embodiment, in the aqueous room temperature non-metal-catalyzed polymerization of halogen containing monomers, appropriate initiators include halides of the formula RX, where R, having 1–1,000 carbon atoms, contains an activated electron withdrawing group such as a halogen, polyhalo, or perfluoroalkyl, and X—halide (where X is a good living group and X=Cl, Br, I). The halide initiator can accept one electron and then release X⁻ forming an initiating radical R.

Such electron-accepting radical precursors include, but are not limited to, various activated mono, di, tri and polyfunctional activated halides. These include α,α-dihaloalkanes, α,α,α-trihaloalkanes, perhaloalkanes, perfluoroalkyl halides, polyfluoroalkyl halides, α-haloesters, α-halonitriles, α-haloketones, benzyl halides, sulfonyl halides, imidyl halides, or combinations thereof. Additionally, any compounds having labile carbon-halide, nitrogen-halide, phosphorus-halide, silicon-halide bonds, which possess enough electron affinity to accept one electron and then release halide-anion forming radicals, are suitable for use as initiators in the present invention, and can include, for example, benzyl iodide, N-iodosuccinimide, diphenylposphinic iodide, triphenylsilyl iodide, and the like.

Generally, preferred initiators are one electron accepting radical precursors including chlorine and bromine, with iodine initiators being desirable. Haloforms, tetrahalocarbons, methylene iodide, 1-chloro-1-iodo-ethane, as well as PVC's obtained from them, act as active initiators in conjunction both with $Na_2S_2O_4$, $H_2NC(=NH)SO_2H$, which give the highest efficiency, and also $HOCH_2SO_2Na$, $HOCH_2SO_3Na$, $Na_2SO_3$, $Na_2S_2O_5$, $Na_2S_2O_3$, $CH_3SO_2Na$, $C_6H_5SO_2Na$, p-$CH_3C_6H_4SO_2Na$, $(Me_2N)_2C=C(NMe_2)_2$. It should be noted that the system sodium persulfate-sodium formate ($Na_2S_2O_8$—HCOONa, which form $CO_2^-$. radical anion) is active in radical (not living) polymerization of vinyl chloride in conjunction with only non-iodine containing halocarbon initiators —$CHCl_3$, $CHBr_3$ (FIGS. 9, 10), $CCl_4$, $CBr_4$. Whereas, in conjunction with $CHI_3$, the persulfate-formate system is not effective at all due to evolution of 12 which terminates the polymerization. Preferred initiators include iodoform, 1-chloro-1-iodoetane, and 1-iodoperfluoroalkane.

The amounts of the initiators utilized depend on the desired molecular weight of the halide containing polymer and are generally from about 5000 to about 1, desirably from about 1000 to about 10, and preferably from about 500 to about 50 of halide containing monomer per mole of initiating group. Generally the number average molecular weight of the halide containing polymer will be from about 500 to about 60,000, desirably from about 1,000 to about 40,000, and preferably from about 2,000 to about 20,000.

The vinyl halide monomers which are polymerized or copolymerized according to this invention are vinyl chloride and its structurally related derivatives, including vinylidene chloride and 2-chloropropene and monomers known to copolymerize via a radical mechanism with vinyl chloride, including one or more of acrylates, vinylidene halides, methacrylates, acrylonitrile, methacrylonitrile, vinyl halides, 2-haloalkenes, styrenes, acrylamide, methacrylamide, vinyl ketones, N-vinylpyrrolidinone, vinyl acetate, maleic acid esters, or combinations thereof. The preferred carbon atom range of each group of monomers is from 2 to 20. The copolymer can have a comonomer content from 1% up to 99%, depending on the reactivity ratios of the comonomers used.

An important component of the second embodiment is the use of a non-metallic single electron transfer species to catalyze the initiation reaction and continue the growth of the polymer chain. Typical of such catalysts are, for example, low valent sulfur salts containing $SO_2$ group and polydialkylamino-substituted unsaturated organic compounds. Examples of such catalysts include $Na_2S_2O_4$, $H_2NC(=NH)SO_2H$, $HOCH_2SO_2Na$, $HOCH_2SO_3Na$, $Na_2SO_3$, $Na_2S_2O_5$, $Na_2S_2O_3$, $CH_3SO_2Na$, $C_6H_5SO_2Na$, p-$CH_3C_6H_4SO_2Na$, $(Me_2N)_2C=C(NMe_2)_2$, and the like. The preferred catalyst will be dependent upon the initiator utilized and on the reaction media (such as solvent or water) and temperature. Preferred catalysts include sodium dithionite ($Na_2S_2O_4$) and formamidinesulfinic acid ($H_2NC(=NH)SO_2H$).

The amount of catalyst is dependent upon the desired reaction rate. Generally, the amount of catalyst will be from about 0.01 to about 4, desirably from about 0.05 to about 2, and preferably from about 0.1 to about 1 mole per mole of initiator.

A buffer compound can optionally be included in the polymerization process in order to avoid acidic decomposition of sulfur containing catalysts. The buffer used will depend specifically and uniquely on the type of catalyst, the temperature of the reaction and on the reaction media such as solvent or water. Typical buffers can include alkaline salts of inorganic and organic acids, which water solutions keep pH 8–10, such as $NaHCO_3$, $Na_2HPO_4$, $NaH_2PO_4$, $CH_3COONa$ or the potassium or ammonium salts thereof, including $KHCO_3$, $K_2HPO_4$, $KH_2PO_4$, $CH_3COOK$, $NH_4HCO_3$, $(NH_4)_2HPO_4$, $NH_4H_2PO_4$, $CH_3COONH_4$, and the like.

When the optional buffer is present, the mixture will usually contain from about 0.1 to about 5 moles of buffer per mole of catalyst, desirably from about 0.5 to about 3 moles of buffer per mole of catalyst, and preferably from about 1 to about 1.2 moles of buffer per mole of catalyst.

The presence of an electron shuttle is also optional. The shuttle allows for acceleration of the process of radical initiation and activation of dormant species by using compounds which, in reduced form are more soluble in organic phase than in water, and which in oxidized form are more soluble in water than in organic solvent. In a reduced state in the aqueous phase (having gained an electron), the compound moves into the organic phase and donates an electron to the halogen-containing initiator or dormant species. The compound then returns to the aqueous phase carrying the halide anion and leaving a radical in the organic phase. Such compounds can include 1,1'-dialkyl-4,4'-bipyridinium dihalides called alkyl viologens. Examples of such shuttles include, but are not limited to, 1,1'-dimethyl-4,4'-bipyridinium dichloride, methyl viologen ($MV^{2+}$), 1,1'-di-n-octyl-4,4'-bipyridinium dibromide, octyl viologen ($OV^{2+}$), and the like.

When the shuttle is present, the mixture will usually contain from about 0.00001 to about 1 moles of shuttle per mole of catalyst, desirably from about 0.0001 to about 0.01 moles of shuttle per mole of catalyst, and preferably from about 0.001 to about 0.005 moles of shuttle per mole of catalyst.

Additionally, various additives may optionally be utilized in the polymerization. Depending on their structure, these additives may affect the molecular weight, molecular weight distribution of the resulting polymer, catalyst stability and/or rate of polymerization. Such additives can include sodium iodide, ammonium iodide, tetrabutyl ammonium iodide, and sodium chloride. These can be added in similar amounts as the initiators.

The non-metallically catalyzed polymerization reactions described herein are normally carried out in the presence of catalyst and initiator in a closed vessel in an inert atmosphere such as nitrogen or argon, under autogenously or artificially induced pressure. The optimal temperature of the polymerization is around room temperature, namely 25° C. ±5 DC. A higher temperature can lead to fast reduction of active chain ends and a lower one is simply inconvenient due to necessity to use special cooling equipment. This can lead to higher viscosity, heterogeneity and reduced solubility of reaction components that make results less reproducible.

Appropriate solvents such as water or a mixture of water and organic solvent may be utilized. Solvents play an important role in single electron transfer. It was found that there is no reaction in the absence of water when salts are used. The higher the solvent polarity is, the more efficient is the polymerization. By this means, polar water-soluble organic solvents and good PVC solvents such as tetrahydrofuran (THF), dimethylformamide (DMF), dimethylsulfoxide (DMSO), cyclohexanone, chlorobenzene, dichlorobenzene, trichlorobenzene, xylene, diphenylether, 1,2-dichloroethane, dioxane, acetone, diethyloxalate, ethylhexyphtalate, methanol, ethanol, butanol, or combinations thereof, or any other solvent in the literature known to those skilled in the art are appropriate media for the polymerization. The amount of the solvent generally ranges from 1 to 10 parts per volume of halide containing monomer and preferably is from about 2 to about 4 parts per volume (ppv).

The presence of a surfactant is optional. Examples of the surfactants include, but are not limited to, sodium dodecylsulfate (NaDDS), hydroxypropyl methylcellulose (Methocel® F50), 72.5% hydrolyzed polyvinyl acetate (Alcotex® 72.5), polyoxyethylene(10) oleyl ether (Brij® 97), and polyoxyethylene(20) oleyl ether (Brij® 98). The amount of the optional surfactant depends on the desired particle size, nature of the surfactant and the water to monomer ratio. This can be easily selected by one skilled in the art. The amount of surfactant generally ranges from about 0.1 to about 50000 parts per million (ppm) w/w, desirably from about 1 to about 10000 ppm w/w, and preferably from about 10 to about 5000 parts per million w/w relative to halide containing monomer.

Depending on desired properties of the homopolymer or copolymer, the polymerization can be batch or semi batch, or continuous. Mechanical agitation is desirable to obtain reproducible results, but not necessary. Normal polymerization time depends on the monomer-initiator ratio and desirable polymer properties and can be from about 1 h to about 70 h.

Subsequent to the formation of the polymer composition, solvent and excess monomer is removed, for example by evaporation of the vinyl chloride and the addition of methanol to precipitate the polymer.

An advantage of the living radical polymerization process described herein is that it will produce a halogen-containing polymer, such as PVC, with controlled molecular weight, such that the molecular weight increases with the conversion of the monomer. Additionally, the living radical polymerization process will provide PVC with narrow molecular weight distribution and with the well defined chain ends, i.e. telechelics and macromonomers. Such molecular weight distribution, i.e. Mw/Mn, can be from $\leq 2.00$, $\leq 1.90$, or $\leq 1.80$ down to $\leq 1.70$, $\leq 1.60$, or even $\leq 1.50$. A molecular weight distribution of from about $\leq 1.70$ to about $\leq 1.50$ is preferred and less than 1.50 is most preferred. Since the structural defects in PVC are responsible for its low thermal stability, PVC obtained by living radical polymerization will be more stable than conventional PVC, thereby expanding the range of technological applications of PVC.

The poly(vinyl chloride) compositions described herein can be useful for many applications including plastic materials (sheeting, films, molded parts, etc.), viscosity/flow modifiers, additives for flame retardant compositions, and compatibilizers.

The following examples show ways in which the invention can be practiced, as well as comparative examples. However, the examples do not limit the invention.

TABLE 1

Polymerization of Vinyl Chloride Initiated from Various Halides and Catalyzed by Fe(0).

| Exp | Initiator | Catalyst/Ligand | [VC]:[I]:[C]:[L][a] | Time h | Conv. % | Mn | Mw/Mn | Temp ° C. | Solvent |
|---|---|---|---|---|---|---|---|---|---|
| 1 | Br—(CH$_3$)$_2$C(COOEt) | Fe(0)/Phen | 65:1:0.6:1 | 19 | 26 | 10,000 | 1.66 | 90 | oDCB |
| 2 | Br—(CH$_3$)$_2$C(COOEt) | Fe(0)/Phen | 130:1:1.2:2 | 22 | 19 | 7,000 | 1.75 | 90 | THF |
| 3 | Br—(CH$_3$)$_2$C(COOEt) | Fe(0)/Phen | 130:1:1.2:2.4 | 22 | 16 | 7,200 | 1.85 | 90 | DFM |
| 4 | Br—(CH$_3$)$_2$C(COOEt) | Fe(0)/Phen | 130:1:1.2:2 | 40 | 15 | 19,100 | 1.65 | 60 | oDCB |
| 5 | Br—(CH$_3$)$_2$C(COOEt) | Fe(0)/Phen | 130:1:1.2:2.4 | 22 | 30 | 10,200 | 1.73 | 90 | oDCB |
| 6 | Br—(CH$_3$)$_2$C(COOEt) | Fe(0)/Phen | 130:1:1.2:2.4 | 22 | 33 | 8,300 | 1.85 | 130 | oDCB |
| 7 | Br—(CH$_3$)$_2$C(COOEt) | Fe(0)/Phen | 120:1:1.2:2.4: | 20 | 42 | 9,000 | 1.75 | 90 | oDCB |
| 8 | Br—(CH$_3$)$_2$C(COOEt) | Fe(0)/Phen/Al$^i$Bu$_3$ | 130:1:1.2:2:1.2 | 22 | 10 | 12,900 | 1.59 | 90 | oDCB |
| 9 | Cl—(CH$_3$)C(COOMe)——CH$_2$—PMMA | Fe(0)/Phen | 450:1:4.5:3.5 | 22 | 35 | 8,300 | 1.73 | 90 | oDCB |
| 10 | Br—C(CH$_3$)$_2$—CO—O—Ph——Ph—OCO—C(CH$_3$)$_2$—Br | Fe(0)/Phen | 130:1:2:4 | 96 | 36 | 8,400 | 1.75 | 90 | oDCB |
| 11 | Br—CH(Ph)CH$_3$ | Fe(0)/Phen | 130:1:1.2:2 | 19 | 27 | 12,500 | 1.75 | 90 | oDCB |
| 12 | Br—CH$_2$—Ph—CH$_2$—Br | Fe(0)/Phen | 130:1:1.2:2.4 | 22 | 10 | 13,300 | 1.5 | 90 | oDCB |
| 13 | Br—CH$_2$—Ph—CH$_2$—Br | Fe(0)/Phen | 130:1:2:4 | 96 | 5 | 2,600 | 1.96 | 90 | oDCB |
| 14 | Cl—CH$_2$—Ph—CH$_2$—Cl | Fe(0)/Phen | 130:1:2:4 | 96 | 5 | 8,300 | 1.65 | 90 | oDCB |
| 15 | I—CH$_2$—Ph—CH$_2$—I | Fe(0)/Phen | 130:1:2:4 | 23 | 10 | 4,300 | 1.98 | 130 | oDCB |
| 16 | NCS—CH$_2$—Ph—CH$_2$—SCN | Fe(0)/Phen | 130:1:2:4 | 48 | 8 | 4,800 | 1.90 | 90 | oDCB |
| 17 | Cl—(CN)CHCH$_3$ | Fe(0)/Phen | 130:1:1.2:2.4 | 19 | 10 | 9,400 | 1.61 | 90 | oDCB |
| 18 | Cl—(CN)CHCH$_3$ | Fe(CO)$_5$ | 130:1:1.2 | 18 | 4 | 14,300 | 1.65 | 90 | oDCB |
| 19 | Cl—SO$_2$—Ph—F | Fe(0)/Phen | 130:1:1.2:2.4 | 18 | 22 | 7,600 | 1.82 | 90 | oDCB |

[a]Molar ratio of VC to initiator to catalyst to ligand

TABLE 2

Polymerization of Vinyl Chloride initiated from Various Halides and Catalyzed by TiCp$_2$Cl$_2$.

| Exp | Initiator | Catalyst/Additive | [VC]:[I]:[C]:[A][a)] | Time h | Conv % | Mn | Mw/Mn | Temp °C | Solvent |
|---|---|---|---|---|---|---|---|---|---|
| 20 | | TiCp$_2$Cl$_2$ | 130:0:1 | 20 | 3 | 12,000 | 1.67 | 70 | oDCB |
| 21 | Br—(CH$_3$)$_2$C—COOEt | TiCp$_2$Cl$_2$ | 130:1:1.2 | 22 | 10 | 15,000 | 1.78 | 90 | oDCB |
| 22 | Br—(CH$_3$)$_2$C—COOEt | TiCp$_2$Cl$_2$ | 130:1:1.2 | 20 | 7 | 21,400 | 1.68 | 60 | oDCB |
| 23 | Br—(CH$_3$)$_2$C—COOEt | TiCp$_2$Cl$_2$/Al$^i$Bu$_3$ | 130:1:1.2:3.6 | 17 | 60 | 3,800 | 2.10 | 90 | oDCB |
| 24 | Br—(CH$_3$)$_2$C—COOEt | TiCp$_2$Cl$_2$/Zn/bpy | 130:1:1.2:1.8:0.7 | 22 | 22 | 14,800 | 1.95 | 90 | oDCB |
| 25 | Br—(CH$_3$)$_2$C—COOEt | Ti(OBu)$_4$/Al$^i$Bu$_3$ | 130:1:1.2:3.6 | 17 | 87 | 5,300 | 1.80 | 90 | oDCB |
| 26 | Br—C(CH$_3$)$_2$—CO—O—Ph—Ph—OCO—C(CH$_3$)$_2$—Br | TiCp$_2$Cl$_2$ | 520:1:2 | 20 | 5 | 3,100 | 2.05 | 130 | oDCB |
| 27 | Br—C(CH$_3$)$_2$—OCO—Ph—C(CH$_3$)—[(Ph—OCO—C(CH$_3$)$_2$—Br]$_2$ | TiCp$_2$Cl$_2$ | 520:1:2 | 20 | 7 | 4,400 | 1.81 | 130 | oDCB |
| 28 | Br—CH$_2$—Ph—CH$_2$—Br | TiCp$_2$Cl$_2$ | 520:1:2 | 20 | 5 | 3,600 | 1.86 | 130 | oDCB |
| 29 | Cl—CH$_2$—Ph—CH$_2$—Cl | TiCp$_2$Cl$_2$ | 520:1:2 | 20 | 28 | 4,900 | 1.81 | 130 | oDCB |
| 30 | Cl—CH$_2$—Ph—CH$_2$—Cl | TiCp$_2$Cl$_2$ | 520:1:2 | 96 | 38 | 10,600 | 1.80 | 90 | oDCB |
| 31 | NCS—CH$_2$—Ph—CH$_2$—SCN | TiCp$_2$Cl$_2$ | 260:1:3.5 | 22 | 5 | 4,000 | 2.05 | 130 | oDCB |
| 32 | Cl—CH(CN)CH$_3$ | TiCp$_2$Cl$_2$ | 130:1:1.2 | 19 | 22 | 16,000 | 1.72 | 90 | oDCB |
| 33 | Br—N(CO—CH$_2$—CH$_2$—CO) | TiCp$_2$Cl$_2$ | 130:1:1.2 | 19 | 4 | 19,000 | 1.75 | 90 | oDCB |
| 34 | Cl$_3$(—NCO—)$_3$ | TiCp$_2$Cl$_2$ | 390:1:2.1 | 20 | 5 | 8,200 | 1.80 | 90 | oDCB |
| 35 | (Cl—SO$_2$—Ph)$_3$C—CH$_3$ | TiCp$_2$Cl$_2$ | 400:1:9 | 22 | 7 | 4,000 | 2.05 | 110 | oDCB |
| 36 | Cl—SO$_2$—Ph—F | TiCp$_2$Cl$_2$ | 130:1:1.2 | 19 | 22 | 12,000 | 1.65 | 90 | oDCB |

[a)] Molar ratio of VC to initiator to catalyst to additive

TABLE 3

Polymerization of Vinyl Chloride Initiated from Various Halides and Catalyzed by Cu(I).

| Exp | Initiator | Catalyst/Ligand | [VC]:[I]:[C]:[L][a)] | Time h | Mn | Mw/Mn | Conv % | Temp °C | Solvent |
|---|---|---|---|---|---|---|---|---|---|
| 37 | Br—C(CH$_3$)$_2$—CO—O—Ph—Ph—O—CO—C(CH$_3$)$_2$—Br | CuBr/Me$_6$-TREN | 260:1:4:8 | 20 | 2,500 | 1.45 | 8 | 130 | oDCB |
| 38 | Br—C(CH$_3$)$_2$—CO—O—Ph—Ph—O—CO—C(CH$_3$)$_2$—Br | CuBr/Me$_6$-TREN | 260:1:4:4 | 20 | 750 | 1.80 | 2 | 90 | oDCB |
| 39 | Cl—(CN)CHCH$_3$ | CuC≡C—Ph/bpy | 100:1:1.5:3 | 19 | 1,300 | 3.60 | 15 | 90 | DMF |
| 40 | Cl—(CN)CHCH$_3$ | CuSPh/bpy | 140:1:0.7:1.2 | 19 | 2,800 | 3.30 | 13 | 60 | DMF |
| 41 | I—CH(Cl)—CH$_3$ | CuBr/Me$_6$-TREN | 260:1:2:4 | 44 | 3,200 | 1.30 | 5 | 90 | oDCB |
| 42 | I—CH(Cl)—CH$_3$ | CuBr/Me$_6$-TREN | 520:1:4:4 | 20 | 4,100 | 1.27 | 3 | 130 | oDCB |
| 43 | I—CH(Cl)—CH$_3$ | CuBr/Me$_6$-TREN | 60:1:1:1 | 20 | 2,000 | 1.40 | 3 | 90 | oDCB |
| 44 | I—CH(Cl)—CH$_3$ | CuI/Me$_6$-TREN | 130:1:1:1 | 20 | 1,700 | 1.21 | 2 | 90 | oDCB |
| 45 | I—CH$_2$—Ph—CH$_2$—I | CuBr/Me$_6$-TREN | 520:1:8:8 | 20 | 4,400 | 1.50 | 4 | 130 | oDCB |
| 46 | NCS—CH$_2$—Ph—CH$_2$—SCN | Cu$_2$Te/bpy | 260:1:4:8 | 22 | 5,100 | 2.23 | 8 | 130 | oDCB |
| 47 | NCS—CH$_2$—Ph—CH$_2$—SCN | CuBr/Me$_6$-TREN | 520:1:4:4 | 20 | 1,000 | 1.55 | 2 | 130 | oDCB |

[a)] Molar ratio of VC to initiator to catalyst to ligand

TABLE 4

Polymerization of Vinyl Chloride Initiated from Various Halides and Catalyzed by Cu (0).

| Exp | Initiator | Catalyst/Ligand | [VC]:[I]:[C]:[L][a)] | Time, h | Conv, % | Mn | $M_w/M_n$ | Temp °C | Solvent |
|---|---|---|---|---|---|---|---|---|---|
| 48 | Cl—CH$_2$—C(CH$_2$—Cl)=CH$_2$ | Cu(0)/bpy | 200:1:4:8 | 20 | 31 | 7,700 | 1.85 | 130 | oDCB |
| 49 | Cl—CH$_2$—CH=C(CH$_3$)$_2$ | Cu(0)/bpy | 100:1:2:4 | 20 | 20 | 8,300 | 1.62 | 130 | oDCB |
| 50 | Cl—CH$_2$—CH=CH$_2$ | Cu(0)/bpy | 100:1:2:4 | 20 | 27 | 6,100 | 1.83 | 130 | oDCB |
| 51 | Cl—CH(CN)CH$_3$ | Cu(0)/bpy | 130:1:1.2:1.2 | 19 | 20 | 6,900 | 1.85 | 90 | DMF |
| 52 | Cl—CH(CN)CH$_3$ | Cu(0)/bpy | 130:1:1.2:2.4 | 19 | 12 | 7,300 | 1.93 | 130 | oDCB |
| 53 | Cl—CH$_2$—Cl | Cu(0)/bpy | 100:1:2:4 | 20 | 5 | 50,000 | 2.75 | 130 | oDCB |
| 54 | Cl—CH$_2$—Ph—CH$_2$—Cl | Cu(0)/bpy | 260:1:4:8 | 21 | 34 | 5,600 | 1.62 | 130 | oDCB |
| 55 | Cl—CH$_2$—Ph—CH$_2$—Cl | Cu(0)/bpy | 1000:1:8:16 | 20 | 18 | 22,400 | 1.53 | 130 | oDCB |
| 56 | Cl—CH$_2$—Ph—CH$_2$—Cl | Cu(0)/bpy | 60:1:4:4 | 20 | 95 | gel | — | 130 | oDCB |
| 57 | Br—(CH$_3$)$_2$C—COBr | Cu(0)/bpy | 130:1:4:8 | 22 | 12 | 17,000 | 1.90 | 90 | oDCB |
| 58 | Br—(CH$_3$)$_2$C—COOEt | Cu(0)/bpy | 130:1:1.2:1.8 | 22 | 20 | 8,100 | 1.85 | 90 | oDCB |
| 59 | Br—(CH$_3$)$_2$C—COOEt | Cu(0)/bpy/Al$^i$Bu$_3$ | 130:1:1.2:1.8:1.2 | 22 | 77 | 6,400 | 1.85 | 90 | oDCB |
| 60 | (Br—CH$_2$)$_4$Ph | Cu(0)/bpy | 125:1:8:16 | 20 | 7 | 23,700 | 1.58 | 130 | oDCB |
| 61 | Br—C(CH$_3$)$_2$—COO—Ph—C(CH$_3$)$_2$—Ph—OCO—C(CH$_3$)$_2$—Br | Cu(0)/bpy | 260:1:4:8 | 17 | 30 | 6,300 | 1.45 | 130 | oDCB |
| 62 | Br—C(CH$_3$)$_2$—COO—Ph—C(CH$_3$)$_2$—Ph—OCO—C(CH$_3$)$_2$—Br | Cu(0)/bpy | 260:1:4:8 | 65 | 42 | 11,100 | 1.72 | 90 | oDCB |
| 63 | Br—C(CH$_3$)$_2$—COO—Ph—C(CH$_3$)$_2$—Ph—OCO—C(CH$_3$)$_2$—Br | Cu(0)/bpy/NaI | 260:1:3:4.5:3 | 20 | 20 | 4,200 | 1.50 | 130 | oDCB |

TABLE 4-continued

Polymerization of Vinyl Chloride Initiated from Various Halides and Catalyzed by Cu (0).

| Exp | Initiator | Catalyst/Ligand | [VC]:[I]:[C]:[L][a)] | Time, h | Conv, % | Mn | $M_w/M_n$ | Temp °C. | Solvent |
|---|---|---|---|---|---|---|---|---|---|
| 64 | Br—C(CH$_3$)$_2$—CO—O—Ph—Ph—O—CO—C(CH$_3$)$_2$—Br | Cu(0)/PMDETA | 260:1:4:8 | 20 | 35 | gel | — | 90 | oDCB |
| 65 | Br—C(CH$_3$)$_2$—CO—O—Ph—Ph—OCO—C(CH$_3$)$_2$—Br | Cu(0)/bpy | 260:1:4:8 | 22 | 30 | 5,700 | 1.48 | 130 | oDCB |
| 66 | Br—C(CH$_3$)$_2$—OCO—Ph—C(CH$_3$)—[(Ph—OCO—C(CH$_3$)$_2$—Br]$_2$ | Cu(0)/bpy | 390:1:6:12 | 18 | 14 | 6,800 | 1.98 | 130 | oDCB |
| 67 | Br—CH(Cl)—CH$_3$ | Cu(0)/bpy | 100:1:2:4 | 20 | 40 | 6,000 | 2.30 | 130 | oDCB |
| 68 | Br—CH(Ph)CH$_3$ | Cu(0)/bpy | 130:1:2.2:3 | 66 | 26 | 6,000 | 1.75 | 130 | oDCB |
| 69 | Br—CH(Ph)CH$_3$ | Cu(0)/bpy/NaI | 130:1:2:4:2 | 24 | 26 | 4,300 | 1.70 | 130 | oDCB |
| 70 | Br—CH$_2$—Ph—CH$_2$—Br | Cu(0)/bpy | 260:1:4:8 | 20 | 43 | 11,000 | 1.63 | 130 | oDCB |
| 71 | Br—N(CO—CH$_2$—CH$_2$—CO) | Cu(0)/bpy | 130:1:2:4 | 20 | 1 | 5,600 | 1.60 | 130 | oDCB |
| 72 | I—C(CH$_3$)$_2$—CO—O—Ph—Ph—O—CO—C(CH$_3$)$_2$—I | Cu(0)/bpy | 260:1:4:8 | 20 | 38 | 6,700 | 1.47 | 130 | oDCB |
| 73 | I—C(CH$_3$)$_2$—CO—O—Ph—C(CH$_3$)$_2$—Ph—O—CO—C(CH$_3$)$_2$—I | Cu(0)/bpy | 260:1:4:8 | 21 | 28 | 7,000 | 1.60 | 90 | oDCB |
| 74 | I—C(CH$_3$)$_2$—OC—OPh—C(CH$_3$)—[(Ph—OCO—C(CH$_3$)$_2$—I]$_2$ | Cu(0)/bpy | 390:1:6:12 | 70 | 30 | 8,600 | 1.67 | 130 | oDCB |
| 75 | I—CF$_2$—(CF$_2$)$_8$—CF$_3$ | Cu(0)/bpy | 130:1:2:4 | 22 | 26 | 5,800 | 1.64 | 130 | oDCB |
| 76 | I—CH$_2$—CH=CH$_2$ | Cu(0)/bpy | 130:1:1.2:2.2 | 20 | 13.5 | 6,500 | 1.70 | 90 | oDCB |
| 77 | I—CH$_2$—CH=CH$_2$ | Cu(0)/bpy | 130:1:5:2.5 | 22 | 27 | 13,100 | 1.93 | 90 | oDCB |
| 78 | I—CH$_2$—CH=CH$_2$ | Cu(0)/bpy | 260:1:2:4 | 24 | 22 | 6,800 | 1.72 | 130 | oDCB |
| 79 | I—CH$_2$—CH=CH$_2$ | Cu(0)/bpy | 260:1:2:2 | 20 | 12 | 3,400 | 1.84 | 130 | oDCB |
| 80 | CHI$_3$ | Cu(0)/bpy | 50:1:1.5:3 | 20 | 8 | 3,300 | 1.25 | 130 | oDCB |
| 81 | CHI$_3$ | Cu(0)/bpy | 50:1:3:6 | 20 | 40 | 3,700 | 1.65 | 130 | oDCB |
| 82 | CHI$_3$ | Cu(0)/bpy | 150:1:3:6 | 20 | 19 | 4,500 | 1.35 | 130 | oDCB |
| 83 | CHI$_3$ | Cu(0)/bpy | 150:1:1.5:3 | 20 | 3 | 760 | 1.38 | 130 | oDCB |
| 84 | CHI$_3$ | Cu(0)/bpy | 150:1:6:12 | 20 | 33 | 6,100 | 1.65 | 130 | oDCB |
| 85 | CHI$_3$ | Cu(0)/bpy | 1500:1:6:12 | 20 | 7 | 17,400 | 1.40 | 130 | oDCB |
| 86 | CHI$_3$ | Cu(0)/bpy | 1500:1:12:24 | 20 | 11 | 30,000 | 1.63 | 130 | oDCB |
| 87 | CHI$_3$ | Cu(0)/bpy | 1500:1:12:24 | 20 | 1 | 11,400 | 1.55 | 90 | oDCB |
| 88 | CHI$_3$ | Cu(0)/bpy | 3100:1:12:24 | 20 | 8 | 45,000 | 1.59 | 130 | oDCB |
| 89 | CHI$_3$ | Cu(0)/TREN | 150:1:0.75:0.75 | 20 | 10 | 5,000 | 1.58 | 130 | oDCB |
| 90 | Cl$_4$ | Cu(0)/bpy | 150:1:4:8 | 20 | 2 | 2,500 | 1.45 | 130 | oDCB |
| 91 | Cl$_4$ | Cu(0)/bpy | 1000:1:8:16 | 20 | 7 | 17,400 | 1.52 | 130 | oDCB |
| 92 | I—CH(Cl)—CH$_3$ | Cu(0)/bpy | 130:1:2:4 | 67 | 28 | 3,500 | 1.75 | 130 | oDCB |
| 93 | I—CH(Cl)—CH$_3$ | Cu(0)/bpy | 130:1:2:4 | 21 | 42 | 3,900 | 1.65 | 90 | oDCB |
| 94 | I—CH(Cl)—CH$_3$ | Cu(0)/bpy | 130:1:2:4 | 44 | 36 | 8,400 | 1.55 | 60 | oDCB |
| 95 | I—CH(Cl)—CH$_3$ | Cu(0)/bpy | 520:1:2:4 | 44 | 13 | 7,700 | 1.70 | 90 | oDCB |
| 96 | I—CH(Cl)—CH$_3$ | Cu(0)/TREN | 520:1:1:1 | 20 | 28 | 7,900 | 1.65 | 130 | oDCB |
| 97 | I—CH(Cl)—CH$_3$ | Cu(0)/bpy | 100:1:2:4 | 20 | 15 | 5,200 | 1.78 | 60 | Bulk |
| 98 | I—CH(Cl)—CH$_3$ | Cu(0)/bpy | 100:1:2:4 | 20 | 22 | 5,600 | 1.77 | 60 | oDCB |
| 99 | I—CH(Cl)—CH$_3$ | Cu(0)/bpy | 100:1:2:4 | 20 | 26 | 6,200 | 1.78 | 60 | oDCB |
| 100 | I—CH(Cl)—CH$_3$ | Cu(0)/bpy | 100:1:2:4 | 20 | 14 | 6,500 | 1.69 | 60 | oDCB |
| 101 | I—CH(Cl)—CH$_3$ | Cu(0)/bpy | 100:1:2:4 | 20 | 18 | 5,400 | 1.87 | 90 | Bulk |
| 102 | I—CH(Cl)—CH$_3$ | Cu(0)/bpy | 100:1:2:4 | 20 | 45 | 7,800 | 1.67 | 90 | oDCB |
| 103 | I—CH(Cl)—CH$_3$ | Cu(0)/bpy | 100:1:2:4 | 20 | 55 | 7,300 | 1.79 | 90 | oDCB |
| 104 | I—CH(Cl)—CH$_3$ | Cu(0)/bpy | 100:1:2:4 | 20 | 52 | 8,300 | 1.68 | 90 | oDCB |
| 105 | I—CH(Cl)—CH$_3$ | Cu(0)/bpy | 100:1:2:4 | 20 | 39 | 5,500 | 1.78 | 130 | oDCB |
| 106 | I—CH(Cl)—CH$_3$ | Cu(0)/bpy | 100:1:2:4 | 20 | 38 | 6,100 | 1.77 | 130 | oDCB |
| 107 | I—CH(Cl)—CH$_3$ | Cu(0)/bpy | 100:1:2:4 | 20 | 43 | 7,100 | 1.65 | 130 | o-DCB |
| 108 | I—CH(Cl)—CH$_3$ | Cu(0)/bpy | 100:1:2:4 | 20 | 39 | 6,800 | 1.68 | 130 | o-DCB |
| 109 | I—CH(Cl)—CH$_3$ | Cu(0)/bpy/NaDDS | 100:1:2:4:0.1 | 20 | 53 | 10,600 | 1.65 | 90 | H$_2$O |
| 110 | I—CH(Cl)—CH$_3$ | Cu(0)/bpy/NaDDS | 100:1:2:4:0.5 | 20 | 47 | 8,500 | 1.69 | 90 | H$_2$O |
| 111 | I—CH(Cl)—CH$_3$ | Cu(0)/bpy/NaDDS | 100:1:2:4:1 | 20 | 41 | 7,000 | 1.75 | 90 | H$_2$O |
| 112 | I—CH(Cl)—CH$_3$ | Cu(0)/bpy/NaDDS | 100:1:2:4:2 | 20 | 43 | 7,500 | 1.66 | 90 | H$_2$O |
| 113 | I—CH(Cl)—CH$_3$ | Cu(0)/bpy/NaDDS | 100:1:2:4:4 | 20 | 45 | 7,300 | 1.72 | 90 | H$_2$O |
| 114 | I—CH(Cl)—CH$_3$ | Cu(0)/bpy/NaDDS | 100:1:2:4:0.5 | 1 | 30 | 4,700 | 1.67 | 90 | H$_2$O |
| 115 | I—CH(Cl)—CH$_3$ | Cu(0)/bpy/NaDDS | 100:1:2:4:0.5 | 2 | 34 | 6,200 | 1.71 | 90 | H$_2$O |
| 116 | I—CH(Cl)—CH$_3$ | Cu(0)/bpy/NaDDS | 100:1:2:4:0.5 | 4 | 44 | 7,100 | 1.76 | 90 | H$_2$O |
| 117 | I—CH(Cl)—CH$_3$ | Cu(0)/bpy/NaDDS | 100:1:2:4:0.5 | 8 | 49 | 8,500 | 1.72 | 90 | H$_2$O |
| 118 | I—CH$_2$—Ph—CH$_2$—I | Cu(0)/bpy | 80:1:4:8 | 20 | 35 | 7,900 | 1.61 | 130 | oDCB |
| 119 | I—CH$_2$—Ph—CH$_2$—I | Cu(0)/bpy | 130:1:4:8 | 20 | 31 | 10,300 | 1.58 | 130 | oDCB |
| 120 | I—CH$_2$—Ph—CH$_2$—I | Cu(0)/bpy | 260:1:4:8 | 20 | 19 | 8,400 | 1.55 | 130 | Et$_2$CO$_3$ |
| 121 | I—CH$_2$—Ph—CH$_2$—I | Cu(0)/Me$_6$-TREN | 260:1:4:4 | 20 | 14 | 3,000 | 1.80 | 130 | oDCB |
| 122 | I—CH$_2$—Ph—CH$_2$—I | Cu(0)/TREN | 520:1:4:4 | 20 | 37 | Gel | — | 130 | oDCB |
| 123 | I—CH$_2$—Ph—CH$_2$—I | Cu(0)/bpy | 520:1:4:8 | 20 | 5 | 3,100 | 2.05 | 130 | DMSO |
| 124 | I—CH$_2$—Ph—CH$_2$—I | Cu(0)/bpy | 130:1:2:4 | 22 | 18 | 6,100 | 2.02 | 130 | DMF |
| 125 | I—CH$_2$—Ph—CH$_2$—I | Cu(0)/bpy | 260:1:4:8 | 1 | 1.5 | 1,100 | 1.98 | 130 | oDCB |
| 126 | I—CH$_2$—Ph—CH$_2$—I | Cu(0)/bpy | 260:1:4:8 | 2 | 6.6 | 4,100 | 1.65 | 130 | oDCB |
| 127 | I—CH$_2$—Ph—CH$_2$—I | Cu(0)/bpy | 260:1:4:8 | 4 | 11 | 7,600 | 1.48 | 130 | oDCB |
| 128 | I—CH$_2$—Ph—CH$_2$—I | Cu(0)/bpy | 260:1:4:8 | 7 | 13.4 | 8,300 | 1.46 | 130 | oDCB |
| 129 | I—CH$_2$—Ph—CH$_2$—I | Cu(0)/bpy | 260:1:4:8 | 13 | 17.5 | 10,400 | 1.48 | 130 | oDCB |
| 130 | I—CH$_2$—Ph—CH$_2$—I | Cu(0)/bpy | 520:1:4:8 | 2 | 2.2 | 2,100 | 2.10 | 130 | oDCB |
| 131 | I—CH$_2$—Ph—CH$_2$—I | Cu(0)/bpy | 520:1:4:8 | 5 | 7.5 | 7,019 | 1.49 | 130 | oDCB |

TABLE 4-continued

Polymerization of Vinyl Chloride Initiated from Various Halides and Catalyzed by Cu (0).

| Exp | Initiator | Catalyst/Ligand | [VC]:[I]:[C]:[L][a)] | Time, h | Conv, % | Mn | $M_w/M_n$ | Temp °C. | Solvent |
|---|---|---|---|---|---|---|---|---|---|
| 132 | I—CH$_2$—Ph—CH$_2$—I | Cu(0)/bpy | 520:1:4:8 | 11 | 11 | 11,000 | 1.45 | 130 | oDCB |
| 133 | I—CH$_2$—Ph—CH$_2$—I | Cu(0)/bpy/Al$^i$Bu$_3$ | 520:1:4:8:2.6 | 22 | 20 | 12,700 | 1.59 | 130 | oDCB |
| 134 | I—CH$_2$—Ph—CH$_2$—I | Cu(0)/bpy | 520:1:8:8 | 21 | 20 | 29,600 | 1.89 | 130 | oDCB |
| 135 | I—CH$_2$—Ph—CH$_2$—I | Cu(0)/bpy | 520:1:16:8 | 21 | 43 | gel | — | 130 | oDCB |
| 136 | I—CH$_2$—Ph—CH$_2$—I | Cu(0)/bpy/DtBP | 1000:1:4:8:8 | 20 | 16 | 14,200 | 1.49 | 130 | oDCB |
| 137 | I—CH$_2$—Ph—CH$_2$—I | Cu(0)/bpy | 1000:1:16:32 | 20 | 17 | 16,400 | 1.63 | 130 | oDCB |
| 138 | I—CH$_2$—Ph—CH$_2$—I | Cu(0)/bpy | 1000:1:8:16 | 20 | 9 | 15,500 | 1.59 | 130 | oDCB |
| 137 | I—CH$_2$—Ph—CH$_2$—I | Cu(0)/bpy | 260:1:4:8 | 23 | 20 | 21,000 | 1.60 | 130 | oDCB |
| 139 | NCS—CH$_2$—Ph—CH$_2$—SCN | Cu(0)/bpy | 260:1:4:8 | 20 | 26 | 11,000 | 3.14 | 130 | oDCB |

[a)] Molar ratio of VC to initiator to catalyst to ligand.

TABLE 5

Polymerization of Vinyl Chloride catalyzed by Various Metal Derivatives and Metals in their Zero Oxidation State.

| Exp | Initiator | Catalyst/Ligand | [VC]:[I]:[C]:[L][a)] | Time, h | Mn | Conv % | $M_w/M_n$ | Temp °C. | Solvent |
|---|---|---|---|---|---|---|---|---|---|
| 140 | Br—(CH$_3$)$_2$C—COOEt | Al(0)/bpy | 130:1:1.3:1.1 | 17 | 8,200 | 5 | 1.61 | 90 | xylene |
| 141 | Br—(CH$_3$)$_2$C—COOEt | Al$^i$Bu$_3$ | 130:1:1.14 | 19 | 12,800 | 30 | 1.68 | 90 | oDCB |
| 142 | Br—(CH$_3$)$_2$C—COOEt | Cd(0)/bpy | 130:1:1.2:1.1 | 22 | 14,000 | 14 | 1.65 | 90 | oDCB |
| 143 | Br—(CH$_3$)$_2$C—COOEt | Sm(0)/bpy | 130:1:1.2:1.4 | 19 | 11,400 | 11 | 1.64 | 90 | dioxane |
| 144 | Br—(CH$_3$)$_2$C—COOEt | Zn(0)/bpy | 130:1:1.2:1.6 | 20 | 14,400 | 15 | 1.68 | 90 | oDCB |
| 145 | Cl—CH(CN)—CH$_3$ | Cr(CO)$_6$ | 130:1:1.2 | 18 | 18,400 | 9 | 1.57 | 90 | oDCB |

[a)] Molar ratio of VC to initiator to catalyst to ligand.

TABLE 6

Selected Examples of the Room Temperature Polymerization of Vinyl Chloride Catalyzed by Copper Catalysts in Water, Solvents and Mixtures Thereof.

| Exp | Initiator | Catalyst/Ligand | [VC]/[I]/[C]/[L]/[S][a)] | Mn | Mw/Mn | Time h | Conv. % | Temp °C. | Solvent |
|---|---|---|---|---|---|---|---|---|---|
| 146 | CH$_3$—CH(Cl)—I | Cu(0)/NH$_4$OH | 100/1/1/2 | 8,200 | 1.75 | 48 | 30 | 20 | NH$_4$OH |
| 147 | CH$_3$—CH(Cl)—I | Cu(0)/TREN | 100/1/2/4 | 13,500 | 1.60 | 20 | 67 | 20 | o-DCB |
| 148 | CH$_3$—CH(Cl)—I | Cu(0)/TREN | 100/1/2/4 | 5,500 | 1.61 | 20 | 45 | 20 | H$_2$O |
| 149 | CH$_3$—CH(Cl)—I | Cu(0)/TREN | 100/1/2/4 | 3,700 | 1.47 | 20 | 11 | 20 | THF |
| 150 | CH$_3$—CH(Cl)—I | Cu(0)/TREN | 100/1/2/4 | 4,700 | 1.57 | 16 | 26 | 20 | DMF |
| 151 | CH$_3$—CH(Cl)—I | Cu(0)/TREN | 100/1/2/2 | 11,500 | 1.60 | 20 | 75 | 20 | o-DCB |
| 152 | CH$_3$—CH(Cl)—I | Cu(0)/TREN | 100/1/1/2 | 7,000 | 1.65 | 20 | 65 | 20 | o-DCB |
| 153 | CH$_3$—CH(Cl)—I | Cu(0)/TREN/Brij-97 | 100/1/2/4/0.5 | 5,500 | 1.91 | 20 | 54 | 20 | H$_2$O |
| 154 | CH$_3$—CH(Cl)—I | Cu(0)/TREN/NaDDS | 100/1/2/4/0.5 | 13,200 | 1.54 | 20 | 95 | 20 | H$_2$O |
| 155 | CH$_3$—CH(Cl)—I | Cu(0)/TREN/NaDDS | 100/1/2/4/0.5 | 2,600 | 1.91 | 1 | 8 | 20 | H$_2$O |
| 156 | CH$_3$—CH(Cl)—I | Cu(0)/TREN/NaDDS | 100/1/2/4/0.5 | 4,350 | 1.65 | 2 | 27 | 20 | H$_2$O |
| 157 | CH$_3$—CH(Cl)—I | Cu(0)/TREN/NaDDS | 100/1/2/4/0.5 | 6,440 | 1.56 | 4 | 55 | 20 | H$_2$O |
| 158 | CH$_3$—CH(Cl)—I | Cu(0)/TREN/NaDDS | 100/1/2/4/0.5 | 8,300 | 1.47 | 8 | 62 | 20 | H$_2$O |
| 159 | CH$_3$—CH(Cl)—I | Cu(0)/TREN/NaDDS | 500/1/2/4/0.5 | 24,000 | 1.60 | 48 | 51 | 20 | H$_2$O |
| 160 | CH$_3$—CH(Cl)—I | Cu$_2$O/TREN/NaDDS | 100/1/2/4/0.5 | 12,500 | 2.43 | 20 | 81 | 25 | H$_2$O |
| 161 | CH$_3$—CH(Cl)—I | Cu$_2$S/TREN/NaDDS | 100/1/2/4/0.5 | 3,700 | 1.57 | 20 | 40 | 25 | H$_2$O |
| 162 | CH$_3$—CH(Cl)—I | Cu$_2$Se/TREN/NaDDS | 100/1/2/4/0.5 | 6,800 | 1.56 | 20 | 84 | 25 | H$_2$O |
| 163 | CH$_3$—CH(Cl)—I | Cu$_2$Te/Cu(0)/TREN/NaDDS | 100/1/1/1/4/0.5 | 2,900 | 2.01 | 15 | 35 | 25 | H$_2$O |
| 164 | CH$_3$—CH(Cl)=I | Cu$_2$Te/TREN/ | 100/1/2/4 | 5,500 | 1.81 | 15 | 44 | 25 | H$_2$O |
| 165 | CH$_3$—CH(Cl)—I | Cu$_2$Te/TREN/Brij97 | 100/1/2/4/0.5 | 6,500 | 1.72 | 17 | 88 | 25 | H$_2$O |
| 166 | CH$_3$—CH(Cl)—I | Cu$_2$Te/TREN/Brij98 | 100/1/2/4/0.5 | 8,600 | 1.75 | 17 | 98 | 25 | H$_2$O |
| 167 | CH$_3$—CH(Cl)—I | Cu$_2$Te/TREN/NaDDS | 100/1/2/4/2.5 | 6,700 | 2.10 | 17 | 92 | 25 | H$_2$O |
| 168 | CH$_3$—CH(Cl)—I | Cu$_2$Te/TREN/NaDDS | 100/1/2/4/1 | 8,100 | 1.68 | 17 | 96 | 25 | H$_2$O |
| 169 | CH$_3$—CH(Cl)—I | Cu$_2$Te/TREN/NaDDS | 100/1/2/4/0.5 | 8,600 | 1.58 | 20 | 96 | 25 | H$_2$O |
| 170 | CH$_3$—CH(Cl)—I | Cu$_2$Te/TREN/NaDDS | 100/1/2/4/0.5 | 7,900 | 2.14 | 14 | 93 | 25 | H$_2$O |
| 171 | CH$_3$—CH(Cl)—I | Cu$_2$Te/TREN/NaDDS | 100/1/1/2/0.5 | 5,900 | 1.75 | 17 | 76 | 25 | H$_2$O |
| 172 | CH$_3$—CH(Cl)—I | Cu$_2$Te/TREN/NaDDS | 100/1/2/4/0.1 | 5,500 | 1.76 | 17 | 69 | 25 | H$_2$O |
| 173 | CH$_3$—CH(Cl)—I | CuBr/TREN/Brij 98 | 100/1/0.5/1/0.5 | 4,100 | 1.88 | 16 | 31 | 25 | H$_2$O |
| 174 | CH$_3$—CH(Cl)—I | CuCl/TREN/Brij 98 | 100/1/1/1.5/0.5 | 8,500 | 1.86 | 48 | 73 | 20 | H$_2$O |
| 175 | CH$_3$—CH(Cl)—I | CuCl/TREN/Brij-97 | 100/1/2/4/0.5 | 19,700 | 2.02 | 20 | 84 | 20 | H$_2$O |
| 176 | CH$_3$—CH(Cl)—I | CuCl/TREN/NaDDS | 100/1/2/4/0.5 | 15,500 | 2.20 | 20 | 67 | 20 | H$_2$O |
| 177 | CH$_3$—CH(Cl)—I | CuI/TREN/Brij-97 | 100/1/2/4/0.5 | 20,800 | 1.97 | 20 | 13 | 20 | H$_2$O |
| 178 | CH$_3$—CH(Cl)—I | CuSPh/TREN/NaDDS | 100/1/2/4 | 5500 | 1.80 | 18 | 60 | 25 | H$_2$O |
| 179 | CHI$_3$ | Cu(0)/PMDETA/NaDDS | 100/1/2/4 | 3500 | 1.59 | 21 | 18 | 25 | H$_2$O |

TABLE 6-continued

Selected Examples of the Room Temperature Polymerization of Vinyl Chloride Catalyzed by Copper Catalysts in Water, Solvents and Mixtures Thereof.

| Exp | Initiator | Catalyst/Ligand | [VC]/[I]/[C]/[L]/[S][a)] | Mn | Mw/Mn | Time h | Conv. % | Temp °C. | Solvent |
|---|---|---|---|---|---|---|---|---|---|
| 180 | $CHI_3$ | Cu(0)/TREN/ | 100/1/2/4 | 8330 | 5.32 | 87 | 70 | 25 | MeOH |
| 181 | $CHI_3$ | Cu(0)/TREN/$(CH_3)_3NC_{16}H_{33}Cl$ | 100/1/2/4/0.5 | 1,000 | 1.47 | 13 | 5 | 25 | $H_2O$ |
| 182 | $CHI_3$ | Cu(0)/TREN/NaDDS | 1000/1/100/100/5 | 25,000 | 2.20 | 16 | 23 | 25 | $H_2O$ |
| 183 | $CHI_3$ | Cu(0)/TREN/NaDDS | 1000/1/100/100/5 | 36,000 | 3.66 | 87 | 65 | 25 | $H_2O$ |
| 184 | $CHI_3$ | Cu(0)/TREN/NaDDS | 800/1/30/30/4 | 43,000 | 2.29 | 66 | 90 | 25 | $H_2O$ |
| 185 | $CHI_3$ | Cu(0)/TREN/NaDDS | 800/1/15/15/4 | 33,500 | 2.44 | 66 | 60 | 25 | $H_2O$ |
| 186 | $CHI_3$ | Cu(0)/TREN/NaDDS | 200/1/4/8/2 | 14,900 | 1.63 | 20 | 63 | 20 | $H_2O$ |
| 187 | $CHI_3$ | Cu(0)/TREN/NaDDS | 100/1/8/8/0.5 | 10,600 | 1.57 | 13 | 94 | 25 | $H_2O$ |
| 188 | $CHI_3$ | Cu(0)/TREN/NaDDS | 300/1/6/9/1.5 | 5,800 | 1.77 | 16 | 19 | 25 | MeOH |
| 189 | $CHI_3$ | Cu(0)/TREN/NaDDS | 100/1/4/4/0.5 | 8,400 | 1.72 | 17 | 88 | 25 | $H_2O$ |
| 190 | $CHI_3$ | Cu(0)/TREN/NaDDS | 100/1/2/4/0.5 | 1,300 | 1.22 | 17 | 8 | 25 | MeOH |
| 191 | $CHI_3$ | Cu(0)/TREN/NaDDS | 100/1/2/4/0.5 | 1100 | 1.55 | 1 | 10 | 25 | $H_2O$ |
| 192 | $CHI_3$ | Cu(0)/TREN/NaDDS | 100/1/2/4/0.5 | 1358 | 1.58 | 2 | 20 | 25 | $H_2O$ |
| 193 | $CHI_3$ | Cu(0)/TREN/NaDDS | 100/1/2/4/0.5 | 1728 | 1.58 | 4 | 25 | 25 | $H_2O$ |
| 194 | $CHI_3$ | Cu(0)/TREN/NaDDS | 100/1/2/4/0.5 | 1,970 | 1.56 | 7 | 28 | 25 | $H_2O$ |
| 195 | $CHI_3$ | Cu(0)/TREN/NaDDS | 100/1/2/4/0.5 | 2,800 | 1.54 | 14 | 39 | 25 | $H_2O$ |
| 196 | $CHI_3$ | Cu(0)/TREN/NaDDS | 100/1/2/4/0.5 | 5500 | 1.57 | 24 | 69 | 25 | $H_2O$ |
| 197 | $CHI_3$ | Cu(0)/TREN/NaDDS | 100/1/2/4/0.5 | 8400 | 1.81 | 62 | 99 | 25 | $H_2O$ |
| 198 | $CHI_3$ | Cu(0)/TREN/NaDDS | 100/1/2/4/0.5 | 7,263 | 1.79 | 37 | 93 | 25 | $H_2O$ |
| 199 | $CHI_3$ | Cu(0)/TREN/NaDDS | 100/1/2/4/0.5 | 8,100 | 1.83 | 50 | 99 | 25 | $H_2O$ |
| 200 | $CHI_3$ | Cu(0)/TREN/NaDDS | 100/1/2/4/0.5 | 9,300 | 1.70 | 16 | 31 | 25 | Acetone |
| 201 | $CHI_3$ | Cu(0)/TREN/NaDDS | 100/1/2/4/0.5 | 10,500 | 1.80 | 15 | 60 | 25 | EtOAc |
| 202 | $CHI_3$ | Cu(0)/TREN/NaDDS | 100/1/2/4/0.5 | 8293 | 1.80 | 41 | 99 | 25 | $H_2O$ |
| 203 | $CHI_3$ | Cu(0)/TREN/NaDDS | 100/1/2/4/0.5 | 7980 | 1.74 | 30 | 94 | 25 | $H_2O$ |
| 204 | $CHI_3$ | Cu(0)/TREN/NaDDS | 800/1/6/6/0.5 | 6,900 | 1.77 | 13 | 7 | 25 | $H_2O$ |
| 205 | $CHI_3$ | Cu(0)/TREN/NaDDS | 100/1/2/4/0.25 | 9,650 | 2.28 | 68 | 88 | 25 | 1/1 MeOH/$H_2O$ |
| 206 | $CHI_3$ | Cu(0)/TREN/NaDDS | 100/1/2/4/0.25 | 13,000 | 1.91 | 68 | 96 | 25 | 1/1 THF/$H_2O$ |
| 207 | $CHI_3$ | Cu(0)/TREN/NaDDS | 100/1/2/4/0.25 | 11,400 | 1.57 | 15 | 96 | 25 | 1/1 THF/$H_2O$ |
| 208 | $CHI_3$ | Cu(0)/TREN/NaDDS | 100/1/1/2/0.5 | 2,600 | 1.37 | 17 | 35 | 25 | $H_2O$ |
| 209 | $CHI_3$ | Cu(0)/TREN/NaDDS | 100/1/0.5/1/0.5 | 1,700 | 1.35 | 17 | 26 | 25 | $H_2O$ |
| 210 | $CHI_3$ | Cu(0)/TREN/NaDDS | 100/1/0.5/1/0.5 | 5700 | 1.76 | 87 | 87 | 25 | $H_2O$ |
| 211 | $CHI_3$ | Cu(0)/TREN/THF | 100/1/2/4/0 | 11,100 | 1.55 | 15 | 98 | 25 | 1/1 THF/$H_2O$ |
| 212 | $CHI_3$ | $Cu_2Te$/Cu(0)/TREN/NaDDS | 100/1/1/1/4/0.5 | 5,400 | 1.45 | 15 | 65 | 25 | $H_2O$ |
| 213 | $CHI_3$ | $Cu_2Te$/CuBr/TREN/Brij98/NaDDS | 100/1/1/1/4/0.25/0.25 | 11,200 | 1.58 | 14 | 99 | 25 | THF/$H_2O$ 1/1 |
| 214 | $CHI_3$ | $Cu_2Te$/TREN/NaDDS | 100/1/8/8/0.5 | 8,200 | 1.75 | 14 | 99 | 25 | $H_2O$ |
| 215 | $CHI_3$ | $Cu_2Te$/TREN/NaDDS | 100/1/6/6/0.5 | 2,600 | 1.53 | 14 | 54 | 25 | $H_2O$ |
| 216 | $CHI_3$ | $Cu_2Te$/TREN/NaDDS | 100/1/4/4/0.5 | 8,000 | 1.78 | 14 | 98 | 25 | $H_2O$ |
| 217 | $CHI_3$ | $Cu_2Te$/TREN/NaDDS | 100/1/2/4/0.5 | 5,900 | 1.55 | 13 | 80 | 25 | $H_2O$ |
| 218 | $CHI_3$ | $Cu_2Te$/TREN/NaDDS | 100/1/2/4/0.3 | 11,600 | 1.53 | 14 | 99 | 25 | THF/$H_2O$ 1/2 |
| 219 | $CHI_3$ | $Cu_2Te$/TREN/NaDDS | 100/1/2/4/0.25 | 6100 | 1.59 | 14 | 82 | 25 | o-DCB/$H_2O$ 1/1 |
| 220 | $CHI_3$ | $Cu_2Te$/TREN/NaDDS | 100/1/1/2/0.5 | 3,300 | 1.38 | 15 | 45 | 25 | $H_2O$ |
| 221 | $CHI_3$ | $Cu_2Te$/TREN/NaDDS | 100/1/1/2/0.5 | 1192 | 1.70 | 2 | 14 | 25 | $H_2O$ |
| 222 | $CHI_3$ | $Cu_2Te$/TREN/NaDDS | 100/1/1/2/0.5 | 2585 | 1.57 | 4 | 38 | 25 | $H_2O$ |
| 223 | $CHI_3$ | $Cu_2Te$/TREN/NaDDS | 100/1/1/2/0.5 | 7883 | 1.82 | 24 | 99 | 25 | $H_2O$ |
| 224 | $CHI_3$ | $Cu_2Te$/TREN/NaDDS | 100/1/0.5/1/0.5 | 5,000 | 1.45 | 64 | 66 | 25 | $H_2O$ |
| 225 | $CHI_3$ | $Cu_2Te$/TREN/NaDDS | 100/1/0.1/0.5/0.5 | 850 | 1.43 | 64 | 17 | 25 | $H_2O$ |
| 226 | $CHI_3$ | $Cu_2Te$/TREN/NaDDS | 100/1/0.1/0.2/0.5 | 920 | 1.42 | 64 | 11 | 25 | $H_2O$ |
| 227 | $CHI_3$ | $Cu_2Te$/TREN/NaDDS | 100/1/0.05/0.1/0.5 | 670 | 1.30 | 64 | 2 | 25 | $H_2O$ |
| 228 | $CF_3$—$(CF_2)_9$—I | Cu(0)/TREN/Brij-97 | 100/1/2/4/0.5 | 5,900 | 1.66 | 20 | 64 | 20 | $H_2O$ |
| 229 | $CH_2$=CH—$CH_2$—I | Cu(0)/bpy | 100/1/2/4 | 12,000 | 1.88 | 20 | 5 | 20 | o-DCB |
| 230 | $BrC(CH_3)_2$—COOPh—Ph—OCO—$C(CH_3)_2Br$ | Cu(0)/TREN/NaDDS | 200/1/4/8/1 | 65,000 | 1.92 | 20 | 61 | 20 | $H_2O$ |
| 231 | $CH_3C[Ph$—OCO—$C(CH_3)_2Br]_3$ | Cu(0)/TREN/NaDDS | 300/1/3/4.5 | 65,000 | 1.70 | 20 | 18 | 20 | $H_2O$ |
| 232 | Cl—$CH_2$—Ph—$CH_2$—Cl | CuCl/TREN/Brij 97 | 50/1/2/3/0.5 | 62,300 | 1.95 | 20 | 56 | 20 | H2O |
| 233 | I—$CH_2$—Ph—$CH_2$—I | CuCl/TREN/NaDDS | 260/1/4/8/1.3 | 22,700 | 1.55 | 20 | 13 | 20 | $H_2O$ |
| 234 | Ph—CO—O—O—CO—Ph | CuCl/TREN/Brij 97 | 100/1/1.5/1 | 53,100 | 1.99 | 20 | 62 | 20 | $H_2O$ |
| 235 | PVC, Mn = 5100, Mw/Mn = 1.6 | Cu(0)/TREN/NaDDS | 740/1/2/4/0.5 | 29,800 | 2.62 | 20 | 52 | 20 | $H_2O$ |
| 236 | PVC, Mn = 22,000, Mw/Mn =2.2 | Cu(0)/TREN/NaDDS | 1440/1/10/20 | 55,700 | 2.94 | 20 | 20 | 20 | $H_2O$ |

[a)]Molar ratio of VC to initiator to catalyst to ligand to surfactan

TABLE 7

Room temperature Na$_2$S$_2$O$_4$-mediated LRP of VC initiated with iodoform in H$_2$O/THF

| Exp | Initator | Catalyst/Buffer | Electron Shuttle | Surfactant | [VC]/[I]/[C]/[ES]/[B]/[S]$^{a)}$ | Mn | Mw/Mn | Time (h) | Conv (%) | Solvent |
|---|---|---|---|---|---|---|---|---|---|---|
| 1 | CHI$_3$ | Na$_2$S$_2$O$_4$/NaHCO$_3$ | — | — | 200/1/2/0/2.2/0 | 1,017 | 2.442 | 7 | 12.27 | 2/1 H$_2$O/THF |
| 2 | CHI$_3$ | Na$_2$S$_2$O$_4$/NaHCO$_3$ | — | — | 200/1/2/0/2.2/0 | 3,106 | 1.505 | 8 | 16.01 | 2/1 H$_2$O/THF |
| 3 | CHI$_3$ | Na$_2$S$_2$O$_4$/NaHCO$_3$ | — | — | 200/1/2/0/2.2/0 | 3,018 | 1.608 | 13 | 24.54 | 2/1 H$_2$O/THF |
| 4 | CHI$_3$ | Na$_2$S$_2$O$_4$/NaHCO$_3$ | — | — | 200/1/2/0/2.2/0 | 4,033 | 1.565 | 15 | 30.84 | 2/1 H$_2$O/THF |
| 5 | CHI$_3$ | Na$_2$S$_2$O$_4$/NaHCO$_3$ | — | — | 200/1/2/0/2.2/0 | 4,688 | 1.499 | 16 | 35.40 | 2/1 H$_2$O/THF |
| 6 | CHI$_3$ | Na$_2$S$_2$O$_4$/NaHCO$_3$ | — | — | 200/1/2/0/2.2/0 | 4,492 | 1.573 | 18 | 39.54 | 2/1 H$_2$O/THF |
| 7 | CHI$_3$ | Na$_2$S$_2$O$_4$/NaHCO$_3$ | — | — | 200/1/2/0/2.2/0 | 5,841 | 1.482 | 20 | 46.20 | 2/1 H$_2$O/THF |
| 8 | CHI$_3$ | Na$_2$S$_2$O$_4$/NaHCO$_3$ | — | — | 200/1/2/0/2.2/0 | 7,590 | 1.476 | 21 | 50.88 | 2/1 H$_2$O/THF |
| 9 | CHI$_3$ | Na$_2$S$_2$O$_4$/NaHCO$_3$ | — | — | 200/1/2/0/2.2/0 | 7,954 | 1.485 | 22 | 54.15 | 2/1 H$_2$O/THF |
| 10 | CHI$_3$ | Na$_2$S$_2$O$_4$/NaHCO$_3$ | — | — | 200/1/2/0/2.2/0 | 6,758 | 1.489 | 23 | 55.78 | 2/1 H$_2$O/THF |
| 11 | CHI$_3$ | Na$_2$S$_2$O$_4$/NaHCO$_3$ | — | — | 200/1/2/0/2.2/0 | 7,301 | 1.471 | 24 | 57.75 | 2/1 H$_2$O/THF |
| 12 | CHI$_3$ | Na$_2$S$_2$O$_4$/NaHCO$_3$ | — | — | 200/1/2/0/2.2/0 | 8,072 | 1.469 | 27 | 61.89 | 2/1 H$_2$O/THF |
| 13 | CHI$_3$ | Na$_2$S$_2$O$_4$/NaHCO$_3$ | — | — | 200/1/2/0/2.2/0 | 8,652 | 1.467 | 30 | 64.89 | 2/1 H$_2$O/THF |
| 14 | CHI$_3$ | Na$_2$S$_2$O$_4$/NaHCO$_3$ | — | — | 200/1/2/0/2.2/0 | 8,195 | 1.465 | 33 | 66.06 | 2/1 H$_2$O/THF |
| 15 | CHI$_3$ | Na$_2$S$_2$O$_4$/NaHCO$_3$ | — | — | 200/1/2/0/2.2/0 | 8,650 | 1.467 | 38 | 68.60 | 2/1 H$_2$O/THF |
| 16 | CHI$_3$ | Na$_2$S$_2$O$_4$/NaHCO$_3$ | — | — | 200/1/2/0/2.2/0 | 8,920 | 1.474 | 45 | 73.72 | 2/1 H$_2$O/THF |
| 17 | CHI$_3$ | Na$_2$S$_2$O$_4$/NaHCO$_3$ | — | — | 200/1/2/0/2.2/0 | 9,068 | 1.505 | 51 | 76.09 | 2/1 H$_2$O/THF |
| 18 | CHI$_3$ | Na$_2$S$_2$O$_4$/NaHCO$_3$ | — | — | 200/1/2/0/2.2/0 | 9,977 | 1.479 | 63 | 77.70 | 2/1 H$_2$O/THF |
| 19 | CHI$_3$ | Na$_2$S$_2$O$_4$/NaHCO$_3$ | — | — | 200/1/2/0/2.2/0 | 8,974 | 1.509 | 66 | 80.95 | 2/1 H$_2$O/THF |
| 20 | CHI$_3$ | Na$_2$S$_2$O$_4$/NaHCO$_3$ | — | — | 200/1/2/0/2.2/0 | 9,654 | 1.500 | 75 | 80.51 | 2/1 H$_2$O/THF |
| 21 | CHI$_3$ | Na$_2$S$_2$O$_4$/NaHCO$_3$ | — | — | 200/1/4/0/2.2/0 | 10,167 | 1.578 | 45 | 79.96 | 2/1 H$_2$O/THF |
| 22 | CHI$_3$ | Na$_2$S$_2$O$_4$/NaHCO$_3$ | — | — | 200/1/2/0/4/0 | 10,348 | 1.474 | 63 | 77.61 | 2/1 H$_2$O/THF |
| 23 | CHI$_3$ | Na$_2$S$_2$O$_4$ | — | — | 200/1/2/0/0/0 | 1,430 | 1.870 | 63 | 7.64 | 2/1 H$_2$O/THF |
| 24 | CHI$_3$ | Na$_2$S$_2$O$_4$/NaHCO$_3$ | — | — | 200/1/2/0/2.2/0 | 9,653 | 1.460 | 63 | 75.11 | 7/3 H$_2$O/THF |

$^{a)}$Ratio [VC]/[initiator]/[catalyst]/[electron shuttle]/[buffer]/[surfactant] mol/mol/mol/mol/mol/ppm w/w to monomer

TABLE 8

Room Temperature Na$_2$S$_2$O$_4$-mediated LRP of VC Initiated with Iodoform in H$_2$O/THF in the presence of surfactant Brij ® 98.

| Exp | Initator | Catalyst/Buffer | Electron Shuttle | Surfactant | [VC]/[I]/[C]/[ES]/[B]/[S]$^{a)}$ | Mn | Mw/Mn | Time (h) | Conv (%) | Solvent |
|---|---|---|---|---|---|---|---|---|---|---|
| 25 | CHI$_3$ | Na$_2$S$_2$O$_4$/NaHCO$_3$ | — | Brij ® 98 | 200/1/2/0/2.2/2180 | 7,886 | 1.524 | 24 | 69.07 | 2/1 H$_2$O/THF |
| 26 | CHI$_3$ | Na$_2$S$_2$O$_4$/NaHCO$_3$ | — | Brij ® 98 | 200/1/2/0/2.2/2180 | 10,006 | 1.479 | 45 | 79.94 | 2/1 H$_2$O/THF |
| 27 | CHI$_3$ | Na$_2$S$_2$O$_4$/NaHCO$_3$ | — | Brij ® 98 | 200/1/2/0/2.2/2180 | 2,282 | 2.328 | 7 | 18.18 | 7/3 H$_2$O/THF |
| 28 | CHI$_3$ | Na$_2$S$_2$O$_4$/NaHCO$_3$ | — | Brij ® 98 | 200/1/2/0/2.2/2180 | 2,312 | 2.428 | 9 | 18.87 | 7/3 H$_2$O/THF |
| 29 | CHI$_3$ | Na$_2$S$_2$O$_4$/NaHCO$_3$ | — | Brij ® 98 | 200/1/2/0/2.2/2180 | 3,769 | 1.791 | 14 | 27.24 | 7/3 H$_2$O/THF |
| 30 | CHI$_3$ | Na$_2$S$_2$O$_4$/NaHCO$_3$ | — | Brij ® 98 | 200/1/2/0/2.2/2180 | 7,120 | 1.508 | 15 | 56.53 | 7/3 H$_2$O/THF |

TABLE 8-continued

Room Temperature Na$_2$S$_2$O$_4$-mediated LRP of VC Initiated with
Iodoform in H$_2$O/THF in the presence of surfactant Brij ® 98.

| Exp | Initator | Catalyst/ Buffer | Electron Shuttle | Surfactant | [VC]/[I]/[C]/[ES]/ [B]/[S]$^{a)}$ | Mn | Mw/Mn | Time (h) | Conv (%) | Solvent |
|---|---|---|---|---|---|---|---|---|---|---|
| 31 | CHI$_3$ | Na$_2$S$_2$O$_4$/ NaHCO$_3$ | — | Brij ® 98 | 200/1/2/0/ 2.2/2180 | 4,562 | 1.642 | 15 | 35.19 | 7/3 H$_2$O/THF |
| 32 | CHI$_3$ | Na$_2$S$_2$O$_4$/ NaHCO$_3$ | — | Brij ® 98 | 200/1/2/0/ 2.2/2180 | 7,165 | 1.523 | 16 | 52.41 | 7/3 H$_2$O/THF |
| 33 | CHI$_3$ | Na$_2$S$_2$O$_4$/ NaHCO$_3$ | — | Brij ® 98 | 200/1/2/0/ 2.2/2180 | 8,639 | 1.486 | 16 | 62.08 | 7/3 H$_2$O/THF |
| 34 | CHI$_3$ | Na$_2$S$_2$O$_4$/ NaHCO$_3$ | — | Brij ® 98 | 200/1/2/0/ 2.2/2180 | 4,453 | 1.579 | 17 | 34.37 | 7/3 H$_2$O/THF |
| 35 | CHI$_3$ | Na$_2$S$_2$O$_4$/ NaHCO$_3$ | — | Brij ® 98 | 200/1/2/0/ 2.2/2180 | 9,012 | 1.504 | 17 | 61.66 | 7/3 H$_2$O/THF |
| 36 | CHI$_3$ | Na$_2$S$_2$O$_4$/ NaHCO$_3$ | — | Brij ® 98 | 200/1/2/0/ 2.2/2180 | 7,174 | 1.514 | 18 | 54.72 | 7/3 H$_2$O/THF |
| 37 | CHI$_3$ | Na$_2$S$_2$O$_4$/ NaHCO$_3$ | — | Brij ® 98 | 200/1/2/0/ 2.2/2180 | 4,811 | 1.676 | 20 | 37.04 | 7/3 H$_2$O/THF |
| 38 | CHI$_3$ | Na$_2$S$_2$O$_4$/ NaHCO$_3$ | — | Brij ® 98 | 200/1/2/0/ 2.2/2180 | 7,460 | 1.492 | 20 | 57.25 | 7/3 H$_2$O/THF |
| 39 | CHI$_3$ | Na$_2$S$_2$O$_4$/ NaHCO$_3$ | — | Brij ® 98 | 200/1/2/0/ 2.2/2180 | 7,197 | 1.483 | 21 | 60.54 | 7/3 H$_2$O/THF |
| 40 | CHI$_3$ | Na$_2$S$_2$O$_4$/ NaHCO$_3$ | — | Brij ® 98 | 200/1/2/0/ 2.2/2180 | 4,057 | 1.849 | 22 | 32.02 | 7/3 H$_2$O/THF |
| 41 | CHI$_3$ | Na$_2$S$_2$O$_4$/ NaHCO$_3$ | — | Brij ® 98 | 200/1/2/0/ 2.2/2180 | 8,866 | 1.512 | 22 | 64.50 | 7/3 H$_2$O/THF |
| 42 | CHI$_3$ | Na$_2$S$_2$O$_4$/ NaHCO$_3$ | — | Brij ® 98 | 200/1/2/0/ 2.2/2180 | 7,606 | 1.505 | 24 | 66.62 | 7/3 H$_2$O/THF |
| 43 | CHI$_3$ | Na$_2$S$_2$O$_4$/ NaHCO$_3$ | — | Brij ® 98 | 200/1/2/0/ 2.2/2180 | 8,865 | 1.511 | 28 | 69.50 | 7/3 H$_2$O/THF |
| 44 | CHI$_3$ | Na$_2$S$_2$O$_4$/ NaHCO$_3$ | — | Brij ® 98 | 200/1/2/0/ 2.2/2180 | 9,325 | 1.487 | 44 | 72.18 | 7/3 H$_2$O/THF |
| 45 | CHI$_3$ | Na$_2$S$_2$O$_4$/ NaHCO$_3$ | — | Brij ® 98 | 200/1/2/0/ 2.2/2180 | 9,419 | 1.527 | 48 | 73.66 | 7/3 H$_2$O/THF |
| 46 | CHI$_3$ | Na$_2$S$_2$O$_4$/ NaHCO$_3$ | — | Brij ® 98 | 200/1/2/0/ 2.2/2180 | 10,793 | 1.510 | 56 | 79.81 | 7/3 H$_2$O/THF |
| 47 | CHI$_3$ | Na$_2$S$_2$O$_4$/ NaHCO$_3$ | — | Brij ® 98 | 200/1/2/0/ 2.2/2180 | 10,124 | 1.54 | 66 | 80.33 | 7/3 H$_2$O/THF |
| 48 | CHI$_3$ | Na$_2$S$_2$O$_4$/ NaHCO$_3$ | — | Brij ® 98 | 200/1/2/0/ 2.2/2180 | 8,892 | 1.551 | 66 | 78.23 | 2/1 H$_2$O/THF |
| 49 | CHI$_3$ | Na$_2$S$_2$O$_4$/ NaHCO$_3$ | — | Brij ® 98 | 200/1/2/0/ 2.2/4160 | 10,139 | 1.570 | 24 | 70.58 | 2/1 H$_2$O/THF |
| 50 | CHI$_3$ | Na$_2$S$_2$O$_4$/ NaHCO$_3$ | — | Brij ® 98 | 200/1/2/0/ 2.2/4160 | 11,106 | 1.503 | 45 | 79.80 | 2/1 H$_2$O/THF |
| 51 | CHI$_3$ | Na$_2$S$_2$O$_4$/ NaHCO$_3$ | — | Brij ® 98 | 200/1/2/0/ 2.2/4160 | 10,707 | 1.562 | 48 | 79.15 | 2/1 H$_2$O/THF |
| 52 | CHI$_3$ | Na$_2$S$_2$O$_4$/ NaHCO$_3$ | — | Brij ® 98 | 200/1/2/0/ 2.2/4160 | 11,076 | 1.562 | 66 | 79.13 | 2/1 H$_2$O/THF |
| 53 | CHI$_3$ | Na$_2$S$_2$O$_4$/ NaHCO$_3$ | — | Brij ® 98 | 200/1/2/0/ 2.2/4160 | 11,669 | 1.533 | 66 | 75.43 | 7/3 H$_2$O/THF |
| 54 | CHI$_3$ | Na$_2$S$_2$O$_4$/ NaHCO$_3$ | — | Brij ® 98 | 200/1/2/0/ 2.2/8320 | 12,331 | 1.546 | 45 | 80.44 | 2/1 H$_2$O/THF |
| 55 | CHI$_3$ | Na$_2$S$_2$O$_4$/ NaHCO$_3$ | — | Brij ® 98 | 200/1/2/0/ 2.2/12480 | 11,679 | 1.626 | 45 | 80.03 | 2/1 H$_2$O/THF |
| 56 | CHI$_3$ | Na$_2$S$_2$O$_4$/ NaHCO$_3$ | — | Brij ® 98 | 200/1/2/0/ 2.2/12480 | 10,629 | 1.618 | 45 | 81.10 | 7/3 H$_2$O/THF |
| 57 | CHI$_3$ | Na$_2$S$_2$O$_4$/ NaHCO$_3$ | — | Brij ® 98 | 200/1/2/0/ 22/12480 | 10,260 | 1.616 | 66 | 79.68 | 2/1 H$_2$O/THF |
| 58 | CHI$_3$ | Na$_2$S$_2$O$_4$/ NaHCO$_3$ | — | Brij ® 98 | 200/1/2/0/ 2.2/16640 | 10,425 | 1.664 | 45 | 85.00 | 2/1 H$_2$O/THF |

$^{a)}$Ratio [VC]/[initiator]/[catalyst]/[electron shuttle]/[buffer]/[surfactant] mol/mol/mol/mol/mol/ppm w/w to monomer

TABLE 9

Room Temperature Na$_2$S$_2$O$_4$-mediated LRP of VC Initiated with
Iodoform in H$_2$O/THF in the presence of electron shuttle OV$^{2+}$
and surfactant Brij ® 98

| Exp | Init | Catalyst/ Buffer | Electron Shuttle | Surfactant | [VC]/[I]/[C]/[ES]/ [B]/[S]$^{a)}$ | Mn | Mw/Mn | Time (h) | Conv (%) | Solvent |
|---|---|---|---|---|---|---|---|---|---|---|
| 59 | CHI$_3$ | Na$_2$S$_2$O$_4$/ NaHCO$_3$ | OV$^{2+}$ | Brij ® 98 | 200/1/2/0.00175/ 2.2/2180 | 1,349 | 2.205 | 1 | 9.35 | 7/3 H$_2$O/THF |
| 60 | CHI$_3$ | Na$_2$S$_2$O$_4$/ NaHCO$_3$ | OV$^{2+}$ | Brij ® 98 | 200/1/2/0.00175/ 2.2/2180 | 2,584 | 2.009 | 6 | 18.90 | 7/3 H$_2$O/THF |

TABLE 9-continued

Room Temperature Na$_2$S$_2$O$_4$-mediated LRP of VC Initiated with Iodoform in H$_2$O/THF in the presence of electron shuttle OV$^{2+}$ and surfactant Brij ® 98

| Exp | Init | Catalyst/ Buffer | Electron Shuttle | Surfactant | [VC]/[I]/[C]/[ES]/ [B]/[S]$^{a)}$ | Mn | Mw/Mn | Time (h) | Conv (%) | Solvent |
|---|---|---|---|---|---|---|---|---|---|---|
| 61 | CHI$_3$ | Na$_2$S$_2$O$_4$/ NaHCO$_3$ | OV$^{2+}$ | Brij ® 98 | 200/1/2/0.00175/ 2.2/2180 | 3,348 | 1.802 | 7 | 24.17 | 7/3 H$_2$O/THF |
| 62 | CHI$_3$ | Na$_2$S$_2$O$_4$/ NaHCO$_3$ | OV$^{2+}$ | Brij ® 98 | 200/1/2/0.00175/ 2.2/2180 | 4,261 | 1.749 | 9 | 30.13 | 7/3 H$_2$O/THF |
| 63 | CHI$_3$ | Na$_2$S$_2$O$_4$/ NaHCO$_3$ | OV$^{2+}$ | Brij ® 98 | 200/1/2/0.00175/ 2.2/2180 | 7,087 | 1.614 | 14 | 59.15 | 7/3 H$_2$O/THF |
| 64 | CHI$_3$ | Na$_2$S$_2$O$_4$/ NaHCO$_3$ | OV$^{2+}$ | Brij ® 98 | 200/1/2/0.00175/ 2.2/2180 | 8,110 | 1.507 | 16 | 64.06 | 7/3 H$_2$O/THF |
| 65 | CHI$_3$ | Na$_2$S$_2$O$_4$/ NaHCO$_3$ | OV$^{2+}$ | Brij ® 98 | 200/1/2/0.00175/ 2.2/2180 | 9,455 | 1.484 | 18 | 65.42 | 7/3 H$_2$O/THF |
| 66 | CHI$_3$ | Na$_2$S$_2$O$_4$/ NaHCO$_3$ | OV$^{2+}$ | Brij ® 98 | 200/1/2/0.00175/ 2.2/2180 | 9,087 | 1.511 | 20 | 70.12 | 7/3 H$_2$O/THF |
| 67 | CHI$_3$ | Na$_2$S$_2$O$_4$/ NaHCO$_3$ | OV$^{2+}$ | Brij ® 98 | 200/1/2/0.00175/ 2.2/2180 | 9,773 | 1.480 | 24 | 73.14 | 7/3 H$_2$O/THF |
| 68 | CHI$_3$ | Na$_2$S$_2$O$_4$/ NaHCO$_3$ | OV$^{2+}$ | Brij ® 98 | 200/1/2/0.00175/ 2.2/2180 | 9,705 | 1.490 | 40 | 75.43 | 7/3 H$_2$O/THF |
| 69 | CHI$_3$ | Na$_2$S$_2$O$_4$/ NaHCO$_3$ | OV$^{2+}$ | Brij ® 98 | 200/1/2/0.00175/ 2.2/2180 | 9,853 | 1.546 | 48 | 77.12 | 7/3 H$_2$O/THF |
| 70 | CHI$_3$ | Na$_2$S$_2$O$_4$/ NaHCO$_3$ | OV$^{2+}$ | Brij ® 98 | 200/1/2/0.00175/ 2.2/2180 | 10,175 | 1.546 | 66 | 79.20 | 7/3 H$_2$O/THF |
| 71 | CHI$_3$ | Na$_2$S$_2$O$_4$/ NaHCO$_3$ | OV$^{2+}$ | Brij ® 98 | 200/1/2/0.00175/ 2.2/4160 | 10,573 | 1.530 | 24 | 72.29 | 2/1 H$_2$O/THF |
| 72 | CHI$_3$ | Na$_2$S$_2$O$_4$/ NaHCO$_3$ | OV$^{2+}$ | Brij ® 98 | 200/1/2/0.0035/ 2.2/2180 | 10,940 | 1.492 | 24 | 73.12 | 2/1 H$_2$O/THF |
| 73 | CHI$_3$ | Na$_2$S$_2$O$_4$/ NaHCO$_3$ | OV$^{2+}$ | Brij ® 98 | 200/1/2/0.0035/ 2.2/2180 | 10,455 | 1.592 | 66 | 83.22 | 7/3 H$_2$O/THF |
| 74 | CHI$_3$ | Na$_2$S$_2$O$_4$/ NaHCO$_3$ | OV$^{2+}$ | Brij ® 98 | 200/1/2/0.0035/ 2.2/4160 | 11,592 | 1.542 | 24 | 73.59 | 2/1 H$_2$O/THF |
| 75 | CHI$_3$ | Na$_2$S$_2$O$_4$/ NaHCO$_3$ | OV$^{2+}$ | Brij ® 98 | 200/1/2/0.0035/ 2.2/4160 | 11,400 | 1.560 | 48 | 79.47 | 2/1 H$_2$O/THF |
| 76 | CHI$_3$ | Na$_2$S$_2$O$_4$/ NaHCO$_3$ | OV$^{2+}$ | Brij ® 98 | 200/1/2/0.0035/ 2.2/8320 | 12,225 | 1.555 | 24 | 75.02 | 2/1 H$_2$O/THF |
| 77 | CHI$_3$ | Na$_2$S$_2$O$_4$/ NaHCO$_3$ | OV$^{2+}$ | Brij ® 98 | 200/1/2/0.2/2.2/ 4160 | 12,553 | 1.561 | 24 | 75.82 | 2/1 H$_2$O/THF |
| 78 | CHI$_3$ | Na$_2$S$_2$O$_4$/ NaHCO$_3$ | OV$^{2+}$ | Brij ® 98 | 200/1/2/2/2.2/ 4160 | 8,152 | 1.70 | 3 | 35.61 | 2/1 H$_2$O/THF |

$^{a)}$Ratio [VC]/[initiator]/[catalyst]/[electron shuttle]/[buffer]/[surfactant] mol/mol/mol/mol/mol/ppm w/w to monomer

TABLE 10

Room Temperature Na$_2$S$_2$O$_4$-mediated LRP of VC Initiated with Iodoform in H$_2$O/THF in the presence of electron shuttle MV$^{2+}$ and surfactant Brij ® 98

| Exp | Init | Catalyst/ Buffer | Electron Shuttle | Surfactant | [VC]/[I]/[C]/[ES]/ [B]/[S]$^{a)}$ | Mn | Mw/Mn | Time (h) | Conv (%) | Solvent |
|---|---|---|---|---|---|---|---|---|---|---|
| 79 | CHI$_3$ | Na$_2$S$_2$O$_4$/ NaHCO$_3$ | MV$^{2+}$ | Brij ® 98 | 200/1/2/0.00175/ 2.2/2180 | 10,458 | 1.513 | 24 | 70.72 | 2/1 H$_2$O/THF |
| 80 | CHI$_3$ | Na$_2$S$_2$O$_4$/ NaHCO$_3$ | MV$^{2+}$ | Brij ® 98 | 200/1/2/0.00175/ 2.2/2180 | 7,215 | 1.527 | 24 | 55.01 | 2/1 H$_2$O/THF |
| 81 | CHI$_3$ | Na$_2$S$_2$O$_4$/ NaHCO$_3$ | MV$^{2+}$ | Brij ® 98 | 200/1/2/0.00175/ 2.2/2180 | 2,476 | 2.027 | 7 | 17.84 | 7/3 H$_2$O/THF |
| 82 | CHI$_3$ | Na$_2$S$_2$O$_4$/ NaHCO$_3$ | MV$^{2+}$ | Brij ® 98 | 200/1/2/0.00175/ 2.2/2180 | 2,480 | 1.874 | 9 | 19.63 | 7/3 H$_2$O/THF |
| 83 | CHI$_3$ | Na$_2$S$_2$O$_4$/ NaHCO$_3$ | MV$^{2+}$ | Brij ® 98 | 200/1/2/0.00175/ 2.2/2180 | 3,147 | 2.017 | 14 | 25.15 | 7/3 H$_2$O/THF |
| 84 | CHI$_3$ | Na$_2$S$_2$O$_4$/ NaHCO$_3$ | MV$^{2+}$ | Brij ® 98 | 200/1/2/0.00175/ 2.2/2180 | 5,342 | 1.598 | 16 | 41.46 | 7/3 H$_2$O/THF |
| 85 | CHI$_3$ | Na$_2$S$_2$O$_4$/ NaHCO$_3$ | MV$^{2+}$ | Brij ® 98 | 200/1/2/0.00175/ 2.2/2180 | 5,473 | 1.526 | 18 | 42.98 | 7/3 H$_2$O/THF |
| 86 | CHI$_3$ | Na$_2$S$_2$O$_4$/ NaHCO$_3$ | MV$^{2+}$ | Brij ® 98 | 200/1/2/0.00175/ 2.2/2180 | 9,611 | 1.482 | 20 | 74.62 | 7/3 H$_2$O/THF |
| 87 | CHI$_3$ | Na$_2$S$_2$O$_4$/ NaHCO$_3$ | MV$^{2+}$ | Brij ® 98 | 200/1/2/0.00175/ 2.2/2180 | 7,042 | 1.513 | 21 | 58.41 | 7/3 H$_2$O/THF |
| 88 | CHI$_3$ | Na$_2$S$_2$O$_4$/ NaHCO$_3$ | MV$^{2+}$ | Brij ® 98 | 200/1/2/0.00175/ 2.2/2180 | 9,062 | 1.483 | 22 | 64.87 | 7/3 H$_2$O/THF |
| 89 | CHI$_3$ | Na$_2$S$_2$O$_4$/ NaHCO$_3$ | MV$^{2+}$ | Brij ® 98 | 200/1/2/0.00175/ 2.2/2180 | 8,150 | 1.498 | 24 | 67.00 | 7/3 H$_2$O/THF |

TABLE 10-continued

Room Temperature $Na_2S_2O_4$-mediated LRP of VC Initiated with Iodoform in $H_2O$/THF in the presence of electron shuttle $MV^{2+}$ and surfactant Brij ® 98

| Exp | Init | Catalyst/ Buffer | Electron Shuttle | Surfactant | [VC]/[I]/[C]/[ES]/ [B]/[S]$^{a)}$ | Mn | Mw/Mn | Time (h) | Conv (%) | Solvent |
|---|---|---|---|---|---|---|---|---|---|---|
| 90 | CHI$_3$ | Na$_2$S$_2$O$_4$/ NaHCO$_3$ | MV$^{2+}$ | Brij ® 98 | 200/1/2/0.00175/ 2.2/2180 | 7,763 | 1.488 | 28 | 64.46 | 7/3 H$_2$O/THF |
| 91 | CHI$_3$ | Na$_2$S$_2$O$_4$/ NaHCO$_3$ | MV$^{2+}$ | Brij ® 98 | 200/1/2/0.00175/ 2.2/2180 | 8,818 | 1.506 | 40 | 72.53 | 7/3 H$_2$O/THF |
| 92 | CHI$_3$ | Na$_2$S$_2$O$_4$/ NaHCO$_3$ | MV$^{2+}$ | Brij ® 98 | 200/1/2/0.00175/ 2.2/2180 | 9,453 | 1.514 | 48 | 78.22 | 7/3 H$_2$O/THF |
| 93 | CHI$_3$ | Na$_2$S$_2$O$_4$/ NaHCO$_3$ | MV$^{2+}$ | Brij ® 98 | 200/1/2/0.00175/ 2.2/2180 | 9,241 | 1.502 | 51 | 72.52 | 7/3 H$_2$O/THF |
| 94 | CHI$_3$ | Na$_2$S$_2$O$_4$/ NaHCO$_3$ | MV$^{2+}$ | Brij ® 98 | 200/1/2/0.00175/ 2.2/2180 | 9,767 | 1.499 | 54 | 76.64 | 7/3 H$_2$O/THF |
| 95 | CHI$_3$ | Na$_2$S$_2$O$_4$/ NaHCO$_3$ | MV$^{2+}$ | Brij ® 98 | 200/1/2/0.00175/ 2.2/2180 | 9,760 | 1.530 | 66 | 73.76 | 7/3 H$_2$O/THF |
| 96 | CHI$_3$ | Na$_2$S$_2$O$_4$/ NaHCO$_3$ | MV$^{2+}$ | Brij ® 98 | 200/1/2/0.0035/ 2.2/2180 | 9,209 | 1.494 | 24 | 65.88 | 2/1 H$_2$O/THF |
| 97 | CHI$_3$ | Na$_2$S$_2$O$_4$/ NaHCO$_3$ | MV$^{2+}$ | Brij ® 98 | 200/1/2/0.0035/ 2.2/2180 | 8,924 | 1.488 | 24 | 70.76 | 2/1 H$_2$O/THF |
| 98 | CHI$_3$ | Na$_2$S$_2$O$_4$/ NaHCO$_3$ | MV$^{2+}$ | Brij ® 98 | 200/1/2/0.0035/ 2.2/8320 | 10,448 | 1.556 | 24 | 71.38 | 2/1 H$_2$O/THF |
| 99 | CHI$_3$ | Na$_2$S$_2$O$_4$/ NaHCO$_3$ | MV$^{2+}$ | Brij ® 98 | 200/1/2/0.0035/ 2.2/4160 | 9,763 | 1.549 | 24 | 69.90 | 2/1 H$_2$O/THF |
| 100 | CHI$_3$ | Na$_2$S$_2$O$_4$/ NaHCO$_3$ | MV$^{2+}$ | Brij ® 98 | 200/1/2/0.007/ 2.2/2180 | 10,174 | 1.516 | 24 | 75.90 | 2/1 H$_2$O/THF |
| 101 | CHI$_3$ | Na$_2$S$_2$O$_4$/ NaHCO$_3$ | MV$^{2+}$ | Brij ® 98 | 200/1/2/0.013/ 2.2/2180 | 4,984 | 1.729 | 24 | 36.19 | 2/1 H$_2$O/THF |

$^{a)}$Ratio [VC]/[initiator]/[catalyst]/[electron shuttle]/[buffer]/[surfactant] mol/mol/mol/mol/mol/ppm w/w to monomer

TABLE 11

Room temperature $Na_2S_2O_8$—HCOONa-mediated radical polymerization of VC initiated with bromoform in $H_2O$/THF

| Exp | Init | Catalyst/ Buffer | Electron Shuttle | Surfactant | [VC]/[I]/[C]/[ES]/ [B]/[S]$^{a)}$ | Mn | Mw/Mn | Time (h) | Conv (%) | Solvent |
|---|---|---|---|---|---|---|---|---|---|---|
| 102 | CHBr$_3$ | Na$_2$S$_2$O$_8$/ HCOONa/ NaHCO$_3$ | — | — | 200/1/2/2/0/ 2.2/0 | 9,539 | 1.941 | 24 | 7.15 | 2/1 H$_2$O/THF |
| 103 | CHBr$_3$ | Na$_2$S$_2$O$_8$/ HCOONa/ NaHCO$_3$ | — | — | 200/1/2/2/0/ 2.2/0 | 9,042 | 1.943 | 48 | 20.84 | 2/1 H$_2$O/THF |
| 104 | CHBr$_3$ | Na$_2$S$_2$O$_8$/ HCOONa/ NaHCO$_3$ | — | — | 200/1/2/2/0/ 2.2/0 | 8,738 | 1.931 | 72 | 35.17 | 2/1 H$_2$O/THF |
| 105 | CHBr$_3$ | Na$_2$S$_2$O$_8$/ HCOONa/ NaHCO$_3$ | — | — | 200/1/2/2/0/ 2.2/0 | 8,157 | 2.018 | 96 | 48.68 | 2/1 H$_2$O/THF |
| 106 | CHBr$_3$ | Na$_2$S$_2$O$_8$/ HCOONa/ NaHCO$_3$ | — | — | 200/1/2/2/0/ 2.2/0 | 8,593 | 1.968 | 120 | 53.74 | 2/1 H$_2$O/THF |

$^{a)}$Ratio [VC]/[initiator]/[catalyst]/[electron shuttle]/[buffer]/[surfactant] mol/mol/mol/mol/mol/ppm w/w to monomer

TABLE 12

Room temperature $Na_2S_2O_8$—HCOONa-mediated radical polymerization of VC initiated with chloroform in $H_2O$/THF

| Exp | Init | Catalyst/ Buffer | Electron Shuttle | Surfactant | [VC]/[I]/[C]/[ES]/ [B]/[S]$^{a)}$ | Mn | Mw/Mn | Time (h) | Conv (%) | Solvent |
|---|---|---|---|---|---|---|---|---|---|---|
| 107 | CHCl$_3$ | Na$_2$S$_2$O$_8$/ HCOONa/ NaHCO$_3$ | — | — | 200/1/2/2/0/ 2.2/0 | 10,207 | 1.893 | 24 | 7.77 | 2/1 H$_2$O/THF |
| 108 | CHCl$_3$ | Na$_2$S$_2$O$_8$/ HCOONa/ NaHCO$_3$ | — | — | 200/1/2/2/0/ 2.2/0 | 9,535 | 1.906 | 48 | 23.01 | 2/1 H$_2$O/THF |

TABLE 12-continued

Room temperature Na$_2$S$_2$O$_8$—HCOONa-mediated radical polymerization of VC initiated with chloroform in H$_2$O/THF

| Exp | Init | Catalyst/ Buffer | Electron Shuttle | Surfactant | [VC]/[I]/[C]/[ES]/ [B]/[S]$^{a)}$ | Mn | Mw/Mn | Time (h) | Conv (%) | Solvent |
|---|---|---|---|---|---|---|---|---|---|---|
| 109 | CHCl$_3$ | Na$_2$S$_2$O$_8$/ HCOONa/ NaHCO$_3$ | — | — | 200/1/2/2/0/ 2.2/0 | 8,863 | 1.929 | 72 | 39.28 | 2/1 H$_2$O/THF |
| 110 | CHCl$_3$ | Na$_2$S$_2$O$_8$/ HCOONa/ NaHCO$_3$ | — | — | 200/1/2/2/0/ 2.2/0 | 8,854 | 2.154 | 96 | 58.15 | 2/1 H$_2$O/THF |
| 111 | CHCl$_3$ | Na$_2$S$_2$O$_8$/ HCOONa/ NaHCO$_3$ | — | — | 200/1/2/2/0/ 2.2/0 | 7,909 | 1.907 | 120 | 56.08 | 2/1 H$_2$O/THF |

$^{a)}$Ratio [VC]/[initiator]/[catalyst]/[electron shuttle]/[buffer]/[surfactant] mol/mol/mol/mol/mol/ppm w/w to monomer

TABLE 13

Room temperature H$_2$NC(=NH)SO$_2$H-mediated LRP of VC initiated with iodoform in H$_2$O/THF in the presence of electron shuttle OV$^{2+}$

| Exp | Init | Catalyst/ Buffer | Electron Shuttle | Surfactant | [VC]/[I]/[C]/[ES]/ [B]/[S]$^{a)}$ | Mn | Mw/Mn | Time (h) | Conv (%) | Solvent |
|---|---|---|---|---|---|---|---|---|---|---|
| 112 | CHI$_3$ | H$_2$NC(=NH)SO$_2$H/ NaHCO$_3$ | OV$^{2+}$ | — | 200/1/2/0.0035/ 4.4/0 | 1,352 | 1.933 | 8 | 10.32 | 7/3 H$_2$O/THF |
| 113 | CHI$_3$ | H$_2$NC(=NH)SO$_2$H/ NaHCO$_3$ | OV$^{2+}$ | — | 200/1/2/0.0035/ 4.4/0 | 3,535 | 1.748 | 16 | 28.14 | 7/3 H$_2$O/THF |
| 114 | CHI$_3$ | H$_2$NC(=NH)SO$_2$H/ NaHCO$_3$ | OV$^{2+}$ | — | 200/1/2/0.0035/ 4.4/0 | 5,662 | 1.563 | 24 | 45.87 | 7/3 H$_2$O/THF |
| 115 | CHI$_3$ | H$_2$NC(=NH)SO$_2$H/ NaHCO$_3$ | OV$^{2+}$ | — | 200/1/2/0.0035/ 4.4/0 | 6,240 | 1.560 | 48 | 49.68 | 7/3 H$_2$O/THF |
| 116 | CHI$_3$ | H$_2$NC(=NH)SO$_2$H/ NaHCO$_3$ | OV$^{2+}$ | — | 200/1/2/0.0035/ 4.4/0 | 7,119 | 1.489 | 68 | 54.86 | 7/3 H$_2$O/THF |
| 117 | CHI$_3$ | H$_2$NC(=NH)SO$_2$H/ NaHCO$_3$ | OV$^{2+}$ | — | 200/1/2/0.0035/ 4.4/0 | 6,663 | 1.533 | 96 | 55.53 | 7/3 H$_2$O/THF |

$^{a)}$Ratio [VC]/[initiator]/[catalyst]/[electron shuttle]/[buffer]/[surfactant] mol/mol/mol/mol/mol/ppm w/w to monomer

TABLE 14

Selected examples of the room temperature non-metallic SET reagents-mediated LRP of VC in H$_2$O, THF and mixtures thereof

| Exp | Init | Catalyst/Additive/ Buffer | Electron Shuttle | Surfactant | [VC]/[I]/[C]/[A]/ [ES]/[B]/[S]$^{a)}$ | Mn | Mw/Mn | Time (h) | Conv (%) | Solvent |
|---|---|---|---|---|---|---|---|---|---|---|
| 118 | CHI$_3$ | Na$_2$S$_2$O$_4$/ NaI/ NaHCO$_3$ | — | Brij ® 98 | 200/1/2/8/0/ 2.2/2180 | 7,914 | 1.451 | 66 | 60.22 | 7/3 H$_2$O/THF |
| 119 | CHI$_3$ | Na$_2$S$_2$O$_4$/ NaHCO$_3$ | OV$^{2+}$ | — | 200/1/2/0/0.00175/ 2.2/0 | 10,355 | 1.482 | 24 | 69.42 | 2/1 H$_2$O/THF |
| 120 | CHI$_3$ | Na$_2$S$_2$O$_4$/ NaHCO$_3$ | OV$^{2+}$ | — | 200/1/2/0/0.0035/ 2.2/0 | 9,679 | 1.472 | 24 | 63.99 | 2/1 H$_2$O/THF |
| 121 | CHI$_3$ | Na$_2$S$_2$O$_4$/ NaHCO$_3$ | OV$^{2+}$ | — | 200/1/2/0/0.0035/ 2.2/0 | 9,020 | 1.480 | 24 | 65.51 | 7/3 H$_2$O/THF |
| 122 | CHI$_3$ | Na$_2$S$_2$O$_4$/ NaHCO$_3$ | OV$^{2+}$ | — | 200/1/2/0/0.0035/ 2.2/0 | 10,529 | 1.499 | 66 | 79.74 | 7/3 H$_2$O/THF |
| 123 | CHI$_3$ | Na$_2$S$_2$O$_4$/ NaHCO$_3$ | OV$^{2+}$ | — | 200/1/2/0/0.00525/ 2.2/0 | 9,731 | 1.474 | 24 | 67.21 | 7/3 H$_2$O/THF |
| 124 | CHI$_3$ | Na$_2$S$_2$O$_4$/ NaHCO$_3$ | OV$^{2+}$ | — | 200/1/4/0/0.0035/ 2.2/0 | 9,925 | 1.509 | 24 | 71.54 | 7/3 H$_2$O/THF |
| 125 | CHI$_3$ | Na$_2$S$_2$O$_4$/ NaI/ NaHCO$_3$ | OV$^{2+}$ | — | 200/1/2/4/0.0035/ 2.2/0 | 8,903 | 1.467 | 66 | 71.40 | 7/3 H$_2$O/THF |
| 126 | CHI$_3$ | Na$_2$S$_2$O$_4$/ NaI/ NaHCO$_3$ | OV$^{2+}$ | — | 200/1/2/8/0.0035/ 2.2/0 | 8,915 | 1.445 | 66 | 69.87 | 7/3 H$_2$O/THF |
| 127 | CHI$_3$ | Na$_2$S$_2$O$_4$/ NaI/ NaHCO$_3$ | OV$^{2+}$ | — | 200/1/2/12/0.0035/ 2.2/0 | 9,819 | 1.450 | 66 | 69.19 | 7/3 H$_2$O/THF |
| 128 | CHI$_3$ | Na$_2$S$_2$O$_4$/ NaI/ NaHCO$_3$ | OV$^{2+}$ | — | 200/1/4/8/0.00175/ 2.2/0 | 10,002 | 1.467 | 66 | 75.02 | 7/3 H$_2$O/THF |

TABLE 14-continued

Selected examples of the room temperature non-metallic SET reagents-
mediated LRP of VC in H₂O, THF and mixtures thereof

| Exp | Init | Catalyst/Additive/Buffer | Electron Shuttle | Surfactant | [VC]/[I]/[C]/[A]/[ES]/[B]/[S]$^{a)}$ | Mn | Mw/Mn | Time (h) | Conv (%) | Solvent |
|---|---|---|---|---|---|---|---|---|---|---|
| 129 | CHI₃ | Na₂S₂O₄/NaI/NaHCO₃ | OV$^{2+}$ | — | 200/1/4/8/0.0035/2.2/0 | 11,369 | 1.495 | 66 | 81.95 | 7/3 H₂O/THF |
| 130 | CHI₃ | Na₂S₂O₄/NaI/NaHCO₃ | OV$^{2+}$ | Brij ® 98 | 200/1/2/8/0.00175/2.2/2180 | 8,961 | 1.461 | 66 | 60.04 | 7/3 H₂O/THF |
| 131 | CHI₃ | Na₂S₂O₄/NaI/NaHCO₃ | OV$^{2+}$ | Brij ® 98 | 200/1/2/4/0.00175/2.2/4160 | 7,626 | 1.512 | 24 | 50.24 | 2/1 H₂O/THF |
| 132 | CHI₃ | Na₂S₂O₄/NaCl/NaHCO₃ | OV$^{2+}$ | — | 200/1/4/8/0.0035/2.2/0 | 11,482 | 1.529 | 66 | 85.48 | 7/3 H₂O/THF |
| 133 | CHI₃ | Na₂S₂O₄/NaHCO₃ | OV$^{2+}$ | — | 200/1/2/0/0.0035/2.2/0 | No rxn | — | 24 | 0.0 | THF |
| 134 | CHI₃ | Na₂S₂O₄/NaHCO₃ | OV$^{2+}$ | — | 200/1/2/0/0.0035/2.2/0 | 2,033 | 1.623 | 24 | 20.11 | H₂O |
| 135 | CHI₃ | Na₂S₂O₄/NaHCO₃ | MV$^{2+}$ | — | 200/1/2/0/0.0035/2.2/0 | 7,457 | 1.489 | 24 | 53.58 | 2/1 H₂O/THF |
| 136 | CHI₃ | Na₂S₂O₄/NaHCO₃ | MV$^{2+}$ | — | 200/1/2/0/0.0035/2.2/0 | 9,059 | 1.455 | 66 | 69.01 | 7/3 H₂O/THF |
| 137 | CHI₃ | Na₂S₂O₄/NaHCO₃ | MV$^{2+}$ | — | 200/1/2/0/0.0065/2.2/0 | 8,599 | 1.455 | 66 | 67.82 | 7/3 H₂O/THF |
| 138 | CHI₃ | Na₂SO₃/NaHCO₃ | MV$^{2+}$ | — | 200/1/2/0/0.0035/2.2/0 | 2,382 | 1.746 | 66 | 16.91 | 7/3 H₂O/THF |
| 139 | CHI₃ | Na₂S₂O₄/NaHCO₃ | — | Methocel ® F50 | 200/1/2/0/0/2.2/600$^{b)}$ | 10,504 | 1.492 | 45 | 78.15 | 2/1 H₂O/THF |
| 140 | CHI₃ | Na₂S₂O₄/NaHCO₃ | — | Methocel ® F50 | 200/1/2/0/0/2.2/1000$^{b)}$ | 9,644 | 1.472 | 45 | 74.99 | 2/1 H₂O/THF |
| 141 | CHI₃ | Na₂S₂O₄/NaHCO₃ | — | NaDDS | 200/1/2/0/0/2.2/0.1 | 3,862 | 1.795 | 24 | 30.43 | 2/1 H₂O/THF |
| 142 | CHI₃ | Na₂S₂O₄/NaHCO₃ | — | NaDDS | 200/1/2/0/0/2.2/3130 | 8,442 | 1.524 | 45 | 62.93 | 2/1 H₂O/THF |
| 143 | CH₃CH(I)Cl | Na₂S₂O₄/NaHCO₃ | — | — | 200/1/2/0/0/2.2/0 | 8,945 | 1.743 | 66 | 60.86 | 2/1 H₂O/THF |
| 144 | CH₂I₂ | Na₂S₂O₄/NaHCO₃ | — | — | 200/1/2/0/0/2.2/0 | 8,162 | 1.861 | 66 | 37.34 | 2/1 H₂O/THF |
| 145 | CF₃(CF₂)₇CH₂CH₂I | Na₂S₂O₄/NaHCO₃ | OV$^{2+}$ | Brij ® 98 | 200/1/2/0/0.00175/2.2/2180 | 9,408 | 2.291 | 69 | 3.35 | 7/3 H₂O/THF |
| 146 | CF₃(CF₂)₉I | Na₂S₂O₄/NaHCO₃ | OV$^{2+}$ | — | 200/1/2/0/0.0035/2.2/0 | 7,554 | 1.676 | 24 | 45.39 | 7/3 H₂O/THF |
| 147 | CHBr₃ | Na₂S₂O₄/NaHCO₃ | — | — | 200/1/2/0/0/2.2/0 | 7,943 | 1.945 | 45 | 46.61 | 2/1 H₂O/THF |
| 148 | CHBr₃ | Na₂S₂O₄/NaHCO₃ | OV$^{2+}$ | Brij ® 98 | 200/1/2/0/0.00175/2.2/4160 | 6,767 | 2.033 | 24 | 71.52 | 2/1 H₂O/THF |
| 149 | CBr₄ | Na₂S₂O₄/NaHCO₃ | — | — | 200/1/2/0/0/2.2/0 | 6,478 | 2.150 | 45 | 51.17 | 2/1 H₂O/THF |
| 150 | CBr₄ | Na₂S₂O₄/NaHCO₃ | OV$^{2+}$ | Brij ® 98 | 200/1/2/0/0.0035/2.2/4160 | 7,360 | 2.117 | 24 | 50.86 | 2/1 H₂O/THF |
| 151 | CBr₄ | Na₂S₂O₈/HCOONa/NaHCO₃ | — | — | 200/1/2/2/0/2.2/0 | 3,226 | 2.592 | 66 | 16.59 | 2/1 H₂O/THF |
| 152 | CBr₄ | Na₂S₂O₈/NaHCO₃ | — | — | 200/1/2/0/0/2.2/0 | 3,722 | 2.449 | 66 | 21.61 | 2/1 H₂O/THF |
| 153 | CHI₃ | Na₂S₂O₃/NaHCO₃ | — | — | 200/1/2/0/0/2.2/0 | 0,433 | 2.551 | 64 | 3.12 | 2/1 H₂O/THF |
| 154 | CHI₃ | Na₂S₂O₄/NaHCO₃ | — | NaDDS | 200/1/2/0/0/2.2/2085 | 0,400 | 2.277 | 12 | 1.08 | H₂O |
| 155 | CHI₃ | NaNO₂/NaHCO₃ | — | — | 200/1/2/0/0/2.2/0 | No rxn | — | 38 | 0 | 2/1 H₂O/THF |
| 156 | CHI₃ | Na₂SO₃/NaHCO₃ | — | — | 200/1/2/0/0/2.2/0 | 0,722 | 2.851 | 38 | 14.70 | 2/1 H₂O/THF |
| 157 | CHI₃ | HCOONa/NaHCO₃ | — | — | 200/1/2/0/0/2.2/0 | No rxn | — | 137 | 0 | 2/1 H₂O/THF |
| 158 | CHI₃ | NaBH₄/NaHCO₃ | — | — | 200/1/2/0/0/2.2/0 | 0,624 | 3.21 | 137 | 9.64 | 2/1 H₂O/THF |
| 159 | CHI₃ | SnCl₂ 2H₂O/NaHCO₃ | — | — | 200/1/2/0/0/2.2/0 | 0,519 | 3.818 | 137 | 11 | 2/1 H₂O/THF |
| 160 | CHI₃ | Na₂S₂O₅/NaHCO₃ | — | — | 200/1/2/0/0/2.2/0 | 0,481 | 2.458 | 40 | 5.93 | 2/1 H₂O/THF |
| 161 | CHI₃ | Na₂S₂O₈/HCOONa/NaHCO₃ | — | — | 200/1/2/2/0/0/2.2/0 | No rxn | — | 29 | 0 | 2/1 H₂O/THF |

TABLE 14-continued

Selected examples of the room temperature non-metallic SET reagents-
mediated LRP of VC in H$_2$O, THF and mixtures thereof

| Exp | Init | Catalyst/Additive/ Buffer | Electron Shuttle | Surfactant | [VC]/[I]/[C]/[A]/ [ES]/[B]/[S]$^{a)}$ | Mn | Mw/Mn | Time (h) | Conv (%) | Solvent |
|---|---|---|---|---|---|---|---|---|---|---|
| 162 | CBr$_4$ | Na$_2$S$_2$O$_8$/ HCOONa/ NaHCO$_3$ | — | — | 200/1/2/2/0/0/ 2.2/0 | 4,876 | 2.331 | 94 | 36.74 | 2/1 H$_2$O/THF |
| 163 | CCl$_4$ | Na$_2$S$_2$O$_8$/ HCOONa/ NaHCO$_3$ | — | — | 200/1/2/2/0/0/ 2.2/0 | 8,757 | 1.943 | 92 | 55.38 | 2/1 H$_2$O/THF |
| 164 | CHI$_3$ | HOCH$_2$SO$_2$ Na 2H$_2$O/ NaHCO$_3$ | — | — | 200/1/2/0/0/ 2.2/0 | 0,732 | 2.568 | 58 | 7.11 | 2/1 H$_2$O/THF |
| 165 | CHI$_3$ | HOCH$_2$SO$_3$Na/ NaHCO$_3$ | — | — | 200/1/2/0/0/ 2.2/0 | 0,488 | 2.609 | 58 | 7.34 | 2/1 H$_2$O/THF |
| 166 | CHI$_3$ | H$_2$NC(=NH)SO$_2$H/ NaHCO$_3$ | — | — | 200/1/2/0/0/ 2.2/0 | 7,407 | 1.509 | 58 | 55.84 | 2/1 H$_2$O/THF |

$^{a)}$Ratio [VC]/[initiator]/[catalyst]/[electron shuttle]/[buffer]/[surfactant] mol/mol/mol/mol/mol/ppm w/w to monomer Table 1 presents selected examples of Fe(O) catalyzed VC polymerization. Examples 1 to 9 describe the initiation performed from α-haloesters. Example 9 describes the synthesis of a block copolymer by initiating from the Cl chain end of PMMA synthesized via living radical polymerization. Examples 10 to 16 describe the VC polymerization initiated from benzyl halides and pseudohalides, while examples 17 and 18 exemplify α-cyanoesters and example 19 describes the use of sulfonyl halides as initiators. The polymerization may be performed in o-DCB, THF or DMF. In o-DCB, at constant [VC]:[I]:[C]:[L] ratios, lower temperatures lead to higher molecular weights and narrower Mw/Mn but lower conversions (# 4–6).

Table 2 presents the TiCp$_2$Cl$_2$ catalyzed polymerization of VC initiated from various halides. By itself, in the absence of added initiator, TiCp$_2$Cl$_2$ catalyzes VC polymerization only to very low conversion. Polymers can be obtained in the presence of α-haloesters (examples 21 to 25), benzy halides and pseudohalides (examples 26 to 31), α-cyanoesters (example 32) as well as imidyl halides (examples 33 and 34). The addition of Al$^i$Bu$_3$ (examples 23 and 25) significantly increase the conversion. Star polymers can be synthesized in the presence of trifunctional initiators (example 27). Lower temperature affords higher Mn but lower conversion (examples 21 and 22). For Ti based catalysts, bhlorine and bromine containing initiators generate higher conversions than iodine initiators and are therefore preferred.

Table 3 presents the Cu(I) catalyzed polymerization of VC initiated from various halides. In the presence of more activating ligands than bpy, such as Me$_6$-TREN, CuBr can catalyzed VC polymerization initiated from α-haloesters (examples 37 and 38). More reactive Cu(I) species such as CuC≡C-Ph, CuSPh or Cu$_2$Te (examples 39, 40 and 46) can catalyze VC polymerization even in the presence of bpy as ligand. For the less reactive copper halides, the presence of more activating polyamine ligands is therefore necessary.

Table 4 presents the Cu(O) catalyzed polymerization of VC initiated from various halides. Initiation from allyl chloride defects is demonstrated using various haloallyl model compounds (examples 48–50) while the initiation from the repeat unit of PVC is demonstrated with the corresponding 1,1-dichloro (example 53), 1,1-chlorobromo (example 67) and 1,1-chloroiodo derivatives (examples 92 to 117). Cu(O) is also able to catalyze VC polymerization in the presence of a large variety of chloro, bromo and iodo initiators such as α-cyanohalides (examples 51 and 52), α-haloesters (examples 57–59, 61–66 and 72–74) and various benzyl halides such as α,α'-dichloro-p-xylene (examples 54–56), α,α'-dibromo-p-xylene (example 70) 1-bromo-1-phenylethane (examples 68 and 69) and 1,2,4,5-tetrakisbromomethyl benzene (example 60, star polymer), α,α'-diiodo-p-xylene (examples 118 to 137). Other successful initiators include perfloroalkyliodides (example 75), allyl iodide (examples 76 to 79), iodoform (examples 80 to 89) and carbon tetraiodide (examples 90 and 91).

Figure 1:
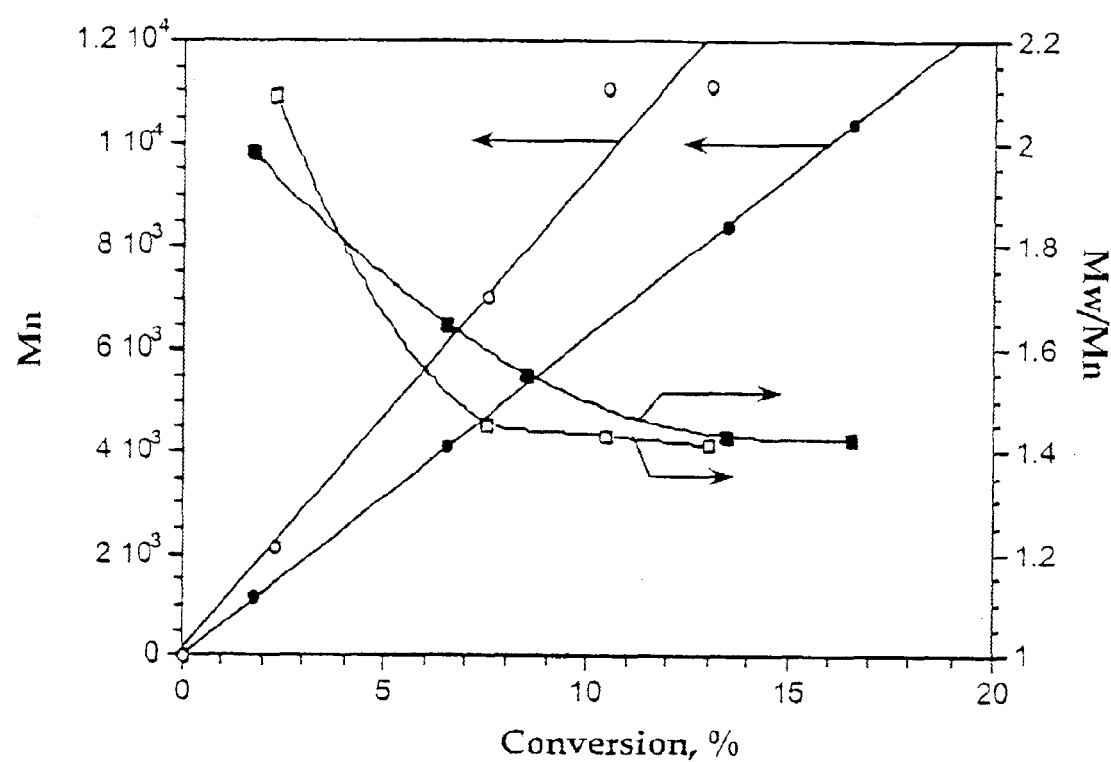
FIG. 1 illustrates the dependence of the molecular weight ($\lambda, \mu$) and molecular weight distribution (v, o) on conversion for the metal catalyzed polymerization of vinyl chloride initiated from α,α-diiodo-p-xylene at 130° C. in o-DCB ([VC]=4.8M). Closed symbols: [VC]:[1]:[Cu(O)]:[bpy]= 260:1:4:8; open symbols: [VC]:[1]:[Cu(O)]:[bpy]= 520:1:4:8
Figure 2:
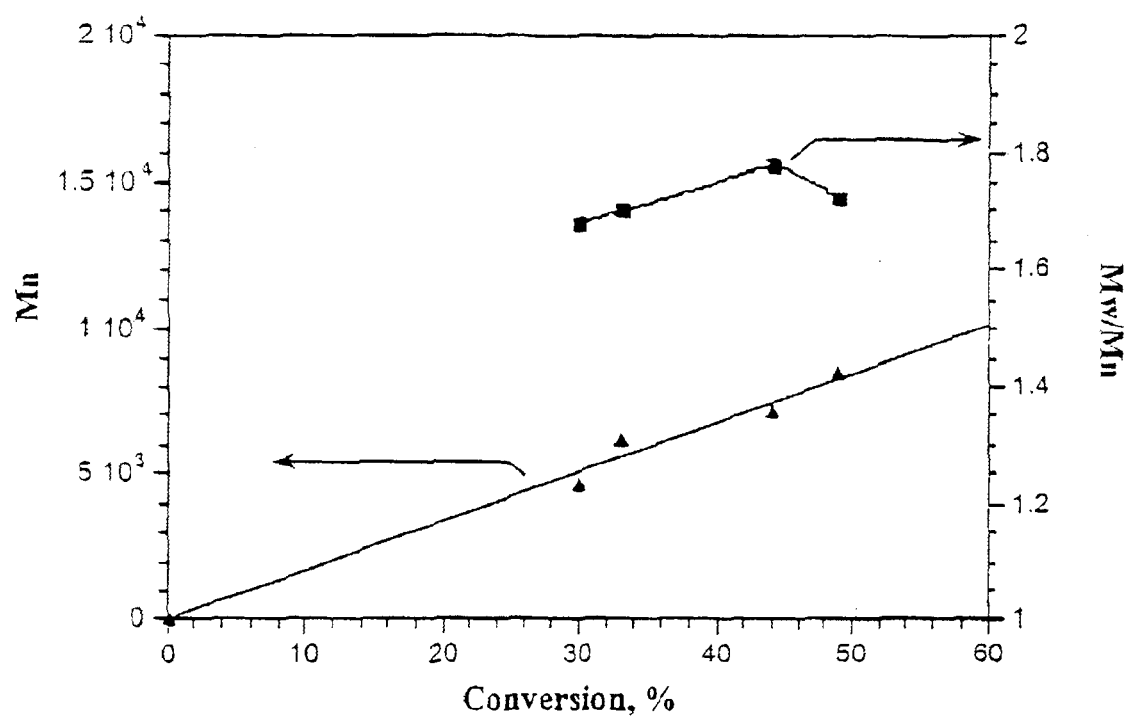
FIG. 2 illustrates the dependence of molecular weight (σ) and molecular weight distribution (v) on conversion for the polymerization of VC initiated from $CH_3$—CHCl-I and catalyzed by Cu(O)/bpy in water at 90° C. in the Presence of sodium dodecylsulfate (NaDDS). [VC]:[$CH_3CHClI$]:[Cu(O)]:[bpy]:[NaDDS]=100:1:2:4:0.5.

The experiments described in examples 125–132 are plotted in FIG. 1 and show that the molecular weight increases linearly with conversion while the polydispersity decreases with conversion at 130° C. using o-DCB as solvent. A linear (FIG. 2) dependence between molecular weight and conversion is observed (examples 114–117) even at 90° C. if VC polymerization is carried out in water in the presence of a surfactant (sodium dodecylsulfate).

Figure 3:
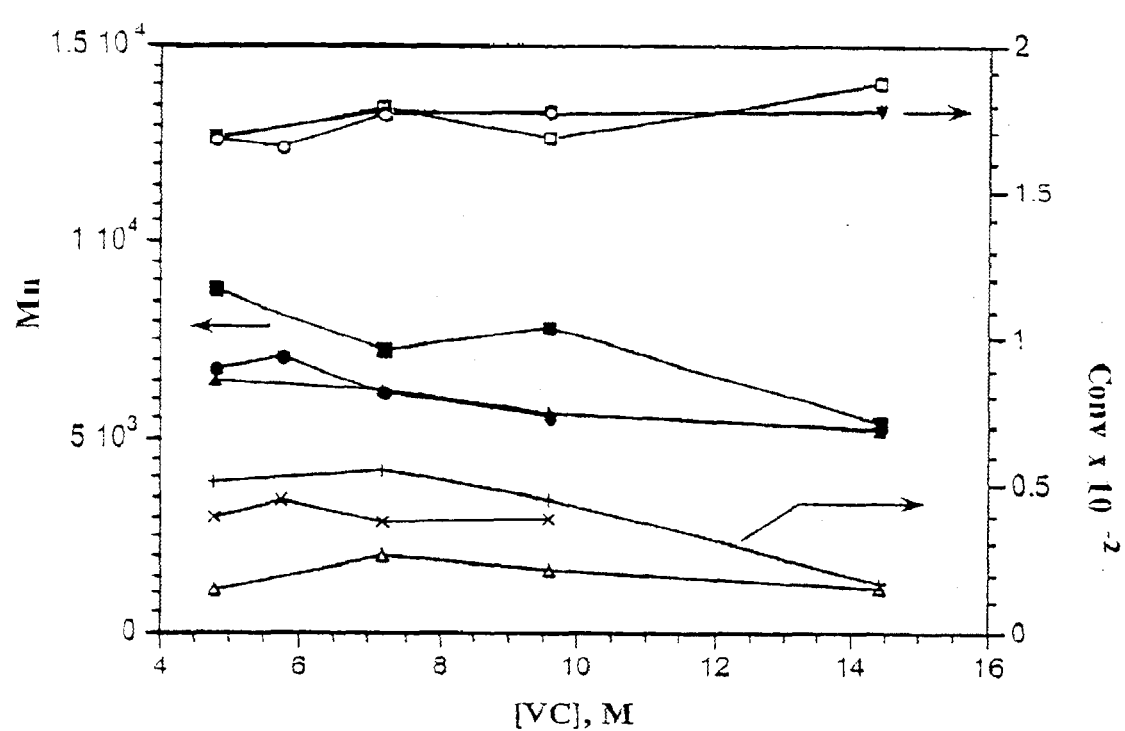
FIG. 3 illustrates the dependence of molecular weight, molecular weight distribution and conversion on temperature and concentration for the polymerization of VC initiated from $CH_3$—CHCl-I and catalyzed by Cu(O)/bpy in bulk and in o-DCB at 60° C. (σ, τ Δ), 90° C. (ν, θ, +) and 130° C. (λ, μ, 5). [VC]:[$CH_3CHClI$]:[Cu(O)]:[bpy]=100:1:2:4.

The results from examples 97 to 108 describe the combined effect of VC concentration (from bulk 14.4 M to solution 4.8 M) and temperature (from 60° C. to 130° C.) on the molecular weight molecular weight distribution and conversion of the resulting PVC for a reaction time of 20 h and are presented in FIG. 3. An optimum conversion is observed for [VC]=7.2 M while bulk polymerization generates both lower conversion as well as lower molecular weight and broader molecular weight distribution.

Table 5 presents miscellaneous examples of metal catalyzed VC polymerization. It was observed that α-haloesters catalyze VC polymerization (examples 140–144) in the presence of Al(O)/bpy and Al$^i$Bu$_3$ as well as Cd(O)/bpy, Sm(O)/bpy and Zn(O)/bpy. α-Cyanohalides (example 145) can catalyze VC polymerization in the presence of Cr(CO)$_6$.

Figure 4:
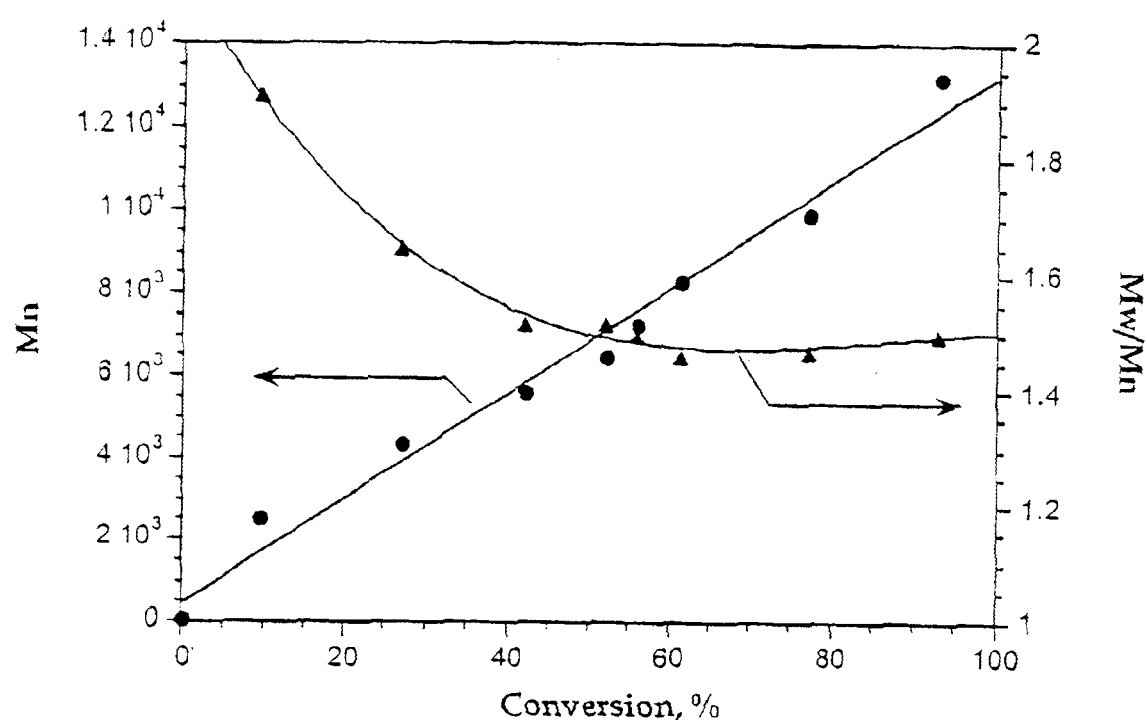
FIG. 4 illustrates the dependence of molecular weight (λ) and molecular weight distribution (σ) on conversion for the polymerization of VC initiated from CH$_3$—CHCl-I and catalyzed by Cu(O)/TREN in water at 20° C. in the presence of sodium dodecylsulfate (NaDDS). [VC]:[CH$_3$CHCII]:[Cu(O)]:[bpy]:[NaDDS]=100:1:2:4:0.5.

Table 6 presents selected examples of the room temperature metal catalyzed VC polymerization in water, organic solvents or mixtures thereof. In the presence of activating ligands such as TREN, Cu(O) and its derivatives are successful in polymerizing VC at room temperature. Particularly suitable initiators include iodine derivatives such as CH$_3$—CH(Cl)—I (example 147 to example 178), CHI$_3$ (example 179 to example 227), CF$_3$—(CF$_2$)$_9$—I (example 228), CH$_2$—CH—CH$_2$—I (example 229) and I—CH$_2$—Ph—CH$_2$—I (example 233). A demonstration of the Cu(O)/ TREN catalyzed living radical polymerization of VC at room temperature initiated from CH$_3$—CH(Cl)—I in water is presented in FIG. 4. A linear dependence between molecular weight and conversion is observed up to complete conversion of VC. Initiators that generate high Mn PVC at room temperature are also bromine and chlorine containing initiators such as $BrC(CH_3)_2$—COO—Ph—Ph—OCO—C$(CH_3)_2Br$ (example 230) or $CH_3C[Ph—OCO—C(CH_3)_2Br]_3$ (example 231 in which case a star PVC polymer was obtained) or Cl—$CH_2$—Ph—$CH_2$—Cl(example 232). Low Mn PVC synthesized by living radical polymerization (example 235) can be chain-extended with VC in water while commercial PVC (example 236) can be grafted in water with VC under the same conditions. Very suitable catalytic systems include Cu(O)/TREN, $Cu_2Te$/TREN and combinations thereof. By contrast with the solution experiments performed with CuX (X=Cl, Br, I) at higher temperatures, the CuX/TREN catalytic systems are active in water even at room temperature (examples 173–177, 232). A conventional initiator such as benzoyl peroxide can be employed as well (example 234). The polymerization can also be carried out at room temperature in various organic solvents such as o-DCB, THF, Acetone, Ethyl Acetate, MeOH etc or mixtures water/organic solvent in which case the presence of the surfactant may be not be necessary.

Table 7 presents selected examples of $Na_2S_2O_4$-catalyzed LRP of VC initiated with iodoform in $H_2O$/THF. Examples 1–22 with the same water-THF ratio 2/1 are plotted in FIG. 1. The two rate constants are observed. $k_{p1}$ represents a liquid-liquid emulsion polymerization when $k_{p2}$ represents a solid-liquid suspension one. Such a transfer takes place after about 24 h at about 60% of VC conversion. $k_{p1}$>$k_{p2}$ more than 2 times (0.0039 $h^{-1}$ and 0.0015 $h^1$ respectively). Mn is consistent with $M_{th}$ as for a living process. Polydispersity drastically decreases in the beginning of the polymerization with increasing of $M_{th}$ and keeps lower than 1.5 until the end of the process after 66 h (example 19). VC conversion at this point is a little more than 80%. Example 22 without buffer shows low conversion. Change of the $H_2O$/THF ratio to 7/3 (example 23) does not have a significant influence on this reaction.

Table 8 presents room temperature $Na_2S_2O_4$-catalyzed LRP of VC initiated with iodoform in $H_2O$/THF in the presence of surfactant Brij® 98. These experiments were carried out with different $H_2O$/THF ratios both 2/1 and 7/3. Comparison of the experiments, for example, 47 and 48, which are equal except for $H_2O$/THF ratios (7/3 and 2/1 resp.) shows a little higher yield (80 vs. 78%) and lower polydispersity (1.54 vs. 1.55) for the former one after 66 h. Amount of the surfactant varies from 2080 to 16640 ppm w/w relative to VC. Comparing the results of the experiments 26, 54, 55, 56 and 58 for 45 h one can see the increasing of polydispersity with increasing of surfactant amount from 1.48 to 1.66, when the VC conversions do not differ essentially each from others. The experiments with $H_2O$/THF ratio 7/3 and amount of Brij® 98 2080 ppm w/w relative to VC are plotted in FIG. 2. One can also observe two different polymerization rates, namely for emulsion and suspension. In this case $k_{p1}$ for the liquid-liquid emulsion polymerization is higher then that rate constant for the non-surfactant process in FIG. 1 (0.050 vs. 0.039 $h^{-1}$), whereas the two constants $k_{p2}$ are similar (0.013 and 0.015 $h^{-1}$ respectively). The emulsion-suspension transfer also occurs after about 24 h but already at about 70% of VC conversion. The emulsion is kept longer in this case. $M_n$ is in good agreement with $M_{th}$. Polydispersity drops fast from 2.4 to less than 1.5 and is held practically constant up to the end of polymerization.

Table 9 presents results of the room temperature $Na_2S_2O_4$-catalyzed LRP of VC initiated with iodoform in $H_2O$/THF in the presence of electron shuttle $OV^{2+}$ and surfactant Brij® 98. All other factors being equal, decreasing of $OV^{2+}$ decreases polydispersity from 1.49 to 1.48 (experiments 72 and 67) while the monomer conversions are equal (72%). Increasing of surfactant amount increases monomer conversion but also polydispersity (experiments 71 and 74). Experiments 59–70 are plotted in FIG. 3. One can see that the rate constant of emulsion polymerization and $k_{p1}$ is the highest 0.066 $h^{-1}$ and the emulsion-suspension transfer occurs at above 70% of monomer conversion after less than 20 h, while the constant of solid-liquid polymerization $k_{p2}$ is lower. As in the previous cases $M_n$ is consistent with $M_{th}$ and polydispersity decreases up to 1.5 with increasing of $M_{th}$ up to about 6000 and then is kept close to this value. Monomer conversion is 82% after 66 h.

Table 10 presents results of the room temperature $Na_2S_2O_4$-catalyzed LRP of VC initiated with iodoform in $H_2O$/THF in the presence of electron shuttle $MV^{2+}$ and surfactant Brij® 98. Experiments 99, 98 demonstrate a very small increasing of polydispersity from 1.55 to 1.56 with increasing of surfactant amount, while monomer conversions are practically equal (70 and 71% resp.). A marked increase of $MV^{2+}$ (experiment 101) lows the conversion (36%) and shows an increase in polydispersity (1.73) in comparison with lower amounts of methyl viologen (experiments 89, 96, 97, 100). Experiments 81–95 are plotted in FIG. 4. As one can see $MV^{2+}$ accelerates liquid-liquid emulsion polymerization $k_{p1}$=0.054 $h^{-1}$, while $k_{p2}$ is smaller than for the non-electron shuttle involving reactions but bigger than for one of octyl viologen. Dependence $M_n$ on $M_{th}$ is similar as for the previous cases as well as polydispersity is.

Figure 5:
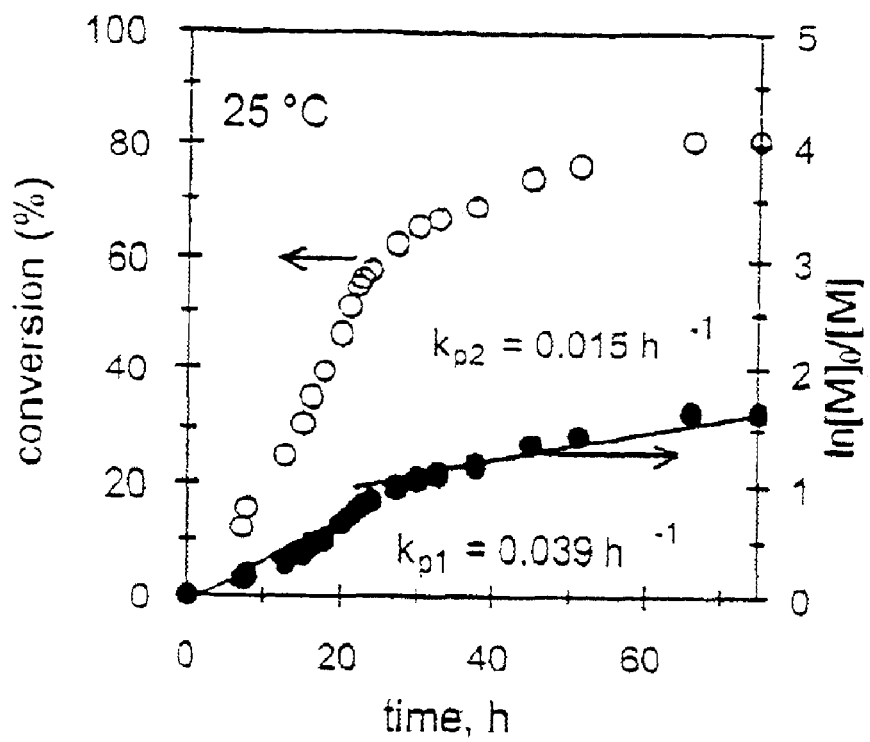
FIG. 5 illustrates Room Temperature Na$_2$S$_2$O$_4$-mediated LRP of VC Initiated with iodoform in H$_2$O/THF. [VC]/[CHI$_3$]/[Na$_2$S$_2$O$_4$]/[NaHCO$_3$]=200/1/2/2.2 (mol/mol/mol/mol).
Figure 5:
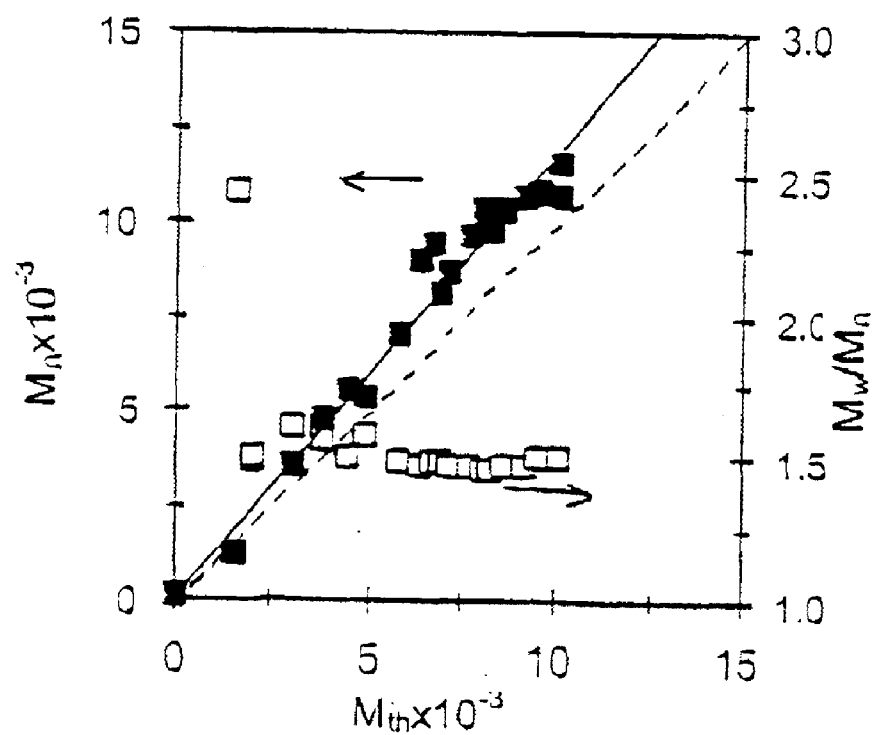

Tables 11 and 12 along with FIGS. 5 and 6 present $Na_2S_2O_8$— HCOONa-catalyzed radical polymerization of VC initiated with, respectively, bromoform and chloroform in $H_2O$/THF. These polymerizations occur only in the presence of no-iodine containing initiators and show a typical free radical dependence $M_n$ on $M_{th}$ as it can be seen from FIGS. 9 and 10.

Table 13 presents room temperature $H_2NC(=NH)SO_2H$-catalyzed LRP of VC initiated with iodoform in $H_2O$/THF in the presence of electron shuttle $OV^{2+}$. As $H_2NC(=NH)SO_2H$ is an acidic compound twice amount of buffer is used. The results of the experiments are plotted in FIG. 7. Both $k_{p1}$ and $k_{p2}$ are lower than for a dithionite-mediated polymerization. Maximal conversion is below 60%. Mn shows an ideal dependence on $M_{th}$. Polydispersity decreases from 1.9 to 1.5.

Table 14 presents selected examples of the room temperature non-metallic SET reagents-mediated LRP of VC in $H_2O$, THF and mixtures thereof. The role of the solvent is illustrated by experiments 133, 134 and 154. While in water either in the presence of $OV^{2+}$ or NaDDS reaction occurs there is no dithionite-catalyzed reaction in dry THF. Different halogen containing compounds, other than iodoform, in conjunction with $Na_2S_2O_4$ can initiate VC polymerization (experiments 143, 144, 145, 146, 149) both in the presence of electron shuttle and surfactant and without them. The $CO_2^-$. radical anion precursor $Na_2S_2O_8$— HCOONa is active in conjunction with bromo- or chloro-containing initiators (experiments 151, 152, 162, 163). Different $SO_2$ containing compounds other than $Na_2S_2O_4$ show activity with iodoform as initiator (experiments 152, 156, 160, 164, 165, 166). Some surfactants show activity in experiments 139, 140, 141, 142, 154. Additives such as sodium halides are active (experiments 125–132), with the narrowest polydispersity (1.445) and high yield obtained in experiment 126.

EXAMPLES OF PREPARATION OF THE CHLORINE CONTAINING POLYMER UTLIZING A METALLIC CATALYST

The polymerizations reported were performed as follows unless otherwise noted: A 50 mL Ace Glass 8648 #15 Ace-Thred pressure tube equipped with bushing and plunger valve containing solvent (ortho-dichlorobenzene, 10 mL), initiator catalyst, ligand, optional additive and vinyl chloride (5 mL, 0.072 mol), was degassed by three freeze-vacuum pump-thaw cycles was filled with argon. The reaction mixture was slowly heated to the specific reaction temperature in an oil bath. After the specific reaction time, the tube was slowly cooled and excess vinyl chloride was allowed to boil off. Methylene chloride (10 mL) was added and the solution was precipitated into methanol, filtered and dried. The conversion was determined gravimetrically and the number average molecular weight (Mn) and molecular weight distribution (Mw/Mn) were determined by gel permeation chromatography using a calibration based on polystyrene standards. GPC analysis of the polymers was performed on a Perkin-Elmer Series 10 high pressure liquid chromatograph equipped with an LC-100 column oven (22° C.), a Nelson Analytical 900 Series integrator data station, a Perkin-Elmer 785A UV/Visible Detector (254 nm), a Varian Star 4090 RI detector and 2 AM gel (10 $\mu$m, 500 Å and 10 $\mu$m, $10^4$ Å) columns. THF (Fisher, HPLC-grade) was used as eluent at a flow rate of 1 mL/min.

A number of polymerization reactions were produced in accordance with the above description. Selected examples from the Tables 1–6 are presented below:

Table 1, Example 1

A 50 mL Ace Glass 8648 #15 Ace-Thred pressure tube equipped with bushing and plunger valve containing vinyl chloride (5 mL, 0.072 mol), solvent (ortho-dichlorobenzene (o-DCB), 10 mL), initiator (ethyl 2-bromoisobutyrate, 223 mg, 1.12 mmol), catalyst (Fe(0), 40 mg, 0.7 mmol) and ligand (phen 200 mg, 1.1 mmol) was degassed by three freeze-vacuum pump-thaw cycles and filled with argon. The reaction mixture was slowly heated to 90° C. in an oil bath. After 19 hours, the tube was slowly cooled and excess vinyl chloride was allowed to boil off. Methylene chloride (10 mL) was added and the solution was precipitated into methanol, filtered and dried to yield 1.17 g (26%) of PVC, Mn=10,000, Mw/Mn=1.66.

Table 1, Example 9

A 50 mL Ace Glass 8648 #15 Ace-Thred pressure tube equipped with bushing and plunger valve containing vinyl chloride (5 mL, 0.072 mol), solvent (o-DCB, 10 mL), initiator (chlorine terminated poly(methylmethacrylate) PMMA-CH$_2$—C(COOMe)(CH$_3$)—Cl, Mn=6,300, Mw/Mn=1.25, 1 g, 0.16 mmol), catalyst (Fe(O), 40 mg, 0.7 mmol) and ligand (phen 100 mg, 0.55 mmol) was degassed by three freeze-vacuum pump-thaw cycles and filled with argon. The reaction mixture was slowly heated to 0.90° C. in an oil bath. After 20 hours, the tube was slowly cooled and excess vinyl chloride was allowed to boil off. Methylene chloride (20 mL) was added and the solution was precipitated into methanol, filtered and dried to yield 3.5 g (35%) of PVC, Mn=8,300, Mw/Mn=1.73.

Table 1, Example 18

A 50 mL Ace Glass 8648 #10 Ace-Thred pressure tube equipped with bushing and plunger valve containing vinyl chloride (5 mL, 0.072 mol), solvent (o-DCB, 10 mL), initiator (1-chloro-1-cyanoethane, 79 mg, 0.56 mmol), catalyst (Fe(CO)$_5$, 133 mg, 0.68 mmol) was degassed by three freeze-vacuum pump-thaw cycles and filled with argon. The reaction mixture was slowly heated to 90° C. in an oil bath. After 18 hours, the tube was slowly cooled and excess vinyl chloride was allowed to boil off. Methylene chloride (10 mL) was added and the solution was precipitated into methanol, filtered and dried to yield 0.23 g (4%) of PVC, Mn=14,300, Mw/Mn=1.65.

Table 1, Example 19

A 50 mL Ace Glass 8648 #15 Ace-Thred pressure tube equipped with bushing and plunger valve containing vinyl chloride (5 mL, 0.072 mol), solvent (o-DCB, 10 mL), initiator (4-florobenzenesulfonyl chloride 132 mg, 0.56 mmol), catalyst (Fe(0), 40 mg, 0.7 mmol)) and ligand (phen 200 mg, 1.12 mmol) was degassed by three freeze-vacuum pump-thaw cycles and filled with argon. The reaction mixture was slowly heated to 90° C. in an oil bath. After 18 hours, the tube was slowly cooled and excess vinyl chloride was allowed to boil off. Methylene chloride (10 mL) was added and the solution was precipitated into methanol, filtered and dried to yield 1 g (22%) of PVC, Mn=14,300, Mw/Mn=1.82.

Table 2, Example 21

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol) and catalyst (TiCp$_2$C$_2$, 167 mg, 0.67 mmol) was degassed by three freeze-vacuum pump-thaw cycles and filled with argon. The reaction mixture was slowly heated to 90° C. in an oil bath. After 22 hours, the tube was slowly cooled and excess vinyl chloride was allowed to boil off. Methylene chloride (10 mL) was added and the solution was precipitated into methanol, filtered and dried to yield 0.47 g (10%) of PVC, Mn=14,300, Mw/Mn=1.82.

Table 2. Example 23

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol), catalyst (TiCp$_2$Cl$_2$, 167 mg, 0.6 mmol) and additive (Al'Bu$_3$, 2 mmol, 2 mL 1M in toluene) was degassed by three freeze-vacuum pump-thaw cycles and filled with argon. The reaction mixture was slowly heated to 90° C. in an oil bath. After 17 hours, the tube was slowly cooled and excess vinyl chloride was allowed to boil off. Methylene chloride (10 mL) was added and the solution was precipitated into methanol, filtered and dried to yield 2.8 g (60%) of PVC, Mn=3,800, Mw/Mn 2.10.

Table 2, Example 24

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol), catalyst (TiCp$_2$Cl$_2$, 167 mg, 0.6 mmol), additive (Zn(O), 65 mg, 1 mmol) and ligand (bpy 100 mg, 0.4 mmol) was degassed by three freeze-vacuum pump-thaw cycles and filled with argon. The reaction mixture was slowly heated to 90° C. in an oil bath. After 17 hours, the tube was slowly cooled and excess vinyl chloride was allowed to boil off. Methylene chloride (10 mL) was added and the solution was precipitated into methanol, filtered and dried to yield 1 g (22%) of PVC, Mn=14,800, Mw/Mn=1.95.

Table 2, Example 25

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol), catalyst (Ti(OBu)$_4$, 231 mg, 0.7 mmol), additive (Al$^i$Bu$_3$, 2 mmol, 2 mL 1M in toluene) was degassed by three freeze-vacuum pump-thaw cycles and filled with argon. The reaction mixture was slowly heated to 90° C. in an oil bath. After 17 hours, the tube was slowly cooled and excess vinyl chloride was allowed to boil off. Methylene chloride (10 mL) was added and the solution was precipitated into methanol, filtered and dried to yield 4 g (88%) of PVC, Mn=14,800 Mw/Mn=1.95.

Table 2, Example 29

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-dichloro-p-xylene, 25 mg 0.14 mmol) and catalyst (TiCp$_2$Cl$_2$, 70 mg, 0.28 mmol), was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.25 g (28%) of PVC, Mn=4,900, Mw/Mn=1.81.

Table 2, Example 33

A 50 mL Ace Glass 8648 #15 Ace-Thred pressure tube equipped with bushing and plunger valve containing vinyl chloride (5 mL, 0.072 mol), solvent (o-DCB, 10 mL), initiator (N-bromosuccinimide, 100 mg 0.56 mmol) and catalyst (TiCp$_2$Cl$_2$, 170 mg, 0.68 mmol), was degassed by three freeze-vacuum pump-thaw cycles and filled with argon. The reaction mixture was slowly heated to 90° C. in an oil bath. After 19 hours, the tube was slowly cooled and excess vinyl chloride was allowed to boil off. Methylene chloride (10 mL) was added and the solution was precipitated into methanol, filtered and dried to yield 0.2 g (4%) of PVC, Mn=19,000 Mw/Mn=1.78.

Table 2, Example 34

A 50 mL Ace Glass 8648 #15 Ace-Thred pressure tube equipped with bushing and plunger valve containing vinyl chloride (5 mL, 0.072 mol), solvent (o-DCB, 10 mL), initiator (trichloroisocyanuric acid, 100 mg, 0.56 mmol) and catalyst (TiCp$_2$Cl$_2$, 170 mg, 0.68 mmol), was degassed by three freeze-vacuum pump-thaw cycles and filled with argon. The reaction mixture was slowly heated to 90° C. in an oil bath. After 19 hours, the tube was slowly cooled and excess vinyl chloride was allowed to boil off. Methylene chloride (10 mL) was added and the solution was precipitated into methanol, filtered and dried to yield 0.2 g (4%) of PVC, Mn=19,000, Mw/Mn=1.80.

Table 2, Example 35

A 50 mL Ace Glass 8648 #15 Ace-Thred pressure tube equipped with bushing and plunger valve containing vinyl chloride (5 mL, 0.072 mol), solvent (o-DCB, 10 mL), initiator (1,1,1-tris(4-chlorosulfonylphenyl)ethane, 100 mg, 0.18 mmol) and catalyst (TiCp$_2$Cl$_2$, 400 mg, 1.6 mmol), was degassed by three freeze-vacuum pump-thaw cycles and filled with argon. The reaction mixture was slowly heated to 110° C. in an oil bath. After 22 hours, the tube was slowly cooled and excess vinyl chloride was allowed to boil off. Methylene chloride (10 mL) was added and the solution was precipitated into methanol, filtered and dried to yield 0.35 g (7%) of PVC, Mn=4,000 Mw/Mn=2.05.

Table 3, Example 39

A 50 mL Ace Glass 8648 #15 Ace-Thred pressure tube equipped with bushing and plunger valve containing vinyl chloride (5 mL, 0.072 mol), solvent (DMF, 5 mL), initiator (1-chloro-1-cyanoethane, 64 mg, 0.72 mmol) catalyst (copper phenylacetylide, 178 mg, 1.1 mmol) and ligand (bpy, 337 mg, 2.16 mmol) was degassed by three freeze-vacuum pump-thaw cycles and filled with argon. The reaction mixture was slowly heated to 90° C. in an oil bath. After 19 hours, the tube was slowly cooled and excess vinyl chloride was allowed to boil off. Methylene chloride (10 mL) was added and the solution was precipitated into methanol, filtered and dried to yield 0.67 g (15%) of PVC, Mn=1,300, Mw/Mn=3.60.

Table 3, Example 40

A 50 mL Ace Glass 8648 #15 Ace-Thred pressure tube equipped with bushing and plunger valve containing vinyl chloride (5 mL, 0.072 mol), solvent (DMF, 5 mL), initiator (1-chloro-1-cyanoethane, 51 mg, 0.56 mmol) catalyst (copper thiophenoxide, 69 mg, 0.4 mmol) and ligand (bpy, 337 mg, 2.16 mmol) was degassed by three freeze-vacuum pump-thaw cycles and filled with argon. The reaction mixture was slowly heated to 60° C. in an oil bath. After 19 hours, the tube was slowly cooled and excess vinyl chloride was allowed to boil off. Methylene chloride (10 mL) was added and the solution was precipitated into methanol, filtered and dried to yield 0.6 g (13%) of PVC, Mn=2,800, Mw/Mn=3.60.

Table 3, Example 41

A 50 mL Ace Glass 8648 #15 Ace-Thred pressure tube equipped with bushing and plunger valve containing vinyl chloride (5 mL, 0.072 mol), solvent (o-DCB, 5 mL), initiator (1-chloro-1-iodoethane, 53 mg, 0.28 mmol) catalyst (copper (I) bromide, 61 mg, 0.42 mmol) and ligand (tris[2-(dimethylamino)ethyl]amine (Me$_6$-TREN), 193 mg, 0.84 mmol) was degassed by three freeze-vacuum pump-thaw cycles and filled with argon. The reaction mixture was slowly heated to 90° C. in an oil bath. After 44 hours, the tube was slowly cooled and excess vinyl chloride was allowed to boil off. Methylene chloride (10 mL) was added and the solution was precipitated into methanol, filtered and dried to yield 0.22 g (5%) of PVC, Mn=3,200, Mw/Mn=1.30.

Table 3, Example 46

A 50 mL Ace Glass 8648 #15 Ace-Thred pressure tube equipped with bushing and plunger valve containing vinyl chloride (5 mL, 0.072 mol), solvent (o-DCB, 5 mL), initiator (α,α'-dithiocyanato-p-xylene, 61 mg, 0.28 mmol) catalyst (copper (I) telluride, 285 mg, 1.12 mmol) and ligand (bpy, 350 mg, 1.36 mmol) was degassed by three freeze-vacuum pump-thaw cycles and filled with argon. The reaction mixture was slowly heated to 130° C. in an oil bath. After 22 hours, the tube was slowly cooled and excess vinyl chloride was allowed to boil off. Methylene chloride (10 mL) was added and the solution was precipitated into methanol, filtered and dried to yield 0.36 g (8%) of PVC, Mn=5,100, Mw/Mn=2.23.

Table 4, Example 48

A 50 mL Ace Glass 8648 #15 Ace-Thred pressure tube equipped with bushing and plunger valve containing vinyl chloride (5 mL, 0.072 mol), solvent (o-DCB, 10 mL), initiator (3-chloro-2-chloromethylpropene, 90 mg, 0.72 mmol) catalyst (copper, 184 mg, 2.8 mmol) and ligand (bpy, 898 mg, 5.76 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.4 g (31%) of PVC, Mn=7,700, Mw/Mn=1.85.

Table 4, Example 49

A 50 mL Ace Glass 8648 #15 Ace-Thred pressure tube equipped with bushing and plunger valve containing vinyl chloride (5 mL, 0.072 moll, solvent (o-DCB, 10 mL), initiator (1-chloro-methyl-2-butene, 75 mg, 0.72 mmol) catalyst (copper, 92 mg, 1.4 mmol) and ligand (bpy, 450 mg, 2.88 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.9 g (20%) of PVC, Mn=8,300, Mw/Mn=1.62.

Table 4, Example 49

A 50 mL Ace Glass 8648 #15 Ace-Thred pressure tube equipped with bushing and plunger valve containing vinyl chloride (5 mL, 0.072 mol), solvent (o-DCB, 10 mL), initiator (1-chloro-methyl-2-butene, 75 mg, 0.72 mmol), catalyst (copper, 92 mg, 1.4 mmol) and ligand (bpy, 450 mg, 2.88 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and then the solution was precipitated into methanol, filtered and dried to yield 0.9 g (20%) of PVC, Mn=8,300, Mw/Mn=162.

Table 4, Example 50

A 50 mL Ace Glass 8648 #15 Ace-Thred pressure tube equipped with bushing and plunger valve containing vinyl chloride (5 mL, 0.072 mol), solvent (o-DCB, 10 mL), initiator (ally chloride, 55 mg, 0.72 mmol), catalyst (copper, 92 mg, 1.4 mmol) and ligand (bpy, 450 mg, 2.88 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.2 g (27%) of PVC, Mn=6,100, Mw/Mn=1.83.

Table 4, Example 53

A 50 mL Ace Glass 8648 #15 Ace-Thred pressure tube equipped with bushing and plunger valve containing vinyl chloride (5 mL, 0.072 mol), solvent (o-DCB, 10 mL), initiator (methylene chloride, 61 mg, 0.72 mmol), catalyst (copper, 92 mg, 1.4 mmol) and ligand (bpy, 450 mg, 2.88 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.25 g (5%) of PVC, Mn=50,000, Mw/Mn=2.75.

Table 4, Example 55

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-dichloro-p-xylene, 12 mg, 0.07 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 21 hours, the tube was slowly cooled and excess vinyl chloride was allowed to boil off. Methylene chloride (10 mL) was added and the solution was precipitated into methanol, filtered and dried to yield 0.8 g (18%) of PVC, Mn=22,400, Mw/Mn=1.53.

Table 4, Example 56

A 50 mL Ace Glass 8648 #15 Ace-Thred pressure tube equipped with bushing and plunger valve containing vinyl chloride (2.5 mL, 0.036 mol), solvent (o-DCB, 5 mL), initiator ($\alpha,\alpha'$-dichloro-p-xylene, 105 mg, 0.6 mmol), catalyst (copper, 307 mg, 0.48 mmol) and ligand (bpy, 750 mg, 0.48 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the mixture was precipitated into methanol, filtered and dried to yield 2.3 g (95%) of PVC.

Table 4, Example 57

A 50 mL Ace Glass 8648 #15 Ace-Thred pressure tube equipped with bushing and plunger valve containing vinyl chloride (5 mL, 0.072 mol), solvent (o-DCB, 10 mL), initiator (2-bromo-2-methylpropionyl bromide, 64 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 90° C. in an oil bath. After 22 hours, the tube was slowly cooled and excess vinyl chloride was allowed to boil off. Methylene chloride (10 mL) was added and the solution was precipitated into methanol, filtered and dried to yield 0.5 g (12%) of PVC, Mn=17,000, Mw/Mn=1.90.

Table 4, Example 59

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.6 mmol), catalyst (copper, 40 mg, 0.6 mmol) ligand (bpy, 150 mg, 0.96 mmol) and additive (Al$^i$Bu$_3$, 0.6 mmol, 0.6 mL 1M in toluene) was degassed by three freeze-vacuum pump-thaw cycles and filled with argon. The reaction mixture was slowly heated to 90° C. in an oil bath. After 22 hours, the tube was slowly cooled and excess vinyl chloride was allowed to boil off. Methylene chloride (10 mL) was added and the solution was precipitated into methanol, filtered and dried to yield 3.5 g (77%) of PVC, Mn=6,400, Mw/Mn=1.85.

Table 4, Example 60

A 50 mL Ace Glass 8648 #15 Ace-Thred pressure tube equipped with bushing and plunger valve containing vinyl chloride (5 mL, 0.072 mol), solvent (o-DCB, 10 mL), initiator (1,2,4,5-tetrakis(bromomethyl)benzene, 16 mg, 0.035 mmol), catalyst (copper, 18 mg, 0.28 mmol) and ligand (bpy, 87 mg, 0.56 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.3 g (7%) of PVC, Mn=23,700, Mw/Mn=1.58.

Table 4, Example 61

A 50 mL Ace Glass 8648 #15 Ace-Thred pressure tube equipped with bushing and plunger valve containing vinyl chloride (5 mL, 0.072 mol), solvent (o-DCB, 10 mL), initiator (propanoic acid, 2-bromo-2-methyl-(1-methylethylidene)-di-4,1-phenylene ester 150 mg, 0.28 mmol), catalyst (copper, 72 mg, 1.12 mmol) and ligand (bpy, 350 mg, 2.2 mmol) was degassed by three freeze-vacuum pump-thaw cycles and filled with argon. The reaction mixture was slowly heated to 90° C. in an oil bath. After 22 hours, the tube was slowly cooled and excess vinyl chloride was allowed to boil off. Methylene chloride (10 mL) was added and the solution was precipitated into methanol, filtered and dried to yield 1.7 g (35%) of PVC, Mn=6,300, Mw/Mn=1.45.

Table 4, Example 65

A 50 mL Ace Glass 8648 #15 Ace-Thred pressure tube equipped with bushing and plunger valve containing vinyl chloride (5 mL, 0.072 mol), solvent (o-DCB, 10 mL), initiator (propanoic acid, 2-bromo-2-methyl-4,4'-biphenylene ester 135 mg, 0.28 mmol), catalyst (copper, 72 mg, 1.12 mmol) and ligand (bpy, 350 mg, 2.2 mmol) was degassed by three freeze-vacuum pump-thaw cycles and filled with argon. The reaction mixture was slowly heated to 130° C. in an oil bath. After 22 hours, the tube was slowly cooled and excess vinyl chloride was allowed to boil off. Methylene chloride (10 mL) was added and the solution was precipitated into methanol, filtered and dried to yield 1.35 g (31%) of PVC, Mn=5,600, Mw/Mn=1.48.

Table 4, Example 67

A 50 mL Ace Glass 8648 #15 Ace-Thred pressure tube equipped with bushing and plunger valve containing vinyl chloride (5 mL, 0.072 mol), solvent (o-DCB, 10 mL), initiator (1-chloro-1-bromoethane 103 mg, 0.72 mmol), catalyst (copper, 92 mg, 1.44 mmol) and ligand (bpy, 450 mg, 2.9 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.79 g (40%) of PVC, Mn=6,000, Mw/Mn=2.30.

Table 4, Example 70

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-dibromo-p-xylene 33 mg, 0.28 mmol), catalyst (copper, 72 mg, 1.12 mmol) and ligand (bpy, 350 mg, 2.2 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.95 g (43%) of PVC, Mn=11,000, Mw/Mn=1.63.

Table 4, Example 72

A 50 mL Ace Glass 8648 #15 Ace-Thred pressure tube equipped with bushing and plunger valve containing vinyl chloride (5 mL, 0.072 mol), solvent (o-DCB, 10 mL), initiator (propanoic acid, 2-iodo-2-methyl-4,4'-biphenylene ester 162 mg, 0.28 mmol), catalyst (copper, 72 mg, 1.12 mmol) and ligand (bpy, 350 mg, 2.2 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.75 g (38%) of PVC, Mn=6,700, Mw/Mn=1.47.

Table 4, Example 74

A 50 mL Ace Glass 8648 #15 Ace-Thred pressure tube equipped with bushing and plunger valve containing vinyl chloride (5 mL, 0.072 mol), solvent (o-DCB, 10 mL), initiator (1,1,1-tris(4-(2-iodo-2-methylpropanoylphenyl)) ethane 167 mg, 0.19 mmol), catalyst (copper, 72 mg, 1.12 mmol) and ligand (bpy, 350 mg, 2.2 mmol) was degassed by three freeze-vacuum pump-thaw cycles and filled with argon. The reaction mixture was slowly heated to 130° C. in an oil bath. After 70 hours, the tube was slowly cooled and excess vinyl chloride was allowed to boil off. Methylene chloride (10 mL) was added and the solution was precipitated into methanol, filtered and dried to yield 1.7 g (37%) of PVC, Mn=8,600, Mw/Mn=1.67.

Table 4, Example 75

A 50 mL Ace Glass 8648 #15 Ace-Thred pressure tube equipped with bushing and plunger valve containing vinyl chloride (5 mL, 0.072 mol), solvent (o-DCB, 10 mL), initiator (iodoperflorodecane 180 mg, 0.28 mmol), catalyst (copper, 25 mg, 0.56 mmol) and ligand (bpy, 175 mg, 1.1 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.2 g (26%) of PVC, Mn=5,800, Mw/Mn=1.64.

Table 4, Example 78

A 50 mL Ace Glass 8648 #15 Ace-Thred pressure tube equipped with bushing and plunger valve containing vinyl chloride (5 mL, 0.072 mol), solvent (o-DCB, 10 mL), initiator (allyl iodide 47 mg, 0.28 mmol), catalyst (copper, 36 mg, 0.56 mmol) and ligand (bpy, 175 mg, 1.1 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1 g (22%) of PVC, Mn=6,800, Mw/Mn=1.72.

Table 4, Example 80

A 50 mL Ace Glass 8648 #15 Ace-Thred pressure tube equipped with bushing and plunger valve containing vinyl chloride (5 mL, 0.072 mol), solvent (o-DCB, 10 mL), initiator (iodoform, $CHI_3$, 567 mg, 1.44 mmol), catalyst (copper, 138 mg, 2.11 mmol) and ligand (bpy, 675 mg, 4.3 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.36 g (8%) of PVC, Mn=3.300, Mw/Mn=1.25.

Table 4, Example 80

A 50 mL Ace Glass 8648 #15 Ace-Thred pressure tube equipped with bushing and plunger valve containing vinyl chloride (5 mL, 0.072 mol), solvent (o-DCB, 10 mL), initiator (iodoform, $CHI_3$, 190 mg, 0.48 mmol), catalyst (copper, 184 mg, 2.8 mmol) and ligand (bpy, 900 mg, 5.8 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.45 g (33%) of PVC, Mn=6.100, Mw/Mn=1.65.

Table 4, Example 86

A 50 mL Ace Glass 8648 #15 Ace-Thred pressure tube equipped with bushing and plunger valve containing vinyl chloride (5 mL, 0.072 mol), solvent (o-DCB, 10 mL), initiator (iodoform, $CHI_3$, 18.4 mg, 0.05 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.5 g (11%) of PVC, Mn=30,000, Mw/Mn=1.63.

Table 4, Example 88

A 50 mL Ace Glass 8648 #15 Ace-Thred pressure tube equipped with bushing and plunger valve containing vinyl chloride (5 mL, 0.072 mol), solvent (o-DCB, 10 mL), initiator (iodoform, $CHI_3$, 9.2 mg, 0.02 mmol), catalyst (copper, 18 mg, 0.28 mmol) and ligand (bpy, 87 mg, 0.56 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.34 g (8%) of PVC, Mn=45,000, Mw/Mn 1.59.

Table 4, Example 89

A 50 mL Ace Glass 8648 #15 Ace-Thred pressure tube equipped with bushing and plunger valve containing vinyl chloride (5 mL, 0.072 mol), solvent (o-DCB, 10 mL), initiator (iodoform, $CHI_3$, 190 mg, 0.48 mmol), catalyst (copper, 23 mg, 0.36 mmol) and ligand (tris(2-aminoethyl)amine (TREN), 52 mg, 0.36 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.45 g (10%) of PVC, Mn=5,000, Mw/Mn 1.58.

Table 4, Example 91

A 50 mL Ace Glass 8648 #15 Ace-Thred pressure tube equipped with bushing and plunger valve containing vinyl chloride (5 mL, 0.072 mol), solvent (o-DCB, 10 mL), initiator (carbon tetraiodide, $Cl_4$, 37 mg, 0.07 mmol), catalyst (copper, 37 mg, 0.57 mmol) and ligand (bpy, 180 mg, 1.15 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.29 g (7%) of PVC, Mn=17,400, Mw/Mn=1.52.

Table 4, Example 97

A 50 mL Ace Glass 8648 #15 Ace-Thred pressure tube equipped with bushing and plunger valve containing vinyl chloride (5 mL, 0.072 mol), initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 60° C. in an oil bath. After 20 hours, the tube was slowly cooled and excess vinyl chloride was allowed to boil off. Methylene chloride (10 mL) was added and the solution was precipitated into methanol, filtered and dried to yield 0.66 g (15%) of PVC, Mn=5,200, Mw/Mn=1.78.

Table 4, Example 98

A 50 mL Ace Glass 8648 #15 Ace-Thred pressure tube equipped with bushing and plunger valve containing vinyl chloride (5 mL, 0.072 mol), solvent (o-DCB, 2.5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 60° C. in an oil bath. After 20 hours, the tube was slowly cooled and excess vinyl chloride was allowed to boil off. Methylene chloride (10 mL) was added and the solution was precipitated into methanol, filtered and dried to yield 1 g (22%) of PVC, Mn=5,600, Mw/Mn=1.77.

Table 4, Example 99

A 50 mL Ace Glass 8648 #15 Ace-Thred pressure tube equipped with bushing and plunger valve containing vinyl chloride (5 mL, 0.072 mol), solvent (o-DCB, 5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 60° C. in an oil bath. After 20 hours, the tube was slowly cooled and excess vinyl chloride was allowed to boil off. Methylene chloride (10 mL) was added and the solution was precipitated into methanol, filtered and dried to yield 1.17 g (26%) of PVC, $Mn=6,200$, $Mw/Mn=1.78$.

Table 4, Example 100

A 50 mL Ace Glass 8648 #15 Ace-Thred pressure tube equipped with bushing and plunger valve containing vinyl chloride (5 mL, 0.072 mol), solvent (o-DCB, 5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 60° C. in an oil bath. After 20 hours, the tube was slowly cooled and excess vinyl chloride was allowed to boil off. Methylene chloride (10 mL) was added and the solution was precipitated into methanol, filtered and dried to yield 0.63 g (14%) of PVC, $Mn=6,500$, $Mw/Mn=1.69$.

Table 4, Example 101

A 50 mL Ace Glass 8648 #15 Ace-Thred pressure tube equipped with bushing and plunger valve containing vinyl chloride (5 mL, 0.072 mol), initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the solution was precipitated into methanol, filtered and dried to yield 0.81 g (18%) of PVC, $Mn=5,400$, $Mw/Mn=1.87$.

Table 4, Example 104

A 50 mL Ace Glass 8648 #15 Ace-Thred pressure tube equipped with bushing and plunger valve containing vinyl chloride (5 mL, 0.072 mol), solvent (o-DCB, 5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the solution was precipitated into methanol, filtered and dried to yield 0.63 g (14%) of PVC, $Mn=6,500$, $Mw/Mn=1.69$.

Table 4, Example 107

A 50 mL Ace Glass 8648 #15 Ace-Thred pressure tube equipped with bushing and plunger valve containing vinyl chloride (5 mL, 0.072 mol), solvent (o-DCB, 5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.95 g (43%) of PVC, $Mn=7,100$, $Mw/Mn=1.65$.

Table 4, Example 109

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 21 mg, 0.072 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the mixture was precipitated into methanol, filtered and dried to yield 2.38 g (53%) of PVC, $Mn=10,600$, $Mw/Mn=1.65$.

Table 4, Example 110

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 104 mg, 0.36 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the mixture was precipitated into methanol, filtered and dried to yield 2.11 g (47%) of PVC, $Mn=8,500$, $Mw/Mn=1.69$.

Table 4, Example 111

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 208 mg, 0.72 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the mixture was precipitated into methanol, filtered and dried to yield 1.84 g (41%) of PVC, $Mn=7,000$, $Mw/Mn=1.75$.

Table 4, Example 112

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 416 mg, 1.44 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the mixture was precipitated into methanol, filtered and dried to yield 1.93 g (43%) of PVC, Mn=7,500, Mw/Mn=1.76.

Table 4, Example 112

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 416 mg, 1.44 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the mixture was precipitated into methanol, filtered and dried to yield 1.93 g (43%) of PVC, Mn=7,500, Mw/Mn=1.76.

Table 4, Example 113

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 830 mg, 2.88 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the mixture was precipitated into methanol, filtered and dried to yield 2.02 g (45%) of PVC, Mn=7,300, Mw/Mn=1.72.

Table 4, Example 114

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, NaDDS, sodium dodecylsulfate), 104 mg, 0.36 mmol) was degassed by three freeze-vacuum pump-thaw cycles and filled with argon. The reaction mixture was slowly heated to 90° C. in an oil bath. After 1 hour, the tube was slowly cooled and excess vinyl chloride was allowed to boil off. Methylene chloride (10 mL) was added and the mixture was precipitated into methanol, filtered and dried to yield 1.35 g (30%) of PVC, Mn=4,700, Mw/Mn=1.67.

Table 4, Example 115

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 104 mg, 0.36 mmol) was degassed by three freeze-vacuum pump-thaw cycles and filled with argon. The reaction mixture was slowly heated to 90° C. in an oil bath. After 2 hours, the tube was slowly cooled and excess vinyl chloride was allowed to boil off. Methylene chloride (10 mL) was added and the mixture was precipitated into methanol, filtered and dried to yield 1.49 g (34%) of PVC, Mn=6,200, Mw/Mn=1.71.

Table 4. Example 116

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 104 mg, 0.36 mmol) was degassed by three freeze-vacuum pump-thaw cycles and filled with argon. The reaction mixture was slowly heated to 90° C. in an oil bath. After 4 hours, the tube was slowly cooled and excess vinyl chloride was allowed to boil off. Methylene chloride (10 mL) was added and the mixture was precipitated into methanol, filtered and dried to yield 1.98 g (44%) of PVC, Mn=7,100, Mw/Mn=1.76.

Table 4, Example 117

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, NaDDS, sodium dodecylsulfate), 104 mg, 0.36 mmol) was degassed by three freeze-vacuum pump-thaw cycles and filled with argon. The reaction mixture was slowly heated to 90° C. in an oil bath. After 8 hours, the tube was slowly cooled and excess vinyl chloride was allowed to boil off. Methylene chloride (10 mL) was added and the mixture was precipitated into methanol, filtered and dried to yield 1.98 g (44%) of PVC, Mn=8,500, Mw/Mn=1.73.

Table 4, Example 118

A 50 mL Ace Glass 0.8648#15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 25 mg, 0.07 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.57 g (35%) of PVC, Mn=7,900, Mw/Mn=1.61.

Table 4, Example 119

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 200 mg, 0.56 mmol), catalyst (copper, 143 mg, 2.24 mmol) and ligand (bpy, 700 mg, 4.48 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.48 g (31%) of PVC, Mn=10,300, Mw/Mn=1.58.

Table 4, Example 120

A 50 mL Ace Glass 8648 #15 Ace-Thred pressure tube equipped with bushing and plunger valve containing vinyl chloride (5 mL, 0.072 mol), solvent (ethylene carbonate, 13.2 g, 10 mL), initiator (α,α'-diiodo-p-xylene, 100 mg, 0.28 mmol), catalyst (copper, 72 mg, 1.12 mmol) and ligand (bpy, 250 mg, 2.21 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.85 g (19%) of PVC, Mn=8,400, Mw/Mn=1.56.

Table 4, Example 121

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 50 mg, 0.14 mmol), catalyst (copper, 36 mg, 0.56 mmol) and ligand (tris[2-(dimethylamino)ethyl]amine (Me$_6$-TREN) 128 mg, 0.56 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.63 g (19%) of PVC, Mn=3,000, Mw/Mn=1.80.

Table 4, Example 122

A 50 mL Ace Glass 8648 #15 Ace-Thred pressure tube equipped with bushing and plunger valve containing vinyl chloride (5 mL, 0.072 mol), solvent (o-DCB, 10 mL), initiator (',α'-diiodo-p-xylene, 50 mg, 0.14 mmol), catalyst (copper, 36 mg, 0.56 mmol) and (tris(2-aminoethyl)amine (TREN), 164 mg, 1.12 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the mixture was precipitated into methanol, filtered and dried to yield 1.66 g (37%) of PVC.

Table 4, Example 123

A 50 mL Ace Glass 8648 #15 Ace-Thred pressure tube equipped with bushing and plunger valve containing vinyl chloride (5 mL, 0.072 mol), solvent (dimethylsulfoxide, DMSO, 10 mL), initiator (α,α'-diiodo-p-xylene, 50 mg, 0.14 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.22 g (5%) of PVC, Mn=3,100, Mw/Mn=2.05.

Table 4, Example 124

A 50 mL Ace Glass 8648 #15 Ace-Thred pressure tube equipped with bushing and plunger valve containing vinyl chloride (5 mL, 0.072 mol), solvent (dimethylformamide, DMF, 10 mL), initiator (α,α'-diiodo-p-xylene, 100 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 22 hours, the tube was slowly cooled and excess vinyl chloride was allowed to boil off. Methylene chloride (10 mL) was added and the solution was precipitated into methanol, filtered and dried to yield 0.8 g (18%) of PVC, Mn=6,100, Mw/Mn=2.02.

Table 4, Example 125

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 100 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 1 hour, the tube was slowly cooled and excess vinyl chloride was allowed to boil off. Methylene chloride (10 mL) was added and the solution was precipitated into methanol, filtered and dried to yield 0.07 g (1.5%) of PVC, Mn=1,100, Mw/Mn=1.98.

Table 4, Example 126

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 100 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 2 hours, the tube was slowly cooled and excess vinyl chloride was allowed to boil off. Methylene chloride (10 mL) was added and the solution was precipitated into methanol, filtered and dried to yield 0.3 g (6.6%) of PVC, Mn=4,100, Mw/Mn=1.68.

Table 4, Example 127

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 100 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 4 hours, the tube was slowly cooled and excess vinyl chloride was allowed to boil off. Methylene chloride (10 mL) was added and the solution was precipitated into methanol, filtered and dried to yield 0.46 g (11%) of PVC, Mn=7,600, Mw/Mn=1.48.

Table 4, Example 128

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 100 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 7 hours, the tube was slowly cooled and excess vinyl chloride was allowed to boil off. Methylene chloride (10 mL) was added and the solution was precipitated into methanol, filtered and dried to yield 0.61 g (13.5%) of PVC, Mn=8,300, Mw/Mn=1.46.

Table 4, Example 129

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 100 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 13 hours, the tube was slowly cooled and excess vinyl chloride was allowed to boil off. Methylene chloride (10 mL) was added and the solution was precipitated into methanol, filtered and dried to yield 0.78 g (17.5%) of PVC, Mn=10,400, Mw/Mn=1.48.

Table 4, Example 130

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 50 mg, 0.14 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 2 hours, the tube was slowly cooled and excess vinyl chloride was allowed to boil off. Methylene chloride (10 mL) was added and the solution was precipitated into methanol, filtered and dried to yield 0.1 g (2.2%) of PVC, Mn=2.100, Mw/Mn=2.10.

Table 4, Example 131

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 50 mg, 0.14 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 5 hours, the tube was slowly cooled and excess vinyl chloride was allowed to boil off. Methylene chloride (10 mL) was added and the solution was precipitated into methanol, filtered and dried to yield 0.34 g (7.5%) of PVC, Mn=7,000, Mw/Mn=1.49.

Table 4, Example 132

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 50 mg, 0.14 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 11 hours, the tube was slowly cooled and excess vinyl chloride was allowed to boil off. Methylene chloride (10 mL) was added and the solution was precipitated into methanol, filtered and dried to yield 0.49 g (11%) of PVC, Mn=11,000, Mw/Mn=1.45.

Table 4, Example 133

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 50 mg, 0.14 mmol), catalyst (copper, 36 mg, 0.56 mmol) ligand (bpy, 175 mg, 1.12 mmol) and additive (Al'Bu$_3$, 0.26 mL 1M in tolene, 0.26 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.9 g (20%) of PVC, Mn=12,700, Mw/Mn=1.59.

Table 4, Example 134

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 50 mg, 0.14 mmol), catalyst (copper, 72 mg, 1.12 mmol) and ligand (bpy, 175 mg, 1.12 mmol) was degassed by three freeze-vacuum pump-thaw cycles and filled with argon. The reaction mixture was slowly heated to 130° C. in an oil bath. After 21 hours, the tube was slowly cooled and excess vinyl chloride was allowed to boil off. Methylene chloride (10 mL) was added and the solution was precipitated into methanol, filtered and dried to yield 0.95 g (21%) of PVC, Mn=29,600, Mw/Mn=1.89.

Table 4, Example 135

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 50 mg, 0.14 mmol), catalyst (copper, 144 mg, 2.24 mmol) and ligand (bpy, 175 mg, 1.12 mmol) was degassed by three freeze-vacuum pump-thaw cycles and filled with argon. The reaction mixture was slowly heated to 130° C. in an oil bath. After 21 hours, the tube was slowly cooled and excess vinyl chloride was allowed to boil off. Methylene chloride (10 mL) was added and the mixture was precipitated into methanol, filtered and dried to yield 1.9 g (42%) of PVC.

Table 4, Example 136

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 25 mg, 0.07 mmol), catalyst (copper, 18 mg, 0.28 mmol), ligand (bpy, 88 mg, 0.56 mmol) and additive (2,6-di-'butylpyridine, 115 mg, 0.56 mmol) was degassed by three freeze-vacuum pump-thaw cycles and filled with argon. The reaction mixture was slowly heated to 130° C. in an oil bath. After 21 hours, the tube was slowly cooled and excess vinyl chloride was allowed to boil off. Methylene chloride (10 mL) was added and the solution was precipitated into methanol, filtered and dried to yield 0.4 g (9%) of PVC, Mn=29,600, Mw/Mn=1.89.

Table 4, Example 139

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-dithiocyanato-p-xylene, 62 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.2 g (26%) of PVC, Mn=11,000, Mw/Mn=3.14.

Table 5, Example 140

A 50 mL Ace Glass 8648 #15 Ace-Th red pressure tube equipped with bushing and plunger valve containing vinyl chloride (5 mL, 0.072 mol), solvent (xylene, 10 mL), initiator (ethyl 2-bromoisobutyrate, 111 mg, 0.56 mmol), catalyst (aluminium, 20 mg, 0.74 mmol) and ligand (bpy, 100 mg, 0.64 mmol) was degassed by three freeze-vacuum pump-thaw cycles and filled with argon. The reaction mixture was slowly heated to 90° C. in an oil bath. After 17 hours, the tube was slowly cooled and excess vinyl chloride was allowed to boil off. Methylene chloride (10 mL) was added and the solution was precipitated into methanol, filtered and dried to yield 0.31 g (7%) of PVC, Mn=8,200, Mw/Mn=1.61.

Table 5, Example 141

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol) and catalyst (triisobutylaluminium, Al$^i$Bu$_3$, 0.64 mL 1 M in toluene, 0.64 mmol) was degassed by three freeze-vacuum pump-thaw cycles and filled with argon. The reaction mixture was slowly heated to 90° C. in an oil bath. After 19 hours, the tube was slowly cooled and excess vinyl chloride was allowed to boil off. Methylene chloride (10 mL) was added and the solution was precipitated into methanol, filtered and dried to yield 1.35 g (30%) of PVC, Mn=8,200, Mw/Mn=1.61.

Table 5. Example 142

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol), catalyst (cadmium, 76 mg, 0.68 mmol) and ligand (bpy, 100 mg, 0.64 mmol) was degassed by three freeze-vacuum pump-thaw cycles and filled with argon. The reaction mixture was slowly heated to 90° C. in an oil bath. After 22 hours, the tube was slowly cooled and excess vinyl chloride was allowed to boil off. Methylene chloride (10 mL) was added and the solution was precipitated into methanol, filtered and dried to yield 0.6 g (14%) of PVC, Mn=14,100, Mw/Mn=1.65.

Table 5, Example 143

A 50 mL Ace Glass 8648 #15 Ace-Thred pressure tube equipped with bushing and plunger valve containing vinyl chloride (5 mL, 0.072 mol), solvent (dioxane, 10 mL), initiator (ethyl 2-bromoisobutyrate, 111 mg, 0.56 mmol), catalyst (samarium, 102 mg, 0.68 mmol) and ligand (bpy, 150 mg, 0.96 mmol) was degassed by three freeze-vacuum pump-thaw cycles and filled with argon. The reaction mixture was slowly heated to 90° C. in an oil bath. After 19 hours, the tube was slowly cooled and excess vinyl chloride was allowed to boil off. Methylene chloride (10 mL) was added and the solution was precipitated into methanol, filtered and dried to yield 0.49 g (11%) of PVC, Mn=11,400, Mw/Mn=1.64.

Table 4, Example 144

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol), catalyst (zinc, 45 mg, 0.69 mmol) and ligand (bpy, 200 mg, 0.96 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the solution was precipitated into methanol, filtered and dried to yield 0.49 g (11%) of PVC, Mn=11,400, Mw/Mn=1.64.

Table 4, Example 145

A 50 mL Ace Glass 8648 #15 Ace-Thred pressure tube equipped with bushing and plunger valve containing vinyl chloride (5 mL, 0.072 mol), solvent (o-DCB, 10 mL), initiator (1-chloro-cyanoethane, 111 mg, 0.56 mmol) and catalyst (chromium hexacarbonyl Cr(CO)$_6$, 150 mg, 0.68 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the solution was precipitated into methanol, filtered and dried to yield 0.4 g (9%) of PVC, Mn=18,400, Mw/Mn=1.57.

Table 6, Example 154

A 50 mL Ace Glass 8648 #15 Ace-Thred pressure tube equipped with bushing and plunger valve containing vinyl chloride (5 mL, 0.072 mol), deionized water 10 mL), initiator (1-iodo-1-chloroethane, 137 mg, 0.72 mmol), catalyst (copper, 92 mg, 1.44 mmol), ligand (TREN, 421 mg, 2.88 mmol) and surfactant (CH$_3$—(CH$_2$)$_{11}$—SO$_3$Na, NaDDS, sodium dodecylsulfate), 104 mg, 0.36 mmol) was degassed by three freeze-vacuum pump-thaw cycles and filled with argon. The reaction mixture was stirred at 20° C. in an oil bath. After 20 hours, the tube was slowly opened and excess vinyl chloride was allowed to boil off. THF (10 mL) was added and the mixture was precipitated into methanol, filtered and dried to yield 4.3 g (95%) of PVC, Mn=13,200, Mw/Mn=1.54.

Table 6, Example 218

A 50 mL Ace Glass 8648 #15 Ace-Thred pressure tube equipped with bushing and plunger valve containing vinyl chloride (5 mL, 0.072 mol), deionized water 6 mL and THF 4 mL), initiator (iodoform, 284 mg, 0.72 mmol), catalyst (copper telluride, 367 mg, 1.44 mmol), ligand (TREN, 421 mg, 2.88 mmol) and surfactant (CH$_3$—(CH$_2$)$_{11}$—SO$_3$Na, NaDDS, sodium dodecylsulfate), 63 mg, 0.21 mmol) was degassed by three freeze-vacuum pump-thaw cycles and filled with argon. The reaction mixture was stirred at 20° C. in an oil bath. After 14 hours, the tube was slowly opened and excess vinyl chloride was allowed to boil off. THF (10 mL) was added and the mixture was precipitated into methanol, filtered and dried to yield 4.5 g (99%) of PVC, Mn=11,600, Mw/Mn=1.53.

Examples of Preparation of the Chlorine Containing Polymer Utilizing a Non-Metallic Catalyst Materials. Vinyl chloride (VC, 99%) was provided by OxyVinyls. Iodoform (99%), and sodium dithionate (85%) were purchased from Lancaster. Chloroform (99%), and bromoform (99%) were purchased from ACROS Organics. Tetrahydrofuran (THF, 99%), methylene chloride (99.5%), and methanol (99.8%) were purchased from Fisher Scientific. Alcotex® 72.5 was purchased from Harlow Chemical Co., UK. Methocel® F50 was purchased from the Dow Chemical Company. All other chemicals were purchased from Aldrich and used as received.

Techniques. $^1$H- and $^{13}$C-NMR spectra were recorded on a Bruker DRX500 at 20° C. in $CDCl_3$ or $CD_2Cl_2$ with tetramethylsilane (TMS) as internal standard. GPC analysis was performed on a Perkin-Elmer Series 10 high-pressure liquid chromatograph equipped with an LC-100 column oven (22° C.), a Nelson Analytical 900 Series integrator data station, a Perkin-Elmer 785A UV-Vis Detector (254 nm), a Varian Star 4090 RI detector and 2 AM gel (10 $\mu$m, 500 Å and 10 $\mu$m, $10^4$ Å) columns. Number and weight-average molecular weights were determined against polystyrene standards and were corrected using the Universal Calibration with the following Mark-Houwink parameters for PVC: K=1.50×10$^{-2}$ mL/g, a=0.77.

The polymerizations reported were performed as follows unless otherwise noted: a 50 mL Ace Glass 8648 #15 Ace-Thred pressure tube equipped with bushing and plunger valve was charged with 9 ml of a previously degassed appropriate mixture of water and THF then filled with argon, closed and frozen using MeOH/dry ice. The initiator (0.22 mmol), catalyst (0.43 mmol), buffer (4.8 mmol), optional additive and precondensed VC (3 mL, 0.043 mol) were then added. The exact amount of VC is determined gravimetrically after the reaction. The tube was closed and degassed through the plunger valve by applying reduced pressure and backfilling the tube with Argon 15 times at −40° C. The valve was closed and the reaction mixture was stirred in a water bath at 25° C.±0.5° C., behind a protective shield. After the specified reaction time the tube was slowly opened. The excess of VC was allowed to evaporate and the mixture was poured into MeOH (150 mL). The polymer was ground mechanically, recovered by filtration, then dried in a vacuum oven to a constant weight. The conversion was determined gravimetrically. The kinetic plots were constructed from individual experiments, as sampling of the reaction is not possible.

The samples used for spectral analysis were precipitated twice from THF or $CH_2Cl_2$ solutions in MeOH and dried under vacuum.

A number of polymerization reactions were produced in accordance with the above description. Selected examples from the Tables 1–8 are presented below.

Table 7. Example 14

A 50 mL Ace Glass 8648 #15 Ace-Thred pressure tube equipped with bushing and plunger valve was charged with a previously degassed mixture of water (6 mL) and THF (3 mL), then filled with argon, closed and frozen using MeOH/dry ice. Then, the initiator ($CHl_3$, 85.5 mg, 0.22 mmol), catalyst ($Na_2S_2O_4$, 75.6 mg, 0.43 mmol), buffer ($NaHCO_3$, 40.1 mg, 0.48 mmol), and precondensed VC (3 mL, 0.043 mol) were added. The exact amount of VC was determined gravimetrically after the reaction. The tube was closed and degassed through the plunger valve by applying reduced pressure and filling the tube with Ar 15 times at −40° C. The valve was closed and the reaction mixture was stirred in a water bath at 25° C.±0.5° C., behind a protective shield. After 33 h, the tube was slowly opened and the excess of VC was allowed to evaporate and the mixture was poured into MeOH (150 mL). The polymer was ground mechanically, recovered by filtration and dried in a vacuum oven to constant weight to give 1.78 g (66.1%) PVC, $M_n$=8,195; $M_w/M_n$=1.465.

Table 8, Example 44

A 50 mL Ace Glass 8648 #15 Ace-Thred pressure tube equipped with bushing and plunger valve was charged with Brij® 98 (6,3 mg 5.5 $\mu$mol), a previously degassed mixture of water and THF (volume ratio 7/3, 9 mL), then filled with argon, closed and frozen using MeOH/dry ice. The initiator ($CHl_3$, 85.5 mg, 0.22 mmol), catalyst ($Na_2S_2O_4$, 75.6 mg, 0.43 mmol), buffer ($NaHCO_3$, 40.1 mg, 0.48 mmol), and precondensed VC (3 mL, 0.043 mol) were then added. The exact amount of VC is determined gravimetrically after the reaction. The tube was closed and degassed through the plunger valve by applying reduced pressure and filling the tube with Ar 15 times at −40° C. The valve was closed and the reaction mixture was stirred in a water bath at 25° C.±0.5° C. behind a protective shield. After 44 h, the tube was slowly opened and the excess of VC was allowed to evaporate and the mixture was poured into MeOH (150 mL). The polymer was ground mechanically, recovered by filtration and dried in a vacuum oven to constant weight to give 2.16 g (72.18%) PVC, Mn=9,325; $M_w/M_n$=1.487.

Table 9, Example 73

A 50 mL Ace Glass 8648 #15 Ace-Thred pressure tube equipped with bushing and plunger valve was charged with Brij® 98 (6,3 mg 5.5 $\mu$mol), a previously degassed mixture of water and THF (volume ratio 7/3, 9 mL), then filled with argon, closed and frozen using MeOH/dry ice. The initiator ($CHl_3$, 85.5 mg, 0.22 mmol), catalyst ($Na_2S_2O_4$, 75.6 mg, 0.43 mmol), buffer ($NaHCO_3$, 40.1 mg, 0.48 mmol), optional electron shuttle ($OV^{2+}$, 0.2 mg, 0.39 $\mu$mol), and precondensed VC (3 mL, 0.043 mol) were then added. The exact amount of VC was determined gravimetrically after the reaction. The tube was closed and degassed through the plunger valve by applying reduced pressure and filling the tube with Ar 15 times at −40° C. The valve was closed and the reaction mixture was stirred in a water bath at 25° C.±0.5° C. behind a protective shield. After 66 h, the tube was slowly opened and the excess of VC was allowed to evaporate and the mixture was poured into MeOH (150 mL). The polymer was ground mechanically, recovered by filtration and dried in a vacuum oven to constant weight to give 2.50 g (83.22%) PVC, $M_n$=10,455; $M_w/M_n$=1.592.

Table 10, Example 100

A 50 mL Ace Glass 8648 #15 Ace-Thred pressure tube equipped with bushing and plunger valve was charged with Brij® 98 (6,3 mg 5.5 $\mu$mol), a previously degassed mixture of water and THF (volume ratio 2/1, 9 mL), then filled with argon, closed and frozen using MeOH/dry ice. The initiator ($CHl_3$, 85.5 mg, 0.22 mmol), catalyst ($Na_2S_2O_4$, 75.6 mg, 0.43 mmol), buffer ($NaHCO_3$, 40.1 mg, 0.48 mmol), optional electron shuttle ($MV^{2+}$, 0.1 mg, 0.39 mmol), and precondensed VC (3 mL, 0.043 mol) were then added. The exact amount of VC was determined gravimetrically after the reaction. The tube was closed and degassed through the plunger valve by applying reduced pressure and filling the tube with Ar 15 times at −40° C. The valve was closed and the reaction mixture was stirred in a water bath at 25° C.±0.5° C. behind a protective shield. After 24 h, the tube was slowly opened and the excess of VC was allowed to evaporate and the mixture was poured into MeOH (150 mL). The polymer was ground mechanically, recovered by filtration and dried in a vacuum oven to constant weight to give 2.28 g (75.90%) PVC, $M_n$=10,174; $M_w/M_n$=1.516.

Table 11, Example 106

A 50 mL Ace Glass 8648 #15 Ace-Thred pressure tube equipped with bushing and plunger valve was charged with a previously degassed mixture of water (6 mL) and THF (3 mL), then filled with argon, closed and frozen using MeOH/dry ice. The initiator ($CHBr_3$, 26.2 mg, 0.22 mmol), catalyst ($Na_2S_2O_8$, 102.4 mg, 0.43 mmol and HCOONa, 29.2 mg, 0.43 mmol), buffer ($NaHCO_3$, 40.1 mg, 0.48 mmol), and precondensed VC (3 mL, 0.043 mol) were then added. The exact amount of VC was determined gravimetrically after the reaction. The tube was closed and degassed through the plunger valve by applying reduced pressure and filling the tube with Ar 15 times at −40° C. The valve was closed and the reaction mixture was stirred in a water bath at 25° C.±0.5° C. behind a protective shield. After 120 h, the tube was slowly opened and the excess of VC was allowed to evaporate and the mixture was poured into MeOH (150 mL). The polymer was ground mechanically, recovered by filtration and dried in a vacuum oven to constant weight to give 1.61 g (53.74%) PVC, Mn=8,593; $M_w/M_n$=1.968.

Table 12, Example 110

A 50 mL Ace Glass 8648 #15 Ace-Thred pressure tube equipped with bushing and plunger valve was charged with a previously degassed mixture of water (6 mL) and THF (3 mL), then filled with argon, closed and frozen using MeOH/dry ice. The initiator ($CHCl_3$, 26.2 mg, 0.22 mmol), catalyst ($Na_2S_2O_8$, 102.4 mg, 0.43 mmol and HCOONa, 29.2 mg, 0.43 mmol), buffer ($NaHCO_3$, 40.1 mg, 0.48 mmol), and precondensed VC (3 mL, 0.043 mol) were then added. The exact amount of VC was determined gravimetrically after the reaction. The tube was closed and degassed through the plunger valve by applying reduced pressure and filling the tube with Ar 15 times at −40° C. The valve was closed and the reaction mixture was stirred in a water bath at 25° C.±0.5° C. behind a protective shield. After 96 h, the tube was slowly opened, the excess of VC was allowed to evaporate and the mixture was poured into MeOH (150 mL). The polymer was ground mechanically, recovered by filtration and dried in a vacuum oven to constant weight to give 1.78 g (58.15%) PVC, Mn=8,854; $M_w/M_n$=2.154.

Table 13, Example 116

A 50 mL Ace Glass 8648 #15 Ace-Thred pressure tube equipped with bushing and plunger valve was charged with a previously degassed mixture of water and THF (volume ratio 7/3, 9 mL), then filled with argon, closed and frozen using MeOH/dry ice. The initiator ($CHI_3$, 85.5 mg, 0.22 mmol), catalyst ($H_2NC(=NH)SO_2H$, 46.9 mg, 0.43 mmol), buffer ($NaHCO_3$, 80.2 mg, 0.95 mmol), optional electron shuttle ($OV^{2+}$, 0.2 mg, 0.39 μmol), and precondensed VC (3 mL, 0.043 mol) were then added. The exact amount of VC was determined gravimetrically after the reaction. The tube was closed and degassed through the plunger valve by applying reduced pressure and filling the tube with Ar 15 times at −40° C. The valve was closed and the reaction mixture was stirred in a water bath at 25° C.±0.5° C. behind a protective shield. After 68 h, the tube was slowly opened and the excess of VC was allowed to evaporate and the mixture was poured into MeOH (150 mL). The polymer was ground mechanically, recovered by filtration and dried in a vacuum oven to constant weight to give 1.65 g (69.87%) PVC, $M_n$=7,119; $M_w/M_n$=1.489.

Table 14, Example 126

A 50 mL Ace Glass 8648 #15 Ace-Thred pressure tube equipped with bushing and plunger valve was charged with a previously degassed mixture of water and THF (volume ratio 7/3, 9 mL), then filled with argon, closed and frozen using MeOH/dry ice. The initiator ($CHI_3$, 85.5 mg, 0.22 mmol), catalyst ($Na_2S_2O_4$, 75.6 mg, 0.43 mmol), buffer ($NaHCO_3$, 40.1 mg, 0.48 mmol), optional electron shuttle ($OV^{2+}$, 0.2 mg, 0.39 mmol) and optional additive (NaI, 263 mg, 1.76 mmol), and precondensed VC (3 mL, 0.043 mol) were then added. The exact amount of VC was determined gravimetrically after the reaction. The tube was closed and degassed through the plunger valve by applying reduced pressure and filling the tube with Ar 15 times at −40° C. The valve was closed and the reaction mixture was stirred in a water bath at 25° C.±0.5° C. behind a protective shield. After 66 h, the tube was slowly opened and the excess of VC was allowed to evaporate and the mixture was poured into MeOH (150 mL). The polymer was ground mechanically, recovered by filtration and dried in a vacuum oven to constant weight to give 2.10 g (69.87%) PVC, Mn=8,915; $M_w/M_n$=1.445.

What is claimed is:

1. A polymeric composition comprising:
   a vinyl halide polymer derived from a living radical polymerization of vinyl halide monomer in the presence of:
   an initiator;
   a metal-free catalyst; and
   optionally, a buffer, an electron shuttle, a surfactant and a solvent or water.

2. A polymeric composition according to claim 1, wherein said vinyl halide monomer is one or more of vinyl chloride, vinylidene chloride or 2-chloropropene.

3. A polymeric composition according to claim 2, wherein said initiator is a halogen containing initiator and said initiator contains one or more of a mono, di, tri or polyfunctional α,α-dihaloalkane, α,α,α-trihaloalkane, a perhaloalkane, a perfluoroalkyl halide, a polyfluoroalkyl halide, a benzyl halide, an allyl halide, a sulfonyl halide, an α-haloester, an α-halonitrile, an α-haloketone, an imidylhalide, or combinations thereof.

4. A polymeric composition according to claim 3, wherein said halogen is one or more of chlorine, bromine, or iodine, and said initiator is present in an amount from about 5000 to about 1 moles of halide containing monomer per mole of initiating group.

5. A polymeric composition according to claim 4, wherein said initiator is iodoform, 1-chloro-1-iodoetane, or 1-iodoperfluoroalkane.

6. A polymeric composition according to claim 3, wherein said catalyst is a non-metal reducing, single electron transfer species.

7. A polymeric composition according to claim 5, wherein said catalyst is a $SO_2$-containing compound, or a polydialkylamino-substituted unsaturated organic compound, and said catalyst contains one or more of $Na_2S_2O_4$, $H_2NC(=NH)SO_2H$, $HOCH_2SO_2Na$, $HOCH_2SO_3Na$, $Na_2SO_3$, $Na_2S_2O_5$, $Na_2S_2O_3$, $CH_3SO_2Na$, $C_6H_5SO_2Na$, p-$CH_3C_6H_4SO_2Na$, $(Me_2N)_2C=C(NMe_2)_2$ or combinations thereof.

8. A polymeric composition according to claim 6, wherein said catalyst is present in an amount of from about 0.01 to about 4 moles per mole of initiating group in the initiator, and said catalyst is sodium dithionite or formamidinesulfinic acid.

9. A polymeric composition according to claim 1, including said buffer, wherein said buffer includes one or more of $NaHCO_3$, $Na_2HPO_4$, $NaH_2PO_4$, $CH_3COONa$, $KHCO_3$, $K_2HPO_4$, $KH_2PO_4$, $CH_3COOK$, $NH_4HCO_3$, $(NH_4)_2HPO_4$, $NH_4H_2PO_4$, $CH_3COONH_4$ or combinations thereof, and said buffer is present in an amount from about 0.1 to about 5 moles of buffer per mole of catalyst.

10. A polymeric composition according to claim 1, further including a comonomer, wherein said comonomer is a monomer known to copolymerize with vinyl chloride via a radical mechanism and said comonomer is one or more of acrylates, vinylidene halides, methacrylates, acrylonitrile, methacrylonitrile, vinyl halides, 2-haloalkenes, styrenes, acrylamide, methacrylamide, vinyl ketones, N-vinylpyrrolidinone, vinyl acetate, maleic acid esters or combinations thereof, and said comonomer is present in an amount of from about 1% up to about 99%.

11. A polymeric composition according to claim 10, wherein said comonomer is vinylidene chloride, 2-chloropropene, acrylonitrile, acrylic acid esters or maleic acid esters and said comonomer is present in an amount from about 1% to about 99%.

12. A polymeric composition according to claim 1 comprising vinyl chloride, an initiator containing one or more of a mono, di, tri or polyfunctional $\alpha,\alpha$-dihaloalkanes, $\alpha,\alpha,\alpha$-trihaloalkanes, perhaloalkanes, perfluoroalkyl halides, polyfluoroalkyl halides, $\alpha$-haloesters, $\alpha$-halonitriles, $\alpha$-haloketones, imidyl halides, and a catalyst containing one or more of a $SO_2$-containing compound or an $Na_2S_2O_4$, $H_2NC(=NH)SO_2H$, $HOCH_2SO_2Na$, $HOCH_2SO_3Na$, $Na_2SO_3$, $Na_2S_2O_5$, $Na_2S_2O_3$, $CH_3SO_2Na$, $C_6H_5SO_2Na$, p-$CH_3C_6H_4SO_2Na$, one or more of polydialkylamino-substituted unsaturated organic compound or an $(Me_2N)_2C=C(NMe_2)_2$ or combinations thereof.

13. A polymeric composition according to claim 6, including said electron shuttle, wherein said electron shuttle is a 1,1'-dialkyl-4,4'-bipyridinium dihalide.

14. A polymeric composition according to claim 13, wherein said electron shuttle is on or more of 1,1'-dimethyl-4,4'-bipyridinium dichloride, 1,1'-di-n-octyl-4,4'-bipyridinium dibromide, or combinations thereof, and electron shuttle is present it an amount from about 0.00001 to about 1 mole of shuttle per mole of catalyst.

15. A polymeric composition according to claim 13, including said surfactant, wherein said surfactant is on or more of sodium dodecylsulfate, hydroxypropyl methylcellulose, 72.5% hydrolyzed polyvinyl acetate, polyoxyethylene (10) oleyl ether, polyoxyethylene (20) oleyl ether, or combinations thereof, and said surfactant is present in an amount from about 10 to about 5000 parts per million w/w relative to halide containing monomer.

16. A polymeric composition according to claim 1, wherein said initiator contains one or more of a mono, di, tri or polyfunctional $\alpha$-$\alpha$-$\alpha$-trihaloalkane, a perhaloalkane, a perfluoroalkyl halide, a polyfluoroalkyl halide, a benzyl halide, an allyl halide, a sulfonyl halide, an $\alpha$-haloester, an $\alpha$-halonitrile, an $\alpha$-haloketone, an imidylhalide, or combinations thereof; said catalyst is a $SO_2$-containing compound or a polydialkylamino-substituted unsaturated organic compound; said buffer is on or more of $NaHCO_3$, $Na_2HPO_4$, $NaH_2PO_4$, $CH_3COONa$, $KHCO_3$, $K_2HPO_4$, $KH_2PO_4$, $CH_3COOK$, $NH_4HCO_3$, $(NH_4)_2HPO_4$, $NH_4H_2PO_4$, $CH_3COONH_4$, or combinations thereof; said electron shuttle is a 1,1'-dialkyl-4,4'-bipyrridinium dihalide; and said surfactant is one or more of sodium dodecylsulfate, hydroxypropyl methylcellulose, 72.5% hydrolyzed polyvinyl acetate, polyoxyethylene (10) oleyl ether, polyoxyethylene (20) oleyl ether, or combinations thereof.

17. A polymeric composition according to claim 4, wherein said halogen containing initiator is part of a polymer chain, including the chain ends of the said polymer.

18. A composition according to claim 1, wherein the molecular weight distribution of said composition is from about $\leq 2.0$ down to about $\leq 1.5$.

19. A composition according to claim 18, wherein said molecular weight distribution is from about $\leq 1.5$ down to about $\leq 1.1$.

20. A polymeric composition comprising:
a copolymer derived from a living radical polymerization of vinyl halide monomer or a structurally-related derivative and a comonomer known to copolymerize with vinyl chloride via a radical mechanism in the presence of:
an initiator;
a metal-free catalyst; and
optionally, a buffer, an electron shuttle, a surfactant, and a solvent or water.

21. A composition according to claim 20, wherein said initiator is a halogen-containing initiator and said initiator contains one or more of a mono, di, tri or polyfunctional $\alpha,\alpha$-dihaloalkane, $\alpha,\alpha,\alpha$-trihaloalkane, a perhaloalkane, a perfloroalkyl halide, a benzyl halide, an allyl halide, a sulfonyl halide, an $\alpha$-haloester, an $\alpha$-halonitrile, an $\alpha$-haloketone, an imidylhalide, or combinations thereof.

22. A composition according to claim 21, wherein said halogen is one or more of chlorine, bromine, or iodine, and said initiator is present in an amount from about 5000 to about 1 moles of halide-containing monomer per mole of initiating group.

23. A composition according to claim 22, wherein said initiator is iodoform, 1-chloro-1-iodoetane, or 1-iodoperfluoroalkene.

24. A composition according to claim 21, wherein said catalyst is a non-metal reducing, single electron transfer species.

25. A composition according to claim 21, wherein said catalyst is sodium dithionite or formamidinesulfinic acid, said catalyst is present in an amount from about 0.01 to about 4 moles per mole of initiating group in the initiator, and said vinyl halide monomer is vinyl chloride.

26. A composition according to claim 24, including said buffer, wherein said buffer includes one or more of $NaHCO_3$, $Na_2HPO_4$, $NaH_2PO_4$, $CH_3COONa$, $KHCO_3$, $K_2HPO_4$, $KH_2PO_4$, $CH_3COOK$, $NH_4HCO_3$, $(NH_4)_2HPO_4$, $NH_4H_2PO_4$, $CH_3COONH_4$ or combinations thereof, and said buffer is present in an amount from about 0.1 to about 5 moles of buffer per mole of catalyst.

27. A composition according to claim 20, further comprising a comonomer, wherein said comonomer is an acrylate, a vinylidene halide, a 2-haloalkene, a methacrylate, an acrylonitrile, a methacrylonitrile, a vinyl halide, a styrene, an acrylamide, a methacrylamide, a vinyl ketone, an N-vinylpyrrolidinone, a vinyl acetate, a maleic acid ester, or combinations thereof, and said comonomer is present in an amount of from about 1% up to about 99%.

28. A composition according to claim 27, wherein said comonomer is vinylidene chloride, acrylonitrile, 2-chloropropene, acrylic acid esters and maleic acid esters.

29. A composition according to claim 24, including said electron shuttle, wherein said electron shuttle is a 1,1'-dialkyl-4,4'-bipyridinium dihalide.

30. A composition according to claim 29, wherein said electron shuttle is one or more of 1,1'-dimethyl-4,4'-bipyridinium dichloride, 1,1'-d-n-octyl-4,4'-bipyridinium dibromide, or combinations thereof, and said electron shuttle is present in an amount from about 0.00001 to about 1 mole of shuttle per mole of catalyst.

31. A composition according to claim 24, including said surfactant, wherein said surfactant is on or more of sodium dodecylsulfate, hydroxypropyl methylcellulose, 72.5% hydrolyzed polyvinyl acetate, polyoxyethylene (10) oleyl ether, polyoxyethylene (20) oleyl ether, or combinations thereof, and said surfactant is present in an amount from about 10 to about 5000 parts per million w/w relative to halide containing monomer.

32. A composition according to claim 20, comprising vinyl chloride, an initiator containing one or more of a mono, di, tri or polyfunctional $\alpha,\alpha$-dihaloalkane, $\alpha,\alpha,\alpha$-trihaloalkane, a perhaloalkane, a perfloroalkyl halide, a benzyl halide, an allyl halide, a sulfonyl halide, an $\alpha$-haloester, an $\alpha$-halonitrile, an $\alpha$-haloketone, an imidylhalide, or combinations thereof, a catalyst containing one or more of an $SO_2$-containing compound or a polydialkylamino-substituted unsaturated organic compound, or combinations thereof; a buffer containing one or more of $NaHCO_3$, $Na_2HPO_4$, $NaH_2PO_4$, $CH_3COONa$, $KHCO_3$, $K_2HPO_4$, $KH_2PO_4$, $CH_3COOK$, $NH_4HCO_3$, $(NH_4)_2HPO_4$, $NH_4H_2PO_4$, $CH_3COONH_4$ or combinations thereof; an electron shuttle which is a 1,1'-dialkyl-4,4'-bipyridinium dihalide; and a surfactant which is one or more of sodium dodecylsulfate, hydroxypropyl methylcellulose, 72.5% hydrolyzed polyvinyl acetate, polyoxyethylene (10) oleyl ether, polyoxyethylene (20) oleyl ether, or combinations thereof.

33. A composition according to claim 25, wherein the molecular weight distribution of said composition is from about $\leq 2.0$ down to about $\leq 1.5$.

34. A polymeric composition comprising:
a vinyl halide polymer derive from a radical polymerization of vinyl halide monomer in the presence of:
an initiator;
a catalyst containing a $CO_2$ radical anion-forming species; and
optionally, a buffer, a surfactant and a solvent or water.

35. A polymeric composition according to claim 34, wherein said vinyl halide monomer is one or more of vinyl chloride, vinylidene chloride or 2-chloropropene.

36. A polymeric composition according to claim 34, wherein said initiator is a halogen containing initiator and said initiator contains one or more of a mono, di, tri or polyfunctional $\alpha,\alpha$-dihaloalkane, $\alpha,\alpha,\alpha$-trihaloalkane, a perhaloalkane, a perfluoroalkyl halide, a polyfluoroalkyl halide, a benzyl halide, an allyl halide, a sulfonyl halide, an $\alpha$-haloester, an $\alpha$-halonitrile, an $\alpha$-haloketone, an imidylhalide, or combinations thereof.

37. A polymeric composition according to claim 36, wherein said halogen is one or more of chlorine or bromine, and said initiator is present in an amount from about 5000 to about 1 moles of halide containing monomer per mole of initiating group.

38. A polymeric composition according to claim 37, wherein said initiator is bromoform, chloroform, carbon tetrabromide or carbon tetrachloride.

39. A polymeric composition according to claim 38, wherein said catalyst is present in an amount of from about 0.01 to about 4 moles per mole of initiating group in the initiator, and said catalyst is alkali metal or ammonium persulfate and alkali metal or ammonium formate in the ratio 1:1.

40. A polymeric composition according to claim 39, wherein said alkali metal is one or more of sodium or potassium.

41. A polymeric composition according to claim 34, including said buffer includes one or more of $NaHCO_3$, $Na_2HPO_4$, $NaH_2PO_4$, $CH_3COONa$, $KHCO_3$, $K_2HPO_4$, $KH_2PO_4$, $CH_3COOK$, $NH_4HCO_3$, $(NH_4)_2HPO_4$, $NH_4H_2PO_4$, $CH_3COONH_4$ or combinations thereof, and said buffer is present in an amount from about 0.1 to about 5 moles of buffer per mole of catalyst.

* * * * *